(12) United States Patent
Suzuki

(10) Patent No.: US 9,071,614 B2
(45) Date of Patent: Jun. 30, 2015

(54) COMPUTER SYSTEM, MANAGEMENT SYSTEM AND RECORDING MEDIUM

(75) Inventor: Yoshiyuki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1167 days.

(21) Appl. No.: 12/672,990

(22) PCT Filed: Nov. 19, 2009

(86) PCT No.: PCT/JP2009/006250
§ 371 (c)(1),
(2), (4) Date: Feb. 10, 2010

(87) PCT Pub. No.: WO2011/061804
PCT Pub. Date: May 26, 2011

(65) Prior Publication Data
US 2012/0017258 A1     Jan. 19, 2012

(51) Int. Cl.
G06F 21/00     (2013.01)
H04L 29/06     (2006.01)
G06F 21/60     (2013.01)

(52) U.S. Cl.
CPC ............ *H04L 63/104* (2013.01); *G06F 21/604* (2013.01); *G06F 2221/2141* (2013.01); *G06F 2221/2115* (2013.01); *G06F 2221/2145* (2013.01); *G06F 2221/2149* (2013.01)

(58) Field of Classification Search
USPC .......................................................... 726/1
See application file for complete search history.

(56) References Cited

U.S. PATENT DOCUMENTS

| | | | |
|---|---|---|---|
| 5,983,270 A * | 11/1999 | Abraham et al. | 709/224 |
| 6,473,851 B1 * | 10/2002 | Plutowski | 713/1 |
| 6,487,594 B1 * | 11/2002 | Bahlmann | 709/225 |
| 6,721,888 B1 * | 4/2004 | Liu et al. | 713/191 |
| 6,751,659 B1 * | 6/2004 | Fenger et al. | 709/223 |
| 7,023,852 B1 * | 4/2006 | Mar et al. | 370/392 |
| RE40,187 E * | 3/2008 | Abraham et al. | 709/224 |
| 7,716,240 B2 * | 5/2010 | Lim | 707/781 |
| 2002/0059471 A1 * | 5/2002 | Sanghvi et al. | 709/318 |
| 2002/0141378 A1 * | 10/2002 | Bays et al. | 370/351 |
| 2003/0023573 A1 * | 1/2003 | Chan et al. | 706/47 |
| 2003/0177389 A1 * | 9/2003 | Albert et al. | 713/201 |
| 2005/0091505 A1 * | 4/2005 | Riley et al. | 713/182 |
| 2005/0102328 A1 * | 5/2005 | Ring et al. | 707/201 |
| 2005/0283823 A1 * | 12/2005 | Okajo et al. | 726/1 |
| 2007/0156897 A1 * | 7/2007 | Lim | 709/225 |
| 2008/0028389 A1 * | 1/2008 | Genty et al. | 717/174 |
| 2008/0184336 A1 * | 7/2008 | Sarukkai et al. | 726/1 |

(Continued)

FOREIGN PATENT DOCUMENTS

JP     2009230178     10/2008

OTHER PUBLICATIONS

English Abstract for Japanese App. No. 2009230178.

*Primary Examiner* — Andrew Goldberg
(74) *Attorney, Agent, or Firm* — Foley & Lardner LLP

(57) ABSTRACT

The present invention prevents the deterioration of security while maintaining usability in a case where a plurality of policies are applied to a client computer. Policies created by respective management servers 10 (Ma through Md) and by a highest-level management server 10 (Msa) are set in a client computer 20. The highest-level management server delivers, to the client computer, a merge rule for creating one policy from a plurality of policies. The client computer creates a new policy from a plurality of policies and the merge rule, and manages a security function.

12 Claims, 67 Drawing Sheets

(56) References Cited

U.S. PATENT DOCUMENTS

| | | | |
|---|---|---|---|
| 2008/0320549 A1* | 12/2008 | Bertino et al. | 726/1 |
| 2008/0320550 A1* | 12/2008 | Strassner et al. | 726/1 |
| 2009/0119746 A1* | 5/2009 | Allen et al. | 726/1 |
| 2009/0178107 A1* | 7/2009 | Karjoth et al. | 726/1 |
| 2010/0011027 A1* | 1/2010 | Cox et al. | 707/200 |
| 2010/0153695 A1* | 6/2010 | Bussard et al. | 713/1 |
| 2010/0154025 A1* | 6/2010 | Esteve Balducci et al. | 726/1 |

* cited by examiner

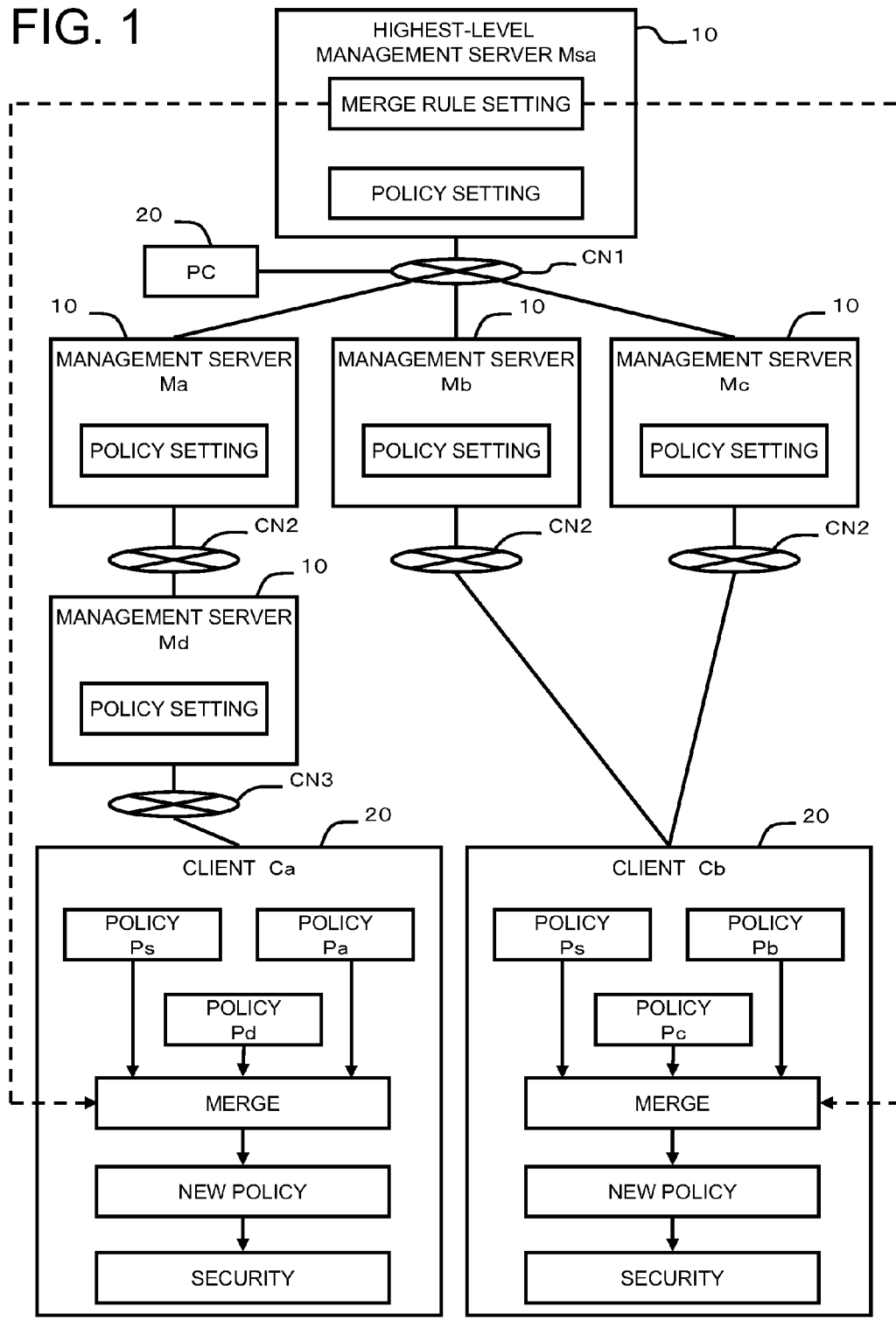

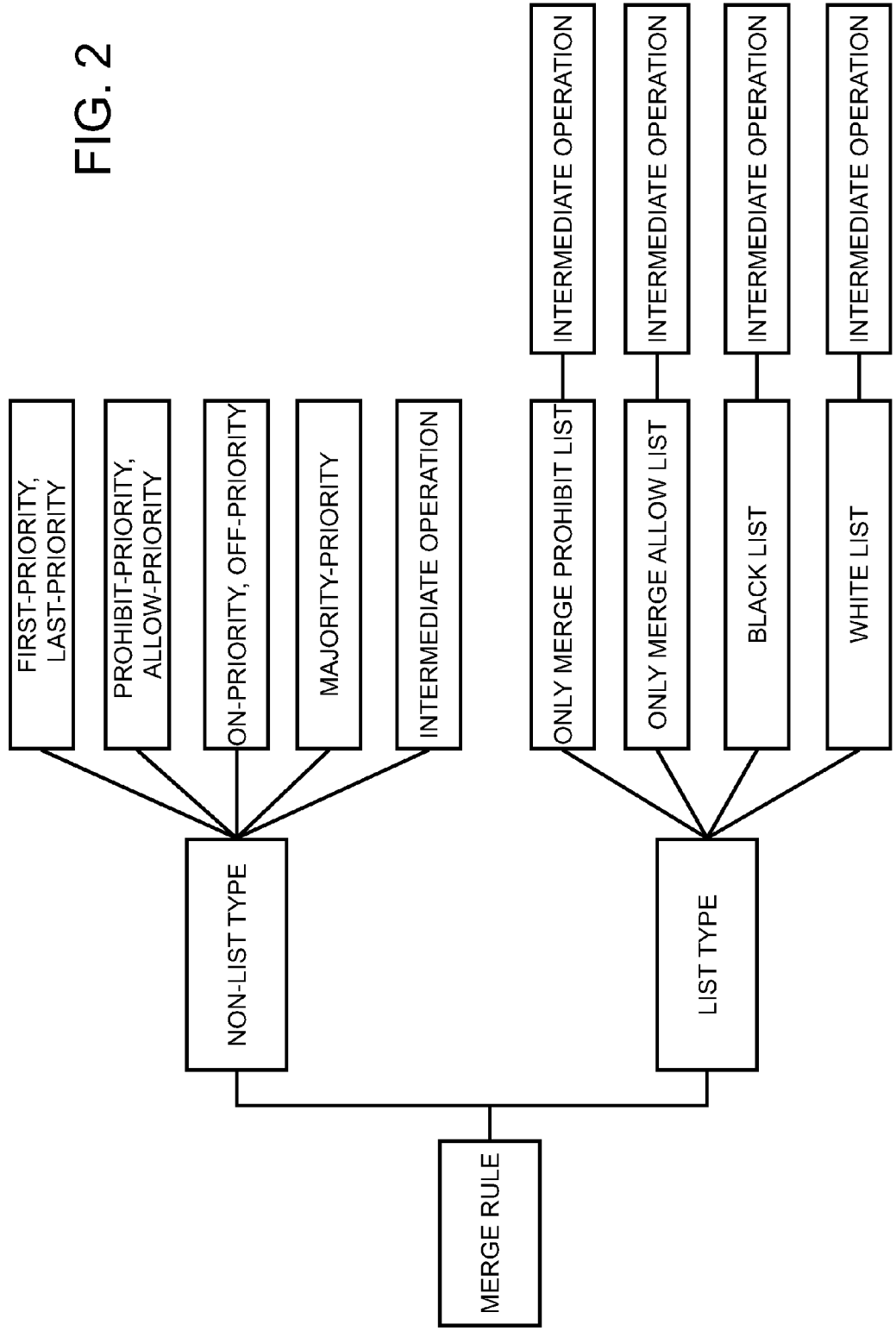

FIG. 3

| # | PHASE | ALLOW LIST ITEMS | PROHIBIT LIST ITEMS | MERGE RESULT | OPERATION |
|---|---|---|---|---|---|
| 1 | I | YES (ALLOW) | NO (ULTIMATELY ALLOW) | RESIDUAL | ALLOW |
| 2 | I | YES (ALLOW) | YES (PROHIBIT) | NON-RESIDUAL | PROHIBIT |
| 3 | I | NO (ULTIMATELY PROHIBIT) | NO (ULTIMATELY ALLOW) | NON-RESIDUAL | PROHIBIT |
| 4 | I | NO (ULTIMATELY PROHIBIT) | YES (PROHIBIT) | NON-RESIDUAL | PROHIBIT |
| 5 | II | YES (ALLOW) | NO (ULTIMATELY ALLOW) | RESIDUAL | ALLOW |
| 6 | II | YES (ALLOW) | YES (PROHIBIT) | INTERMEDIATE OPERATION | INTERMEDIATE OPERATION |
| 7 | II | NO (ULTIMATELY PROHIBIT) | NO (ULTIMATELY ALLOW) | NON-RESIDUAL | PROHIBIT |
| 8 | II | NO (ULTIMATELY PROHIBIT) | YES (PROHIBIT) | NON-RESIDUAL | PROHIBIT |

FIG. 4

| SETTABLE ITEMS BY TARGET FUNCTION ||
|---|---|
| TARGET FUNCTION | ALLOWABLE ITEMS |
| LOG ACQUISITION FUNCTION | ON-PRIORITY |
| | LAST-PRIORITY |
| LIST FUNCTION | LAST-PRIORITY |
| | ADD (OR) |
| | ADD (AND) |
| | ADD (INTERMEDIATE OPERATION) |
| PROHIBIT FUNCTION | PROHIBIT-PRIORITY |
| | ALLOW-PRIORITY |
| | INTERMEDIATE OPERATION |
| OPERATION SETTING FUNCTION | ADD |
| | FIRST-PRIORITY |
| | LAST-PRIORITY |
| | SETTING-PRIORITY |
| | MAXIMUM VALUE-PRIORITY |
| | MINIMUM VALUE-PRIORITY |

FIG. 8

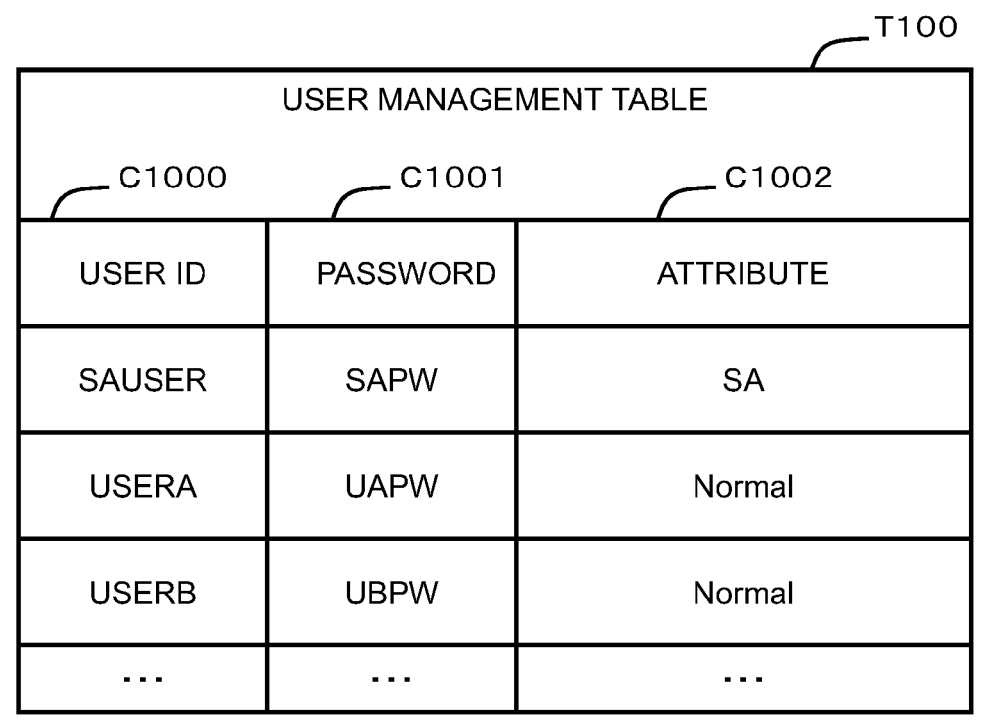

| USER MANAGEMENT TABLE | | |
|---|---|---|
| C1000 | C1001 | C1002 |
| USER ID | PASSWORD | ATTRIBUTE |
| SAUSER | SAPW | SA |
| USERA | UAPW | Normal |
| USERB | UBPW | Normal |
| ... | ... | ... |

MERGE RULE TABLE T101

| | C1010 | C1011 | C1012 | C1013 | C1014 | ... | C1015 | C1016 | C1017 |
|---|---|---|---|---|---|---|---|---|---|
| | RULE NAME | SAID | PW | ITEM ID | RULE | ... | ITEM ID | EXCEPTION | RULE |
| | RULE A | SAUSER | SAPW | OPERATION LOG | ON-PRIORITY | ... | INHIBIT PRINT | Manager A | INTER-MEDIATE OPERATION |
| | RULE B | SAUSER | SAPW | OPERATION LOG | LAST-PRIORITY | ... | INHIBIT PRINT | Manager A | ALLOW-PRIORITY |
| | ... | ... | ... | ... | ... | ... | ... | ... | ... |

FIG. 11

CLIENT MANAGEMENT TABLE (T103)

| CLIENT NAME (C1030) | HOST NAME (C1031) | IP ADDRESS (C1032) | NEXT HIGHER-LEVEL MANAGER NAME (C1033) | NUMBER OF USERS (C1034) | USER A (C1035) | ... | USER D (C1036) | MERGE RULE (C1037) |
|---|---|---|---|---|---|---|---|---|
| Client A | CIPC_A | 10.208.xxx.xxx | SA Manager | 4 | POLICY A/0001 | ... | POLICY D/0003 | RULE A |
| Client B | CIPC_B | 10.208.xxx.xxx | Manager A | 4 | None | ... | POLICY D/0003 | RULE A |
| Client C | CIPC_C | 10.208.xxx.xxx | Manager B | 4 | POLICY A/0001 | ... | None | RULE B |

POLICY TABLE

| MANAGER NAME (C1040) | USER ID (C1041) | POLICY NAME (C1042) | GENERATION (C1043) | RESULT NOTIFICATION (C1044) |
|---|---|---|---|---|
| Manager A | USER A | POLICY A | 0001 | OFF |
| Manager A | USER B | POLICY B | 0003 | ON |

| | SETTING ID (C1045(1)) | SETTING (C1046(1)) | SETTING ID (C1045(2)) | SETTING (C1046(2)) |
|---|---|---|---|---|
| ~ | PC OPERATION LOG | ON | FILE OPERATION LOG | ON |
| | PC OPERATION LOG | OFF | FILE OPERATION LOG | ON |

| | SETTING ID (C1045(3)) | TARGET (C1046(3)) | SETTING ID (C1045(4)) | SETTING (C1046(4)) |
|---|---|---|---|---|
| ~ | INHIBIT SOFTWARE BOOT | ABC.exe GHI.exe | PROHIBIT EXTERNAL MEDIA USE | OFF |
| | INHIBIT SOFTWARE BOOT | DEF.exe JKL.exe | PROHIBIT EXTERNAL MEDIA USE | ON |

FIG.13

POLICY APPLICATION RESULT TABLE — T105

| USER ID (C1050) | COLLECTION DATE/TIME (C1051) | PER-CLIENT INFORMATION SET C1052(1) | PER-CLIENT INFORMATION SET C1052(2) | ... | PER-CLIENT INFORMATION SET C1052(n) |
|---|---|---|---|---|---|
| USER A | 2009/07/15 11:25:00 | Client A | Client C | ... | Client Z |
| USER B | 2009/07/15 11:25:00 | Client K | Client Y | ... | None |

FIG. 14

C1052 — PER-CLIENT INFORMATION SET

| CLIENT NAME (C10520) | STORAGE DATE/TIME (C10521) | POLICY NAME/ GENERATION (C10522) | PER-SETTING INFORMATION SET (C10523) |
|---|---|---|---|
| Client A | 2009/07/15 11:40 | POLICY A/0001 | PC OPERATION LOG<br>FILE OPERATION LOG<br>WEB ACCESS LOG<br>INHIBIT SOFTWARE BOOT<br>⋮ |

FIG. 15

PER-SETTING INFORMATION SET — C10523

| FUNCTION ID — C105230(1) | POLICY SETTING — C105231(1) | APPLICATION RESULT — C105232(1) |
|---|---|---|
| PC OPERATION LOG | OFF | ON |

| FUNCTION ID — C105230(2) | POLICY SETTING — C105231(2) | APPLICATION RESULT — C105232(2) |
|---|---|---|
| INHIBIT SOFTWARE BOOT | ABC.exe /DEF.exe /GHI.exe | INHIBIT /ALLOW /INTERMEDIATE |

| FUNCTION ID — C105230(3) | POLICY SETTING — C105231(3) | APPLICATION RESULT — C105232(3) |
|---|---|---|
| PROHIBIT EXTERNAL MEDIA USE | ON | INTERMEDIATE |

| FUNCTION ID — C105230(4) | POLICY SETTING — C105230(4) | APPLICATION RESULT — C105230(4) |
|---|---|---|
| INHIBIT PRINT RELEASE PW | PrintOK | PrintOK |

FIG. 16

| CLIENT OPERATION RESULT TABLE | | | | | T106 |
|---|---|---|---|---|---|
| C1060 | C1061 | C1062 | C1062 | | C1062 |
| CLIENT NAME | LOG ID | LOG | LOG | ... | LOG |
| Client A | PRINT LOG | | | ... | |
| Client B | FILE COPY | | | ... | |
| ... | ... | ... | ... | ... | ... |
| Client B | INHIBIT BOOT | | | ... | |
| Client C | PROCESS BOOT | | | ... | |

SYSTEM CONFIGURATION TABLE

| NUMBER OF HIERARCHIES (C1070) | NEXT HIGHER-LEVEL MANAGER (C1071) | TYPE (C1072) | NAME (C1073) |
|---|---|---|---|
| 1 | SA Manager | Manager | Manager A |
| 1 | SA Manager | Manager | Manager B |
| 1 | SA Manager | Manager | Manager C |
| 1 | SA Manager | Client | Client A |
| 1 | SA Manager | Client | Client B |
| ... | ... | ... | ... |
| 2 | Manager A | Manager | Manager D |
| 2 | Manager B | Client | Client C |
| 2 | Manager A /Manager B | Client | Client D |
| 2 | Manager A /Manager C | Manager | Manager E |
| 2 | Manager C | Client | Client E |
| 2 | Manager C | Client | Client F |
| ... | ... | ... | ... |
| 3 | Manager D | Client | Client G |
| ... | ... | ... | ... |

FIG. 21

| USER MANAGEMENT TABLE | T100M |
|---|---|
| C1000 | C1001 |
| USER ID | PASSWORD |
| SAUSER | SAPW |
| USERA | UAPW |
| USERB | UBPW |
| ... | ... |

FIG. 23

CLIENT MANAGEMENT TABLE T103M

| CLIENT NAME | HOST NAME | IP ADDRESS | NEXT HIGHER-LEVEL MANAGER NAME | NUMBER OF USERS | USER A | ... | USER D |
|---|---|---|---|---|---|---|---|
| Client A | CIPC_A | 10.208.xxx.xxx | SA Manager | 4 | POLICY A/0001 | ... | POLICY D/0003 |
| Client B | CIPC_B | 10.208.xxx.xxx | Manager A | 4 | None | ... | POLICY D/0003 |
| Client C | CIPC_C | 10.208.xxx.xxx | Manager B | 4 | POLICY A/0001 | ... | None |

| | | T108 |
|---|---|---|
| HIGHER-LEVEL INFORMATION TABLE | | |
| C1080 | C1081 | C1082 |
| MANAGER NAME | HOST NAME | IP ADDRESS |
| Manager A | MaPC_A | 10.xxx.xxx.xxx |
| Manager B | MaPC_B | 10.xxx.xxx.xxx |

FIG. 28

MERGE RULE TABLE T201

| RULE NAME (C2010) | SAID (C2011) | PW (C2012) | ITEM ID (C2013) | RULE (C2014) | ... | ITEM ID (C2015) | EXCEPTION (C2016) | RULE (C2017) |
|---|---|---|---|---|---|---|---|---|
| RULE A | SAUSER | SAPW | OPERATION LOG | ON-PRIORITY | ... | INHIBIT PRINT | Manager A | INTER-MEDIATE OPERATION |

RECEIVED POLICY TABLE

| MANAGER NAME (C2020) | USER ID (C2021) | POLICY NAME (C2022) | GENERATION (C2023) | RESULT NOTIFICATION (C2024) |
|---|---|---|---|---|
| Manager A | USER A | POLICY A | 0001 | OFF |
| Manager A | USER B | POLICY B | 0003 | ON |

| SETTING ID (C2025(1)) | SETTING (C2026(1)) | SETTING ID (C2025(2)) | SETTING (C2026(2)) |
|---|---|---|---|
| PC OPERATION LOG | ON | FILE OPERATION LOG | ON |
| PC OPERATION LOG | OFF | FILE OPERATION LOG | ON |

| SETTING ID (C2025(3)) | TARGET (C2026(3)) | SETTING ID (C2025(4)) | SETTING (C2026(4)) |
|---|---|---|---|
| INHIBIT SOFTWARE BOOT | ABC.exe GHI.exe | PROHIBIT EXTERNAL MEDIA USE | OFF |
| INHIBIT SOFTWARE BOOT | DEF.exe JKL.exe | PROHIBIT EXTERNAL MEDIA USE | ON |

MERGE POLICY TABLE

| SETTING ID (C2030(1)) | SETTING (C2031(1)) | SETTING ID (C2030(2)) | SETTING (C2031(2)) |
|---|---|---|---|
| PC OPERATION LOG | ON | FILE OPERATION LOG | ON |

| SETTING ID (C2030(3)) | TARGET (C2031(3)) | SETTING ID (C2030(4)) | SETTING (C2031(4)) |
|---|---|---|---|
| INHIBIT SOFTWARE BOOT | ABC.exe GHI.exe | PROHIBIT EXTERNAL MEDIA USE | OFF |

FIG. 33

OPERATION RESULT TABLE (FILE OPERATION LOG) — T206

| C2060 DATE/TIME | C2061 TYPE | C2062 SOURCE | C2063 DESTINATION | C2064 FILE NAME | C2065 LOGIN USER NAME |
|---|---|---|---|---|---|
| 20090901 12:01:00 | FILE CREATE | C:¥temp | None | Test.txt | CLUSER1 |
| 20090901 13:25:34 | FILE DELETE | C:¥temp | None | Test2.txt | CLUSER1 |
| ... | ... | ... | ... | ... | ... |
| 20090901 15:05:07 | FOLDER MOVE | C:¥temp | D:¥temp | Sample | CLUSER1 |

— # COMPUTER SYSTEM, MANAGEMENT SYSTEM AND RECORDING MEDIUM

TECHNICAL FIELD

The present invention relates to a computer system, a management system and a recording medium.

BACKGROUND ART

A technology, which sets a security policy in each computer and prohibits the booting up of a computer that violates the security policy in order to prevent the leakage of corporate secrets to the outside from computers used by employees, is known (Patent Literature 1).

CITATION LIST

Patent Literature

[PTL 1]
Japanese Patent Application Laid-open No. 2009-230178

SUMMARY OF INVENTION

Technical Problem

The prior art is premised on uniform security policies being set in each computer, and does not take into consideration at all a case in which respectively different security policies are set by a plurality of administrators. In the prior art, there is absolutely no disclosure as to how to realize security management of a computer that is managed by a plurality of administrators.

Therefore, the problem with the prior art is that it is not possible to achieve a good balance between security maintenance and usability in a system when a plurality of administrators are able to respectively manage a single computer.

Accordingly, an object of the present invention is to provide a computer system, a management system and a recording medium that make it possible to set a plurality of security policies in a client computer, and to manage the security of the client computer based on a new security policy produced from these security policies in accordance with a prescribed rule.

Another object of the present invention is to provide a computer system, a management system and a recording medium via which a plurality of users are able to set respectively different security policies in a client computer, and, in addition, only a prescribed user is able to set a rule in the client computer for creating a new security policy from the respective security policies, and also, in a case where either all or a portion of the security policies set by the respective users are incompatible, it is possible to perform a preset intermediate operation on the client computer. Other objects of the present invention should become clear from the description of the embodiment that follows.

Solution to Problem

A computer system in accordance with a first aspect of the present invention for solving the above-mentioned problems is a computer system in which a client computer, a first management computer and a second management computer are communicably coupled to one another, the first management computer sends, to the client computer, first security policy information for controlling the operation of a security management program of the client computer, and rule information denoting a rule for creating second security policy information from a plurality of pieces of the first security policy information, the second management computer sends, to the client computer, other first security policy information in which the control operation differs from that of the first security policy information sent to the client computer from the first management computer, and the client computer creates, on the basis of the rule information received from the first management computer, the second security policy information from the first security policy information received from the first management computer and the other first security policy information received from the second management computer, and controls the operation of the security management program based on the second security policy information.

In a second aspect according to the first aspect, the client computer respectively detects a difference between the second security policy information and the first security policy information sent to the client computer from the first management computer, and a difference between the second security policy information and the other first security policy information sent to the client from the second management computer, and outputs the detected differences.

In a third aspect according to the first aspect, the rule information is able to create the second security policy information to execute an intermediate operation which is preset as an operation that is intermediate between the control operation and the other control operation, in a case where the control operation of the first security policy information received from the first management computer and the other control operation of the other first security policy information received from the second management computer are incompatible.

In a fourth aspect according to the first aspect, the rule information is able to be configured so as to permit, with a prescribed condition, the operation of a prescribed computer program that is executed on the client computer, in a case where either one of the first security policy information or the other first security policy information prohibits an operation and the remaining other allows the operation with respect to the prescribed computer program.

In a fifth aspect according to the first aspect, the first management computer is operated by a plurality of first users and is configured to be able to create the first security policy information for each of the first users, the second management computer is operated by a plurality of second users and is configured to be able to create the other first security policy information for each of the second users, and only a preset prescribed first user from among the respective first users is able to create the rule information.

A recording medium according to another aspect records, in a computer readable and executable format, a computer program for realizing on this computer a function to create a plurality of pieces of first security policy information for controlling the operation of a security management program of the client computer, a function to create rule information denoting a rule for creating second security policy information from the respective pieces of first security policy information, and a function to send the respective pieces of first security policy information and the rule information to the client computer, to thereby create the second security policy information from the respective pieces of first security policy information based on the rule information inside the client computer, and to control the operation of the security management program based on the created second security policy information.

Furthermore, other combinations besides the combinations of the above-mentioned aspects are also included within the scope of the present invention.

BRIEF DESCRIPTION OF DRAWINGS

[FIG. 1]
FIG. 1 is a diagram showing an overview of the entire system.
[FIG. 2]
FIG. 2 is a diagram for illustrating the configuration of a merge rule.
[FIG. 3]
FIG. 3 is a diagram showing an example of a merge rule application result.
[FIG. 4]
FIG. 4 is a diagram showing an example of a settable merge rule for each function.
FIG. 5 is a diagram showing the hardware configuration of a management server.
FIG. 6 is a diagram showing the program configuration of a highest-level management server.
FIG. 7 is a diagram showing the table configuration of the highest-level management server.
[FIG. 8]
FIG. 8 is a diagram showing a user management table.
[FIG. 9]
FIG. 9 is a diagram showing a merge rule table.
FIG. 10 is a diagram showing a manager management table.
[FIG. 11]
FIG. 11 is a diagram showing a client management table.
[FIG. 12]
FIG. 12 is a diagram showing a policy table.
[FIG. 13]
FIG. 13 is a diagram of a table showing the results of applying a plurality of policies.
[FIG. 14]
FIG. 14 is a diagram of a table configuring a portion of FIG. 13.
[FIG. 15]
FIG. 15 is a diagram of a table configuring a portion of FIG. 14.
[FIG. 16]
FIG. 16 is a table for managing a client computer operation log.
[FIG. 17]
FIG. 17 is a table showing the configuration of the system.
FIG. 18 is an example of a screen for creating a merge rule.
FIG. 19 is a diagram showing the management server program configuration.
FIG. 20 is a diagram showing the management server table configuration.
[FIG. 21]
FIG. 21 is a diagram showing a user management table.
FIG. 22 is a diagram showing a manager management table.
[FIG. 23]
FIG. 23 is a diagram showing a client management table.

[FIG. 24]
FIG. 24 is a table for managing a higher-level device.
FIG. 25 is a table for managing a manager name.
FIG. 26 shows a client computer program configuration.
FIG. 27 shows a client computer table configuration.
[FIG. 28]
FIG. 28 is a table for managing a merge rule.
[FIG. 29]
FIG. 29 is a table for managing a received policy.
[FIG. 30]
FIG. 30 is a table for managing a merged policy.
FIG. 31 is a table showing the result of applying a plurality of policies.
FIG. 32 is a table for managing a client computer name.
[FIG. 33]
FIG. 33 is a table for managing an operation log of the client computer.
FIG. 34 is a flowchart showing the process when logging in to the highest-level management server.
FIG. 35 is a flowchart showing a GUI process of the highest-level management server.
FIG. 36 is a flowchart of a communication supervision process.
FIG. 37 is a flowchart of a user management process.
FIG. 38 is a flowchart of a merge rule create process.
FIG. 39 is a flowchart of a manager management process.
FIG. 40 is a flowchart showing a portion of FIG. 39.
FIG. 41 is a flowchart showing another portion of FIG. 39.
FIG. 42 is a flowchart of a process for changing manager information.
FIG. 43 is a flowchart of a client management process.
FIG. 44 is a flowchart showing a portion of FIG. 43.
FIG. 45 is a flowchart showing another portion of FIG. 43.
FIG. 46 is a flowchart showing yet another portion of FIG. 43.
FIG. 47 is a flowchart of a policy create process.
FIG. 48 is a flowchart showing a process for delivering a merge rule and policy to the client computer.
FIG. 49 is a flowchart showing a process for collecting a plurality of policy application results from the client computer.
FIG. 50 is a flowchart showing a process for collecting an operation log from the client computer.

FIG. 51 is a flowchart showing a process for displaying the operation log of the client computer.

FIG. 52 is a flowchart showing a process for managing a system configuration.

FIG. 53 is a flowchart showing a portion of FIG. 52.

FIG. 54 is a flowchart showing another portion of FIG. 52.

FIG. 55 is a flowchart showing a process for displaying the system configuration.

FIG. 56 is a flowchart showing a process for logging in to the management server.

FIG. 57 is a flowchart showing a process for supervising an operation of the client computer.

FIG. 58 is a flowchart showing a process for storing a merge rule.

FIG. 59 is a flowchart showing a process for storing a received policy.

FIG. 60 is a flowchart showing a portion of FIG. 59.

FIG. 61 is a flowchart showing a process for merging a plurality of policies.

FIG. 62 is a flowchart showing a portion of FIG. 61.

FIG. 63 is a flowchart showing a portion of FIG. 62.

FIG. 64 is a flowchart showing a process for applying a policy to a security management function group.

FIG. 65 is a flowchart showing a process for storing a policy application result.

FIG. 66 is a flowchart showing a process for uploading a client computer operation log to the management server.

FIG. 67 is a flowchart showing a security management process.

DESCRIPTION OF EMBODIMENTS

Figure 5:
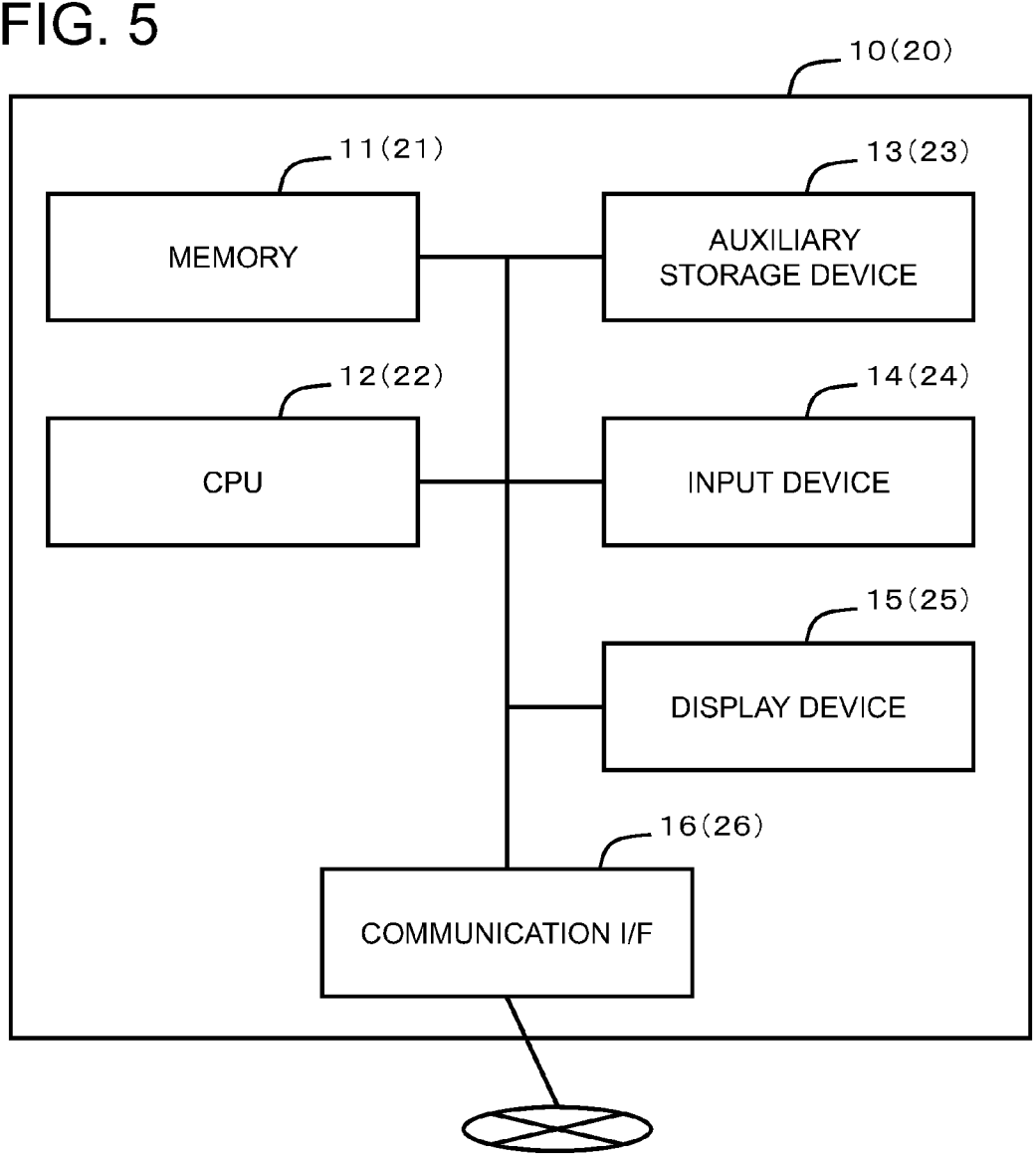
[FIG. 5]

The embodiments of the present invention will be explained below on the basis of the drawings. The present invention, as will be described hereinbelow, is such that either one or a plurality of client computers 20 is managed by a management server 10, and each management server 10 is able to independently set a security policy in the client computer 20.

The client computer 20 creates one security policy from a plurality of security policies based on a merge rule delivered from a highest-level management server 10 (Msa). The client computer 20 creates a new security policy by adjusting the setting value of each item included in each security policy in accordance with the merge rule. The client computer 20 controls the operation of a computer program in accordance with the new security policy.

A new security policy is created by each client computer 20, and security is managed by each client computer 20. In accordance with this, each management server 10 is able to set a respectively different security policy in each client computer 20, and is also able to apply a uniform rule to the entire system. It is therefore possible to make good usability compatible with the maintenance of security performance.

EXAMPLE 1

FIG. 1 shows an overview of an entire computer system of this embodiment. The computer system comprises a plurality of management servers 10 and a plurality of client computers 20. One management server 10 (Msa) from among the plurality of management servers 10 is the highest-level management server that serves as a "first management computer". The other management servers 10 (Ma, Mb, Mc, Md) are management servers that serve as "second management computers". In the following explanation, the highest-level management server 10 (Msa) may be called the SA server.

A hierarchical structure that has the highest-level management server 10 (Msa) as the apex is employed. The highest-level management server 10 (Msa) is coupled to mid-level management servers 10 (Ma, Mb, Mc) via a first communication network CN1. The respective management servers 10 (Msa, Ma through Md) are each capable of being used by a plurality of users (administrators). A prescribed user from among the plurality of users capable of using the highest-level management server 10 (Msa) is the highest-level user and is able to create a merge rule, which will be described hereinbelow.

The mid-level management servers 10 (Mc, Mc) are coupled to a client computer 20 (Cb) via a second communication network CN2. The mid-level management server 10 (Ma) is coupled to the lowest-level management server 10 (Md) via the second communication network CN2. The lowest-level management server 10 (Md) is coupled to a client computer 20 (Ca) via a third communication network CN3.

The highest-level management server 10 (Msa) is coupled in series to the respective management servers 10 (Ma, Md). The highest-level management server 10 (Msa) is coupled in parallel to the respective management servers (Mb, Mc). Furthermore, it is also possible to provide a client computer 20 that is managed directly by the highest-level management server 10 (Msa).

The respective communication networks CN1, CN2, CN3 may each be configured as a different communication network, or may be configured as the same communication network. The highest-level management server 10 (Msa) is capable of two-way communications with the respective management servers (Ma, Mb, Mc, Md) and the respective client computers 20 (Ca, Cb).

The highest-level management server 10 (Msa) comprises a function for creating a merge rule and setting this rule in each client computer 20, and a function for creating a security policy (hereinafter, policy) and delivering this policy to each client computer 20.

The other management servers 10 (Ma through Md) comprise a function for creating policies and delivering these policies to each client computer 20, but do not comprise a function for creating a merge rule and setting this rule in each client computer 20.

The other functions provided in the respective management servers 10 (Msa, Ma through Md) will be described below. The merge rule is an example of "rule information", and the policies Pa through Pd created by the respective management servers 10 are examples of "first security policies".

Each client computer 20 stores the policies received from the plurality of management servers 10 that manage the respective client computers 20. Since the highest-level management server 10 (Msa) manages all of the client computers 20, a policy Ps created by the highest-level management server 10 (Msa) is stored in all client computers 20 in the system.

The one client computer 20 (Ca) is also managed by two management servers 10 (Ma, Md) other than the highest-level management server 10 (Msa). Therefore, in addition to the policy Ps, the client computer 20 (CA) also stores the policy Pa received from the management server 10 (Ma) and the policy Pd received from the management server 10 (Md). That is, in addition to the policy Ps from the highest-level management server 10 (Msa), the one client computer 20 (Ca) also stores the policies Pa, Pd, which are respectively created by the plurality of management servers 10 (Ma, Md) that exist in the same system.

The other client computer 20 (Cb) is also managed by two management servers 10 (Mb, Mc) other than the highest-level management server 10 (Msa). Therefore, in addition to the policy Ps, the client computer 20 (CA) also stores the policy Pb received from the management server 10 (Mb) and the policy Pc received from the management server 10 (Mc). That is, in addition to the policy Ps from the highest-level management server 10 (Msa), the other client computer 20 (Cb) also stores the policies Pb, Pc, which are respectively created by the plurality of management servers 10 (Mb, Mc) that exist on a different system.

The client computer 20 creates a new policy by merging in accordance with the merge rule the policies received from the respective management servers 10 that manage it. The client computer 20 operates a security management program (a security management function group P207 to be described below) based on the new policy.

The new policy is an example of a "second security policy". Due to space constraints, security management program is abbreviated as "security" in FIG. 1. Merge, for example, signifies the adjusting of setting values based on the setting contents of a plurality of policies (control operation items).

Details will be explained below, but the client computer 20 creates one new policy from a plurality of policies in accordance with the merge rule. The merge rule may only be set by the highest-level management server 10 (Msa). Therefore, the merge rule makes it possible to ensure the minimum security performance required for the new policies provided by the respective client computers 20 in the system.

FIG. 2 is an illustration schematically showing the content of the merge rule. The merge rule for adjusting a plurality of control operations with respect to the same function may be configured as follows. The function settings, for example, may be classified as non-list type and list type.

A non-list-type function setting refers to a function, which has one operand and which does not comprise a list. For example, in a case where the function operand is "print function", either one of two values, i.e., "print enabled" or "print prohibited", is used. In a case where the function usage is "operation log acquisition", either one of two values, i.e., "log acquired" or "log not required", is used.

List-type function setting refers to a function, which has a plurality of operands, and which comprises a list of operands. For example, in a case where a computer program is prohibited from running, it is possible to make a setting that prohibits the running of a computer program that is listed on any of a plurality of prohibit lists. Further, for example, it is also possible to make a setting that only runs a computer program that is redundantly listed on each of a plurality of allow lists.

In the case of a non-list-type function setting, the below rules may be used. However, the present invention is not limited to the following rules.

(A1) First-priority: This rule places priority on the setting value that is set first. For example, this rule is used in a case where only the initially set password is to be regarded as valid.

(A2) Last-priority: This rule places priority on the policy that is set last. This rule overwrites an old setting value with a new setting value. For example, this rule is used in a case where only the most recent password is to be regarded as valid.

(A3) Prohibit-priority: This rule places priority on prohibit more than allow.

(A4) Allow-priority: This rule places priority on allow more than prohibit.

(A5) ON-priority: This rule places priority on the ON state more than the OFF state.

(A6) OFF-priority: This rule places priority on the OFF state more than the ON state.

(A7) Setting-prohibited: This rule prohibits the changing of an initial setting value.

(A8) Majority-priority: This rule conforms to a number of policies that have the same setting values from among a plurality of policies.

(A9) Intermediate operation: In the case of a relationship in which the setting values of the respective policies are incompatible, this rule performs an operation that is intermediate between the respective policy setting values. For example, in a case where the one setting is "program run prohibited" and the other setting is "program run allowed", for example, it is possible to carry out an intermediate operation, such as "allow program run and acquire log" or "allow program run for a prescribed time only". The intermediate operation, for example, is a rule for setting a value that is intermediate between prohibit and allow. This rule may also be defined as a rule for setting either a conditional allow or a conditional prohibit.

(A10) List: This rule lists up the respective policy setting values, and allows (or prohibits) all the setting values placed on the list. For example, in a case where one policy allows the running of program A and another policy allows the running of program B, a list that allows the running of program A and program B is created. In addition to these rules, rules such as add (OR) and add (AND), which will be described below, may also be used.

In the case of a list-type function setting, there may be cases in which control is possible using a list that comprises respectively different attributes for a single function. For example, there may be cases where two lists, such as a prohibit list related to a certain function and an allow list related to this function, are used to control the operation of this function.

Therefore, in this embodiment, rules will be considered in categories of list attributes and list contents. The list attributes rule will be called Phase 1 (Ph. 1), and the list contents rule will be called Phase 2 (Ph. 2). For ease of explanation, the two attributes of prohibit list and allow list will be given and explained here as examples.

The following four rules, for example, are the Phase 1 rules.

(Ph. 1A) Merge only prohibit lists.
(Ph. 1B) Merge only allow lists.
(Ph. 1C) Use allow list as base to merge the allow list and the prohibit list (black list).
(Ph. 1D) Use prohibit list as base to merge the allow list and the prohibit list (black list).

The Phase 2 rules, for example, are as follows. Any of the following three rules, i.e., (Ph. 2AB1), (Ph. 2AB2), and (Ph. 2AB3), may be applied to the Phase 1 rules (Ph. 1A) and (Ph. 1B).

(Ph. 2AB1) This rule keeps only an item listed on all the lists.

(Ph. 2AB2) This rule keeps an item listed on either list.

(Ph. 2AB3) This rule sets an intermediate operation for an item listed on either list. For example, an intermediate control operation, such as allow to run but acquire log as well, is carried out for a program that is listed on either list.

Either of the following two rules, i.e., (Ph. 2CD1) and (Ph. 2CD2), may be applied to the other Phase 1 rules (Ph. 1C) and (Ph. 1D).

(Ph. 2CD1) This rule either keeps only an item that is allowed on all the lists, or keeps only an item that is prohibited on all the lists.

(Ph. 2CD2) This rule sets an intermediate operation for an item that is listed on either list.

FIG. 3 shows an example of the results in cases where the allow list and the prohibit list are merged. This will be explained by giving (Ph. 1C) as an example. That is, a case in which the allow list and the prohibit list are merged using the allow list as a base will be explained. FIG. 3 shows a case in which the (Ph. 2CD1) rule is applied from item number 1 (#1 in the drawing. The same holds true below) through item number 4, and the (Ph. 2CD2) rule is applied from item number 5 through item number 8.

For example, in item number 1, a case is shown in which a certain setting item appears on the allow list but does not appear on the prohibit list. The fact that the item does not appear on the prohibit list signifies a case in which the item will be allowed in the end, that is, passively allowed. A setting item that appears on the allow list is passively allowed in accordance with the prohibit list. Therefore, this setting item will be kept subsequent to the merge, and the operation is allowed.

Item number 2 is a case in which a certain setting item is clearly allowed on the allow list even though it is clearly prohibited on the prohibit list. In accordance with this, this setting item will not be kept subsequent to the merge. Therefore, the operation of this setting item is prohibited.

Item number 3 shows a case in which a certain setting item does not appear on either the allow list or the prohibit list. A setting item, which is not clearly shown on the allow list, is a setting item whose operation is passively prohibited. In accordance with this, this setting item is passively prohibited by virtue of the allow list, and is passively allowed by virtue of the prohibit list. Therefore, this setting item will not be kept subsequent to the merge, and operation is prohibited.

Item number 4 shows a case in which a certain setting item appears on the prohibit list without appearing on the allow list. In this case, this setting item is passively prohibited by virtue of the allow list, and is clearly prohibited by virtue of the prohibit list. However, since this setting item does not appear on the allow list to begin with, it is not kept subsequent to the merge. Therefore, in the end, the operation of this setting item is prohibited.

Item number 5 shows a case in which a certain setting item appears on the allow list, but does not appear on the prohibit list. In this case, the operation of this setting item is passively allowed by virtue of the prohibit list. Therefore, since operation is allowed by both lists, this setting item is kept subsequent to the merge.

Item number 6 shows a case in which the same setting item appears on both the allow list and the prohibit list. In accordance with this, since the setting contents are incompatible, an intermediate operation is specified. For example, in a case where external recording media usage is placed on both the allow list and the prohibit list, it is possible to set an intermediate operation that only allows read-only usage.

Item number 7 shows a case in which a certain setting item does not appear on either the allow list or the prohibit list. Since this setting item does not exist in the allow list, it is not kept subsequent to the merge. Therefore, the operation of this setting item is prohibited.

Item number 8 shows a case in which a certain setting item appears only on the prohibit list without appearing on the allow list. Since this setting item does not appear on the allow list, it is not kept subsequent to the merge. Therefore, the operation of this setting item is prohibited.

The explanations of the respective rules hereinabove are given as examples, and do not purport to limit the scope of the present invention to the above examples. In the explanation that follows as well, the scope of the present invention is not limited to the contents of the table structures and flowcharts shown in the drawings.

FIG. 4 is an illustration showing examples that stipulate beforehand the merge rules that are able to be set in accordance with respective types of functions. As described hereinabove, a plurality of merge rules may exist, but not all of this plurality of merge rules may be applied to each of the functions. That is, a merge rule must be selected in accordance with the properties of each function.

Accordingly, in this embodiment, in order to support merge rule editing by a user, a list of merge rules that are able to be set for each type of function is prepared. In the example shown in FIG. 4, the target functions are classified into four types: a "log acquisition function," a "list function", a "prohibit function", and an "operation setting function".

The "log acquisition function" is a function that acquires and saves a log of the operations of the client computer 20. The log acquisition function, for example, may include a function for acquiring a client computer operation log, a function for acquiring a file operation log, and a function for acquiring a Web access log. As items that are able to be set in the log acquisition function, two examples are given here: "ON-priority" and "last-priority". The user is also able to set an item other than those given as examples (for example, "setting prohibited", "majority-priority", and so forth) (Same holds true below).

The "list function" is a function for setting a plurality of monitoring targets, and initiating a prescribed action in a case where a monitoring target runs on the client computer 20. The list function, for example, comprises a function for inhibiting the running of software, and a function for monitoring a process run time. Functions other than these may also be included in the list function.

"Last-priority", "add (OR)", "add (AND)", and "add (intermediate operation)" are given as examples here of the items that are able to be set by the list function. "Add (OR)" is a rule for adding to an existing setting target the last-received new setting target. "Add (AND)" is a rule for only targeting the overlapping portions of the existing setting target and the last-received new setting target. "Add (intermediate operation)" is a rule for prohibiting operation for a target that is clearly prohibited on the prohibit lists of the respective policies, and for setting an intermediate operation for a target that is clearly allowed by one or more allow lists.

In the case of the function that inhibits the running of software, the user, for example, is able to define an intermediate operation like that below. Or, the configuration may be such that intermediate operations are defined beforehand, and the user selects a desired intermediate operation from thereamong.

One example of an intermediate operation allows the running of software and acquires a usage log. Another example of an intermediate operation allows the conditional running of software. For example, there may be a case in which editing and a new creation are allowed, but a data save is prohibited. Yet another example of an intermediate operation allows software to run only for either a prescribed time period or at a prescribed time. Other operations besides these may also be used as an intermediate operation.

In the case of the function for monitoring the process run time, the configuration may be such that it is impossible to set an intermediate operation.

The "prohibit function" is a function for prohibiting a specific operation. The prohibit function, for example, comprises a function that inhibits printing, and a function that prohibits the use of external recording media. The prohibit function may include functions other than these. As items that are able to be set by the prohibit function, for example, "prohibit-priority", "allow-priority" and "intermediate operation" are given here.

In the case of the function that inhibits printing, for example, intermediate operations that are able to be set may include allow printing but acquire and store usage log, allow printing of the first page only, allow printing of only one copy, allow printing of text portion only, allow printing of image portion only, allow printing for prescribed time period only, and allow only monochrome printing.

As the function that prohibits the use of external recording media, for example, allow read from external recording media but prohibit write to external recording media, enable only read/write of data of a prescribed size from external recording media, enable only read/write of data of a prescribed file format from external recording media, and enable use of external recording media only during a prescribed time period may be set.

The "operation setting function" is a function for setting an operation that is compatible with a plurality of functions. The operation setting function, for example, comprises a function for setting a log upload, a function for setting a log file size, and a function for setting a release password for releasing an inhibit-print.

FIG. 5 is a diagram showing the hardware configurations of the management server 10 and the client computer 20. The management server 10 and the client computer 20 are configured as computer devices comprising the configurations described below. Reference signs 11 through 16 denote components of the management server 10, and reference signs 21 through 26 denote components of the client computer 20.

The management server 10 (client computer 20), for example, comprises a memory 11 (21), a microprocessor 12 (22), an auxiliary storage apparatus 13 (23), an input device 14 (15), a display device 15 (25), and a communication interface 16 (26).

The below-described programs are stored in the memory 11 (21). The microprocessor 12 (22) implements the respective processes described below by reading the respective programs from the memory 11 (21) and executing the programs.

The auxiliary storage apparatus 13 (23), for example, is configured as a storage apparatus like either a hard disk drive or a flash memory device. The auxiliary storage apparatus 13 (23) stores a variety of tables, which will be described hereinbelow.

The input device 14 (24), for example, is a device, such as a pointing device, a microphone or the like for inputting a user operation into the computer. The display device 15 (25), for example, is a device, such as a display device, for providing information to the user. A configuration in which information is notified to the user from a speaker using synthesized speech may also be employed.

The communication interface 16 (26) is a circuit for carrying out two-way communications with another computer via the communication network. The communication interface 16 (26) is able to carry out two-way communications with another computer using either or both wired and wireless communications.

The management server 10 does not necessarily have to comprise a user interface that includes an input device 14 and a display device 15. For example, the configuration may be such that an operation terminal for operating the management server 10 is coupled to the management server 10, and an operation from the user is received and notices to the user are issued via this operation terminal. The configuration may also be such that a display terminal and an operation terminal are coupled to the management server 10, or may be such that only the display terminal is coupled to the management server 10 and an operation is performed using the input device 14 of the management server 10. In addition, the management server 10 need not be configured as a single computer device, but rather may be a single management server 10 configured from a plurality of computer devices.

Figure 6:
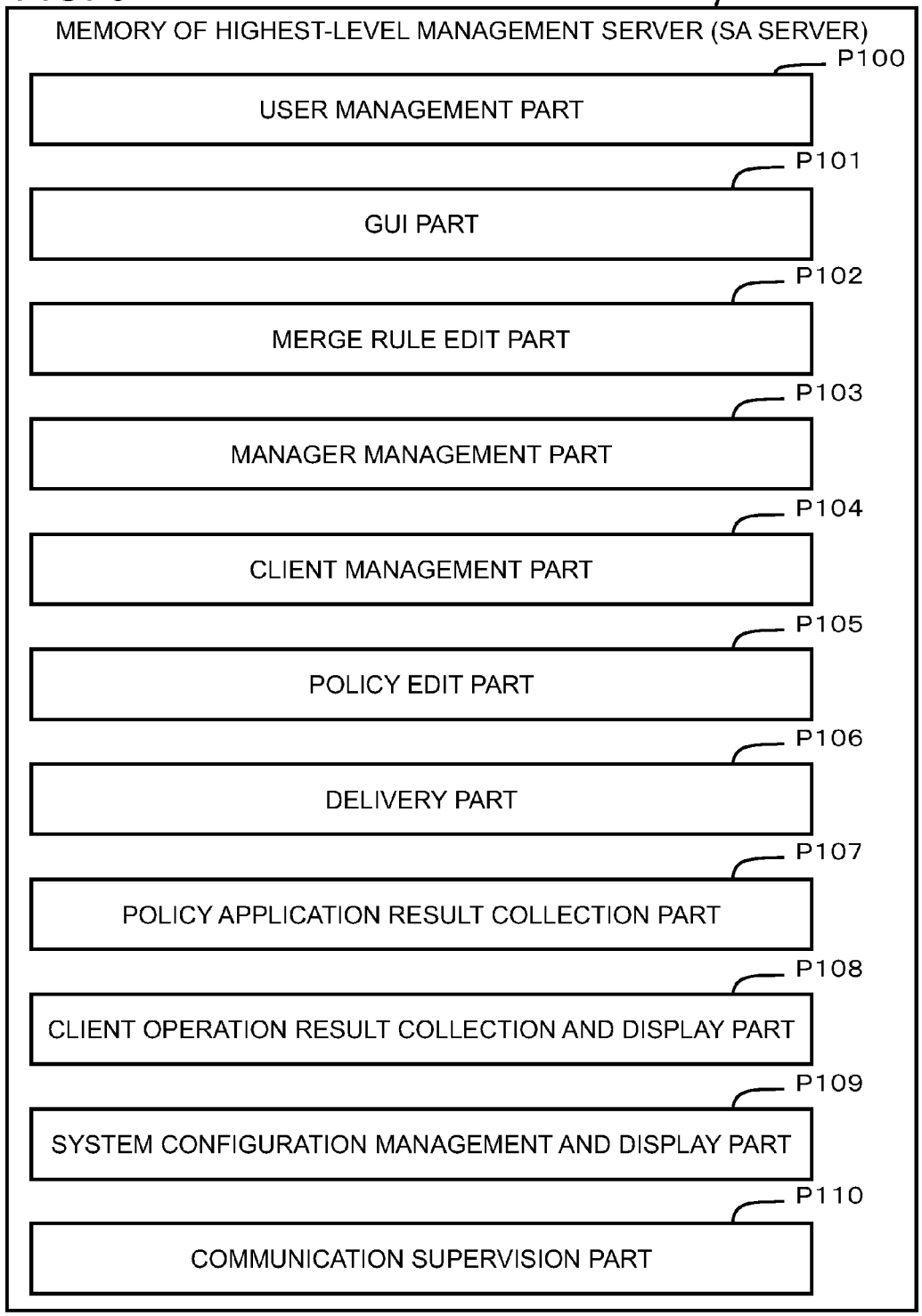
[FIG. 6]

FIG. 6 shows an example of the programs that are stored in the memory 11 of the highest-level management server (SA server). In the following explanation, the sign "SA" will denote the highest-level management server. Therefore, memory 11 (SA) denotes the memory of the highest-level management server, and auxiliary storage apparatus 13 (SA) denotes the auxiliary storage apparatus of the highest-level management server.

The highest-level management server memory 11 (SA), for example, stores a user management part P100, a GUI (Graphical User Interface) part P101, a merge rule edit part P102, a manager management part P103, a client management part P104, a policy edit part P105, a delivery part P106, a policy application result collection part P107, a client operation result collection and display part P108, a system configuration management and display part P109, and a communication supervision part P110.

Each program will be described below together with a flowchart, but a simple overview will be provided first. Furthermore, in the following explanation, in the highest-level management server, the management function capable of setting a merge rule will be called the SA manager, and the user who uses the SA manager will be called the SA user. To ensure security, one user is registered in the system as the SA user.

A user, who is not allowed to use the SA manager, will be called an ordinary user. The ordinary user uses the highest-level management server as an ordinary management server. That is, the ordinary user is able to use the highest-level management server to deliver a policy to the client computer 20 that is directly managed by the highest-level management server. The ordinary user is not able to create a merge rule, or to deliver a merge rule to the respective client computers 20.

The user management part P100 is run via the GUI, and is a program for managing the respective users who use the highest-level management server. As stated hereinabove, there are two types of users who use the highest-level management server, the SA manager and the ordinary user.

The GUI part P101 is the program that is in charge of the GUI portion of the SA manager.

The merge rule edit part P102 is a program that only the SA manager is able to use to create and edit a merge rule.

The manager management part P103 is a program for managing the information of the respective management servers 10 subordinate to the highest-level management server.

The client management part P104 is a program for managing the information of all the client computers 20 subordinate to the highest-level management server (that is, all the client computer inside the computer system).

The policy edit part P105 is a program for creating and editing a policy for delivery to the respective client computers 20.

The delivery part P106 is a program for delivering either a merge rule or a policy to the respective client computers 20. In addition, the delivery part P106 also sends the respective client computers 20 instructions for requesting the application of a policy, and instructions for requesting the upload of an operation result (operation log).

The policy application result collection part P107 collects the result of applying a policy in each client computer 20. As explained above, each client computer 20 creates a new policy based on a merge rule and a plurality of policies received from either the same management server or different management servers. The policy application result collection part P107 collects the new policy created by each client computer 20.

The client operation result collection and display part P108 is a program for collecting the result of a security function operation (operation log) in each client computer 20 and displaying the collected operation result.

Due to space constraints, the program that collects the operation results from the client computer 20 and the program that displays the collected operation result are shown as a single program in FIG. 6. In reality, the program that collects the client operation result and the program that displays the client operation result may be configured separately.

The system configuration management and display part P109 is a program for managing information denoting the configuration of the computer system, and for displaying this information. The system configuration management and display part P109 is also shown as being a single program for convenience sake, but in reality the program for managing the system configuration and the program that displays the system configuration may be configured separately.

The communication supervision part P110 is a program for controlling communications with the other management servers 10 and the respective client computers 20.

Figure 7:
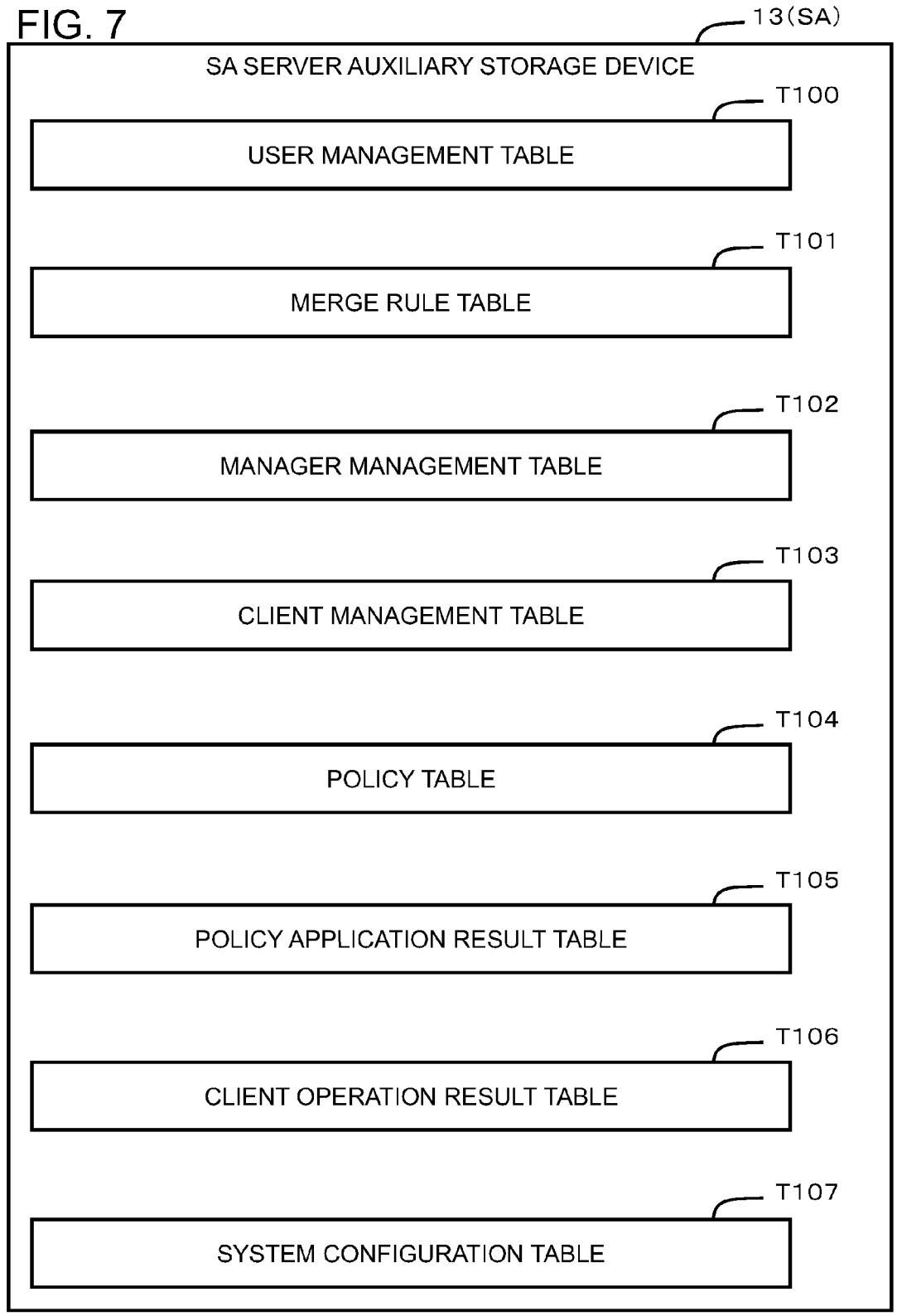
[FIG. 7]

FIG. 7 is an illustration showing the configuration of various tables stored in the SA server auxiliary storage apparatus 13 (SA). The SA server auxiliary storage apparatus 13 (SA), for example, stores a user management table T100, a merge rule table T101, a manager management table T102, a client management table T103, a policy table T104, a policy application result table T105, a client operation result table T106, and a system configuration table T107. Next, the configuration of each table will be explained in detail.

FIG. 8 shows an example of the configuration of the user management table T100 of the SA server. The user management table T100 is for managing the information of the respective users who use the SA server. The user management table T100, for example, comprises a user ID column C1000, a password column C1001, and an attribute column C1002.

In this embodiment, for convenience sake, the ID of the SA user is "SAUSER", and the IDs of the other ordinary users are "USERA" and "USERB". More ordinary user may exist. Only one SA user is set. However, the configuration may be such that a plurality of SA users is set as long as system reliability is able to be maintained.

FIG. 9 shows an example of the configuration of the merge rule table T101. The merge rule is either created or edited by the SA user. The ordinary user is not able to create or edit the merge rule.

The merge rule table T101 is for managing the merge rule created by the SA user. The SA user is able to create a plurality of merge rules. Therefore, for example, it is possible to divide the computer system into a plurality of domains, and to apply one merge rule to the client computer 20 that belongs to the one domain, and to apply the other merge rule to the client computer 20 that belongs to the other domain.

In the example given in FIG. 1, a first merge rule may be applied to the client computer 20 (Ca), and a second merge rule may be applied to the client computer 20 (Cb). Therefore, for example, it is possible to set respectively different merge rules for each company, each division, each section, and each group. When the same policy has been received but the merge rules differ, the policy created inside the client computers 20 will differ. A configuration that makes it possible to set a plurality of merge rules achieves the effect of enabling system operations in accordance with the nature of the respective organizations (company, section, group) that utilize the computer system using respectively applied security policies.

The merge rule table T101, for example, manages a rule name column C1010, a SAID column C1011, a password column C1012, and merge rule contents (C1013, C1014, C1015, C1016, C1017). The merge rule contents comprise an item ID column C1013 (C1015) and a rule column C1014 (C1017). An exception column C1016 may also be set as a merge rule content.

Information for specifying each merge rule is set in the rule name column C1010. The ID of the SA user that created the merge rule is set in the SAID column C1011. Furthermore, in this embodiment, ID, identification information, and name are interchangeable. The password column C1012 shows the password set by the SA user.

Information for specifying a policy setting item is set in the item ID column C1013 (C1015). Setting items, for example, may include client computer operation log, file operation log, Web access log, inhibit-software-run, process run time acquisition, prohibit use of external recording media, inhibit-print, inhibit-print-release password, log upload setting, and log file size.

Information for specifying a rule to be applied to each setting item is set in the rule column C1014 (C1017). The rules, for example, may include first-priority, last-priority, ON-priority, OFF-priority, majority-priority, setting prohibited, prohibit-priority, allow-priority, add (OR), add (AND), add (intermediate operation), maximum value-priority, and minimum value-priority.

A target that constitutes an exception to the setting item is set in the exception column C1016. For example, even in a case where "inhibit-print" has been set, it is possible to allow printing as an exception in accordance with a policy from a specified manager (management server) or a specified user. Or, even when the rule "first-priority" has been set with respect to the password for releasing the inhibit-print, it is still possible to use a password other than the password that was set first to release the inhibit-print as an exception in accordance with a policy created by a specified manager or a specified user.

This embodiment describes a case in which an exception is set in either specified manager or specified user units, but the present invention is not limited to this, and, for example, the configuration may also be such that enables the setting of an exception in accordance with either the type of software installed in the client computer 20, the section to which the client computer 20 belongs, or the job position of the user, who is using the client computer 20.

For example, it is possible to allow printing as an exception only for a specified piece of software from among the respective software installed in the client computer 20. Or, it is possible to allow printing as an exception only in a client computer 20 that belongs to a prescribed section, such as the development section or accounting section. In addition, it is also possible to allow printing as an exception upon an instruction from a user having a specified job position, such as a director or manager.

Figure 10:
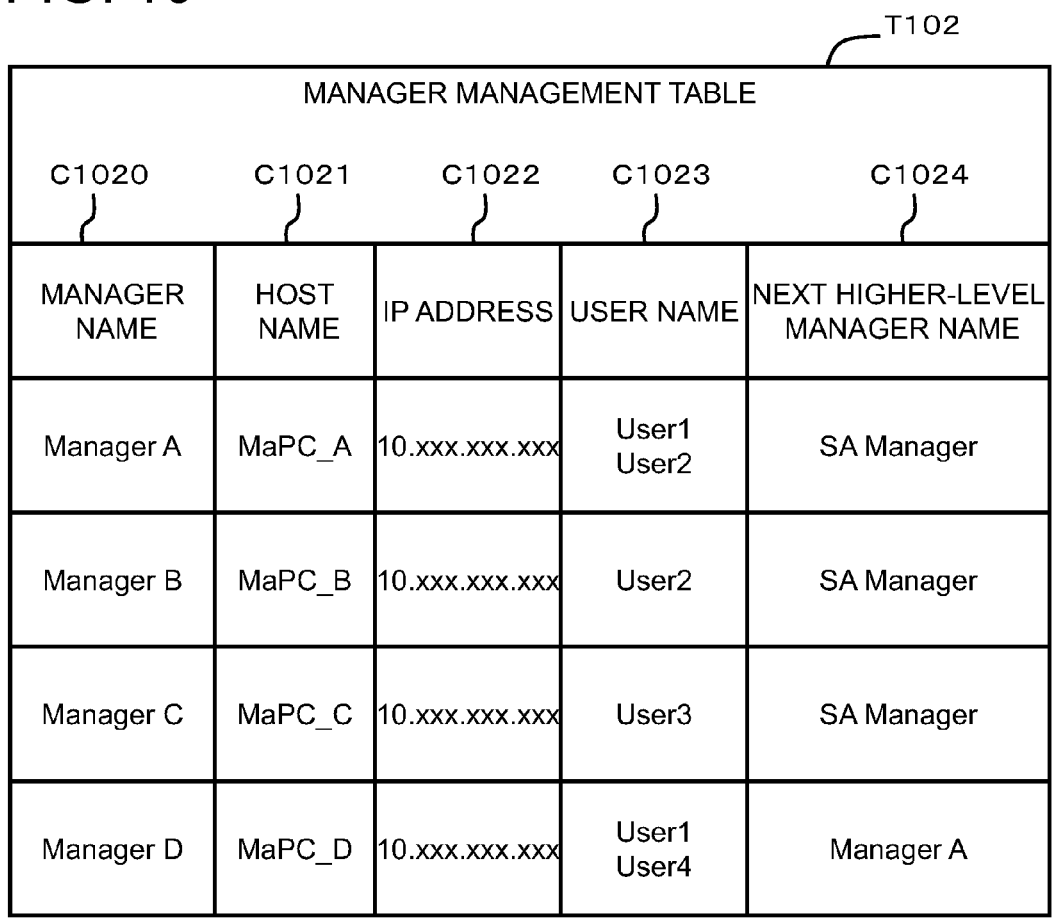
[FIG. 10]

FIG. 10 shows an example of the configuration of the manager management table T102. The manager management table T102 is for managing the information of each manager (an ordinary management server) subordinate to the SA manager, and the information of users who use the respective managers.

The manager management table T102, for example, comprises a manager name column C1020, a host name column C1021, an IP address column C1022, a user name column C1023, and a next-higher-level manager name column C1024.

Information for uniquely specifying the respective managers inside the computer system is set in the manager name column C1020. The SA manager decides the name of each manager to avoid duplication of manager names.

The host computer name of each manager is set in the host name column C1021. The host computer name is information for identifying the management server. Separating the host name and the manager name makes it possible to transfer a manager to another server relatively easily. Furthermore, the configuration may also be such that each manager is identified using only one of either the manager name or the host name. Or, the configuration may also be such that each manager is identified using other information.

The IP address of the management server specified by the host name is set in the IP address column C1022. Information for specifying a user who uses a manager is set in the user name column C1023.

Information for specifying a manager, which is located at the next higher level from this manager in the computer system configuration is set in the next-higher-level manager name column C1024.

FIG. 11 shows an example of the configuration of the client management table T103. The client management table T103 manages each client computer 20 subordinate to the SA manager, that is, all the client computers 20 inside the computer system. All the client computers 20 inside the computer system signifies all the client computers within the scope of the security policy managed by the present invention, and does not include a client computer that is not a target of the present invention.

The client management table T103, for example, comprises a client name column C1030, a host name column C1031, an IP address column C1032, a next-higher-level manager column C1033, a number of users column C1034, columns denoting the policies set by each user C1035, C1036, and a merge rule column C1037.

Information for specifying each client is set in the client name column C1030. Information for specifying the computer in which each client is disposed is set in the host name column C1031. The IP address of the computer in which each client is disposed is set in the IP address column C1032.

Information for specifying the manager, which is located at the next higher level from the client computer 20 in the computer system configuration is set in the next-higher-level manager name column C1033. The columns C1034 and C1035 are prepared for each user who uses the SA manager. For example, in a case where four users are able to use the SA manager to create policies, columns for these four individuals will be prepared. The name and generation information of the policy created by each user who uses the SA manager are set in the columns C1034, C1035. The SA manager is able to reference the names and generation information of all the policies. Each user, who has set a policy, is only able to reference the policy name and generation information for the policy that he himself set.

Information for specifying a merge rule to be applied to the client computer 20 is set in the merge rule column C1037. From the standpoint of maintaining security, the merge rule column C1037 is only able to be referenced by the SA manager.

FIG. 12 shows an example of the configuration of the policy table T104. The policy table T104 manages the policies created by the respective users, who use the SA manager. The policy table T104, for example, comprises a manager name column C1040, a user ID column C1041, a policy name column C1042, a generation column C1043, a result notification column C1044, setting ID columns C1045 (1) through (4), and setting columns C1046 (1) through (4).

Information for identifying the manager that created a policy is set in the manager name column C1040. Information for identifying the user who created a policy is set in the user name column C1041.

Information for identifying a policy is set in the policy name column C1042. Policy generation information, that is, version information is set in the generation column C1043. Flag information denoting whether or not the client computer 20 will issue a policy application result notification is set in the result notification column C1044. When "ON" is set in the result notification column C1044, a policy application result notification is issued to the manager that created this policy from all the client computers 20 in which this policy was applied. When "OFF" is set in the result notification column C1044, a result notification may be sent from the client computer 20 in response to a request from the manager.

Information for identifying a policy item (function) is set in the setting ID columns C1045 (1) through (4). The item is the above-mentioned "inhibit-print", "inhibit-software-run" and "log acquisition". Information distinguishing between whether a policy item is to be turned ON or OFF is set in the setting columns C1046 (1) through (4).

An action target is set in column C1046 (3) here. This is because it is not enough to set one of either ON or OFF for this function; this function must be clearly stated as the target of the action. Therefore, in FIG. 12, column C1046 (3) is shown as "target".

FIG. 13 shows an example of the configuration of the policy application result table T105. The policy application result table T105 manages the result of applying a policy in each client computer 20.

As described hereinabove, in this embodiment, a plurality of policies are applied to the client computer 20. The client computer 20 creates a new policy from the plurality of policies based on the merge rule. Therefore, there may be cases where the policy that has been sent to the client computer 20 differs from the policy that is actually being applied in this client computer 20. The policy application result table T105 manages the actual application result in the client computer 20.

The policy application result table T105, for example, comprises a user ID column C1050, a collection date/time column C1051, and per-client information sets C1052 (1) through (n). Information identifying the user who created the policy is set in the user ID column C1050. The date and time at which the policy application result was collected from the client computer 20 are set in the collection date/time column C1051. Information showing the application result in each client computer 20 in which this policy is being applied is respectively set in the per-client information sets C1052 (1) through (n).

FIG. 14 shows one of the per-client information sets C1052 inside FIG. 13. The per-client information set C1052, for example, comprises a client name column C10520, a storage date/time column C10521, a policy name/generation column C10522, and a per-setting information set C10523.

Information that identifies the client computer 20 is set in the client name column C10520. The date and time at which the policy application result acquired from the client computer 20 was stored in the table T105 are set in the storage date/time column C10521. The policy name and generation information are set in the policy name/generation column C10522.

Managing the date and time at which a policy application result received from the client computer 20 was stored makes it possible to detect variations in the application results due to time lag and the like. For example, it is supposed that there are two client computers 20A, 20B in which policy A and policy B are to be applied. It is supposed that due to communication network congestion, the one client computer 20A notifies the manager of the application result of policy A only, which it received first, and the other client computer 20B notifies the manager of the results of applying both policy A and policy B. It is conceivable that policy application results that should be the same may differ like this due to a communication network problem. However, since this embodiment manages the date and time at which the policy application result was stored in the table T105, it is possible to detect a difference in application results.

The setting contents for each policy item (function) are registered in the per-setting information set C10523. FIG. 15 shows the per-setting information set C10523 in detail. The per-setting information set C10523 comprises function ID columns C1052330 (1) through (4), policy setting columns C105231 (1) through (4), and application result columns C105232 (1) through (4). In FIG. 15, for convenience sake, four functions that the setting values thereof are shown, but the present invention is not limited to four, and either more than four or less than four functions and their setting values may be included.

Information for identifying each function is set in the function ID column C1052330. Either information as to whether or not the function specified by the function ID is to be implemented, or information indicating the target of this function is set in the policy setting column C105231.

The actual application result of this function is set in the application result column C105232. Therefore, comparing the contents of the policy setting column C105231 with the contents of the application result column C105232 makes it possible to detect a difference between the policy at the point in time of creation and the policy that was actually applied.

In the example of FIG. 15, OFF had been set initially for the PC operation log, but in reality it was set to ON. Further, the running of three pieces of software, i.e. ABC.exe, DEF.exe, and GHI.exe, was inhibited, but in reality the running of ABC.exe was inhibited, the running of DEF.exe was allowed, and an intermediate operation was set for GHI.exe. In addition, the use of external recording media was prohibited, but in reality an intermediate operation has been set.

The configuration may be such that in a case where the initial setting content and the application result of a policy differ, the reason for this difference is collected and recorded. However, it is preferable that the configuration be such that this policy setting content not be made known to a user other than the user who is the policy setter.

FIG. 16 is an example of the configuration of the client operation result table T106. The client operation result table T106 manages the result of a security function operation in each client computer 20. The client operation result table T106, for example, comprises a client name column C1060, a log ID column C1061, and a log column C1062.

Information for identifying each client computer 20 is set in the client name column C1060. Information denoting the log type, that is, information denoting which security function operation log it is, is set in the log ID column C1061. The operation content of the security function specified by the log ID is recorded in the log column C1062. The operation content will differ in accordance with the type of security function. For example, in the case of a security function for monitoring a file copy, a copy date/time, a copy-source address, a copy-destination address, a file name, and an executor account are recorded.

FIG. 17 shows an example of the system configuration table T107. The system configuration table T107 manages the configuration of the computer system. The system configuration table T107, for example, comprises a number of hierarchies column C1070, a next-higher-level manager column C1071, a type column C1072, and a name column C1073.

The number of levels in the hierarchical structure of the system is set in the number of hierarchies column C1070. The level number of the SA manager is "0". The level number of the hierarchy located directly below the SA manager is "1", the level number of the hierarchy below that is "2", and the level number of the hierarchy below that is "3".

Information for specifying the manager that is located directly above the relevant device is set in the next-higher-level manager column C1071. Information denoting whether the relevant device is a manager or a client is set in the type column C1072. Information for identifying the relevant device is set in the name column C1073.

Figure 18:
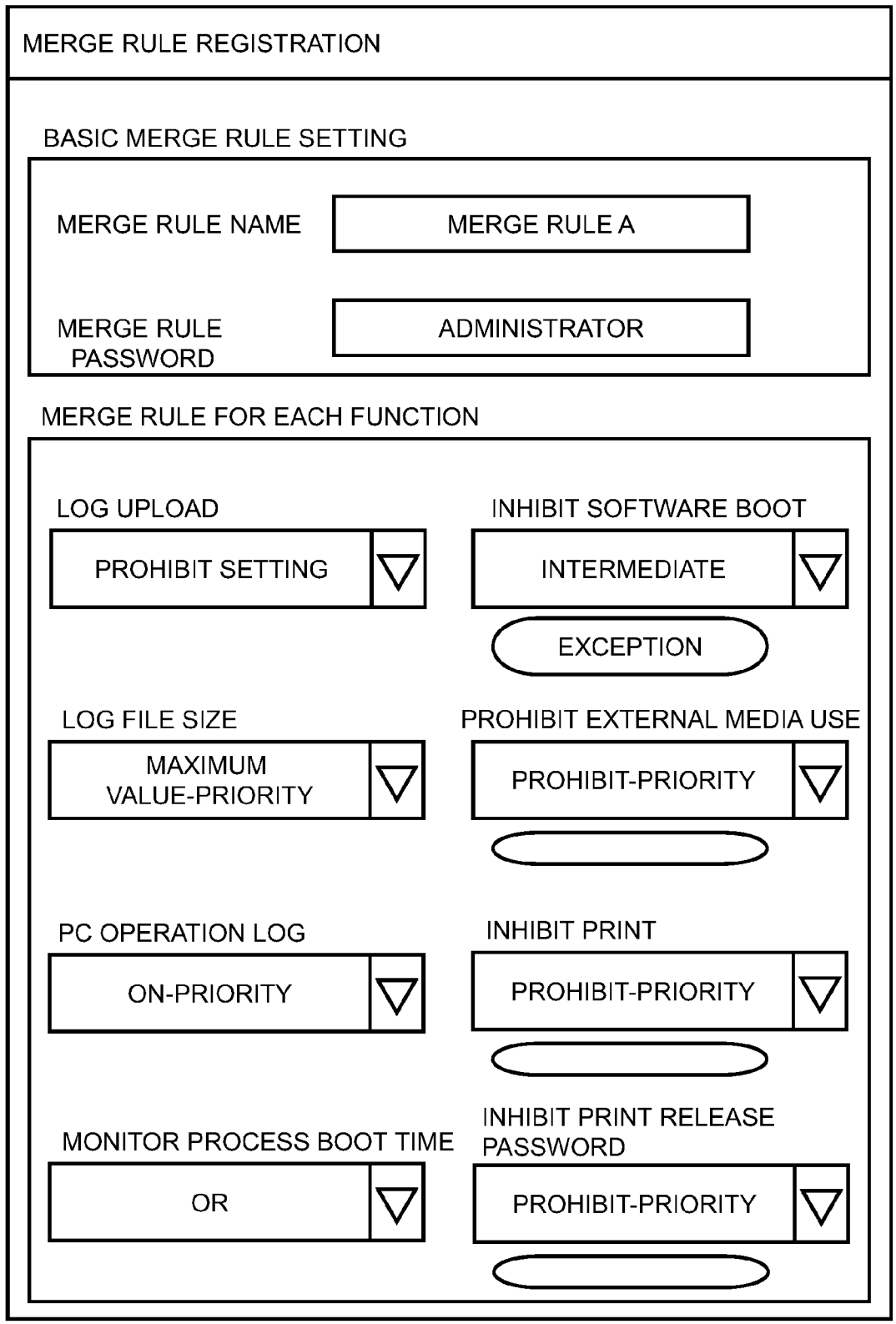
[FIG. 18]

FIG. 18 shows an example of a merge rule registration screen used when the SA manager registers a merge rule. The merge rule registration screen comprises a "basic merge rule settings" area located in the upper part of the screen, and a "function merge rules" area located in the lower part of the screen.

A merge rule name and a password for managing the merge rule are input in the basic merge rule settings area.

A rule to be applied for each setting item (function) is either selected or input in the function merge rules area. The three elongated ovals at the bottom right in FIG. 18 are buttons for setting an exception. The term "exception" has been omitted due to space constraints.

As shown in FIG. 18, the configuration may be such that either a rule is set in function units, or a rule is set in a group unit, which comprises either one or a plurality of functions. For example, it is possible to bring Web access log, PC operation log, and file operation log together into a group called "log management", and to set one rule for the log management group. In accordance with this, the same rule will be collectively set for the Web access log, the PC operation log, and the file operation log, respectively.

Figure 19:
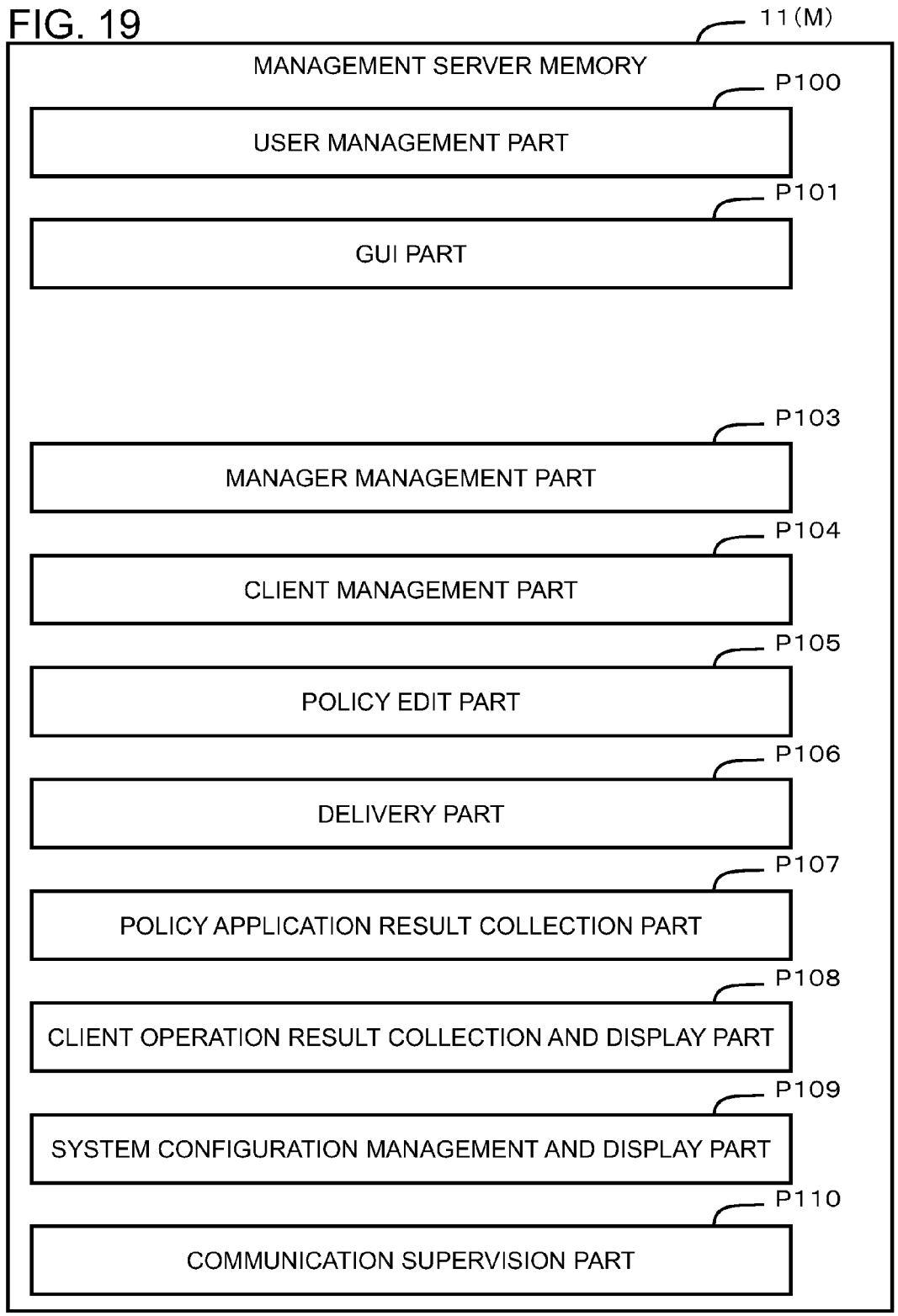
[FIG. 19]

The configuration of the ordinary management server (manager) will be explained by referring to FIGS. 19 through 25. FIG. 19 shows the configuration of the programs stored in the management server 10 memory 11 (M). The memory 11

(M) stores P100, P101, and P103 through P110 from among the respective programs P100 through P110 described in FIG. 6. The merge rule edit part P102 is not stored in the memory 11 (M). A merge rule is only able to be created in the SA manager, and is not able to be created in an ordinary manager. Explanations of configurations that are the same as configurations already described will be omitted.

Figure 20:
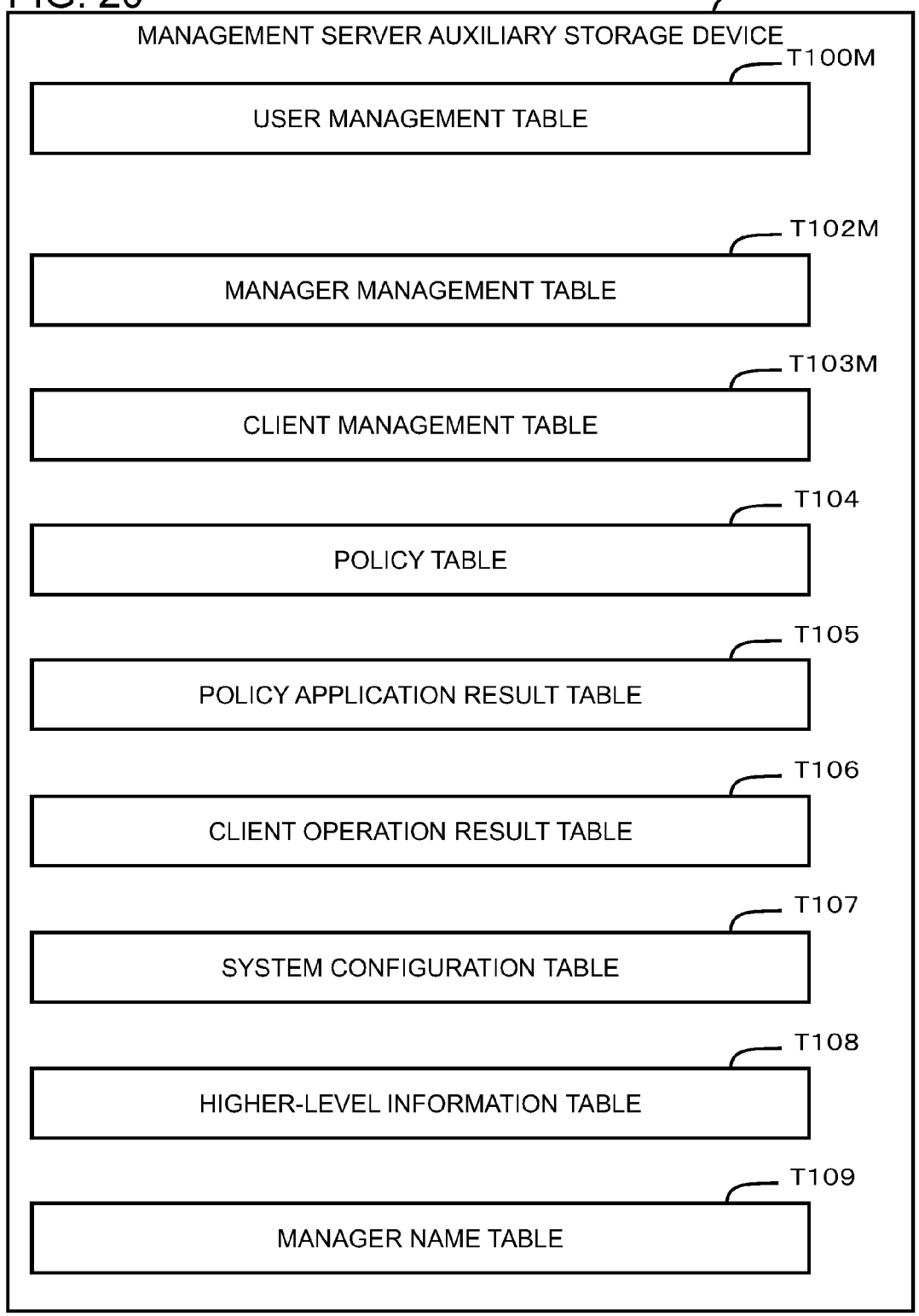
[FIG. 20]

FIG. 20 is a diagram showing the configuration of tables stored in the management server auxiliary storage apparatus 13 (M). An ordinary management server other than the SA server comprises a user management table T100M, a manager management table T102M, a client management table T103M, a policy table T104, a policy application result table T105, a client operation result table T106, a system configuration table T107, a higher-level information table T108, and a manager name table T109.

The policy table T104, the policy application result table T105, the client operation result table T106, and the system configuration table T107 are the same as those described using FIG. 7, and as such, explanations will be omitted.

FIG. 21 shows an example of the configuration of the user management table T100M. The user management table T100M manages the users who use the manager. In the case of the SA manager, there are two types of users, i.e., the SA user and the ordinary user, but in the case of the ordinary manager, there are only ordinary users. Therefore, a user ID column C1000 and a password column C1001 are provided in the user management table T100M, but the attribute column C1002 shown in FIG. 7 is not provided.

Figure 22:
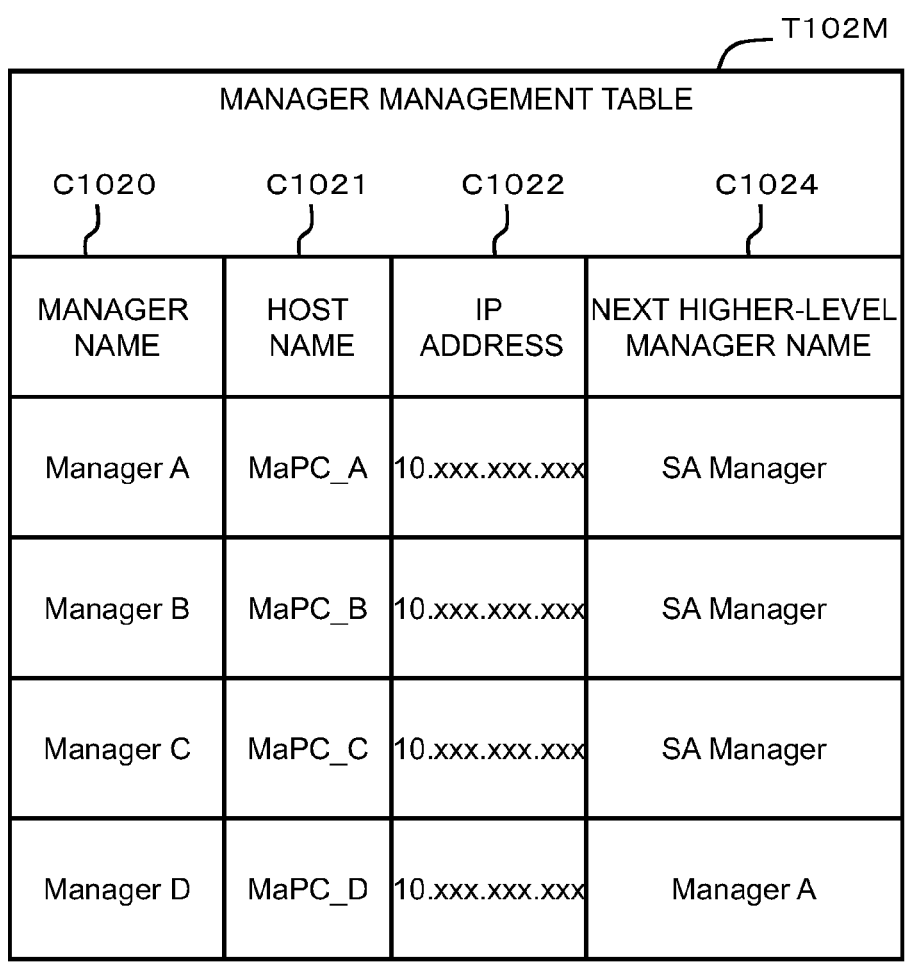
[FIG. 22]

FIG. 22 shows an example of the manager management table T102M. The manager management table T102M manages a manager subordinate to the manager. Since an ordinary manager is not able to handle a merge rule, the manager management table T102M does not comprise the user name column C1023 shown in FIG. 10. Since the other configurations are shared in common, explanations will be omitted.

FIG. 23 shows an example of the client management table T103M. The client management table T103M manages the respective clients that are subordinate to the manager. Since an ordinary manager is not able to handle a merge rule, the client management table T103M does not comprise the merge rule column C1037 shown in the client management table T103 shown in FIG. 11. Since the other configurations are shared in common, explanations will be omitted.

FIG. 24 shows an example of the higher-level information table T108. The higher-level information table T108 manages information of a computer that is located at the next higher level with respect to the relevant device. Since the SA manager is located at the highest level of the system hierarchy, the SA manager does not comprise a higher-level information table.

The higher-level information table T108, for example, comprises a manager name column C1080, a host name column C1081, and an IP address column C1082. Information for specifying the next-higher-level manager is set in the manager name column C1080. Information for specifying the server of the next-higher-level manager is set in the host name column C1081. The IP address of the next-higher-level manager is set in the IP address column C1082.

Figure 25:
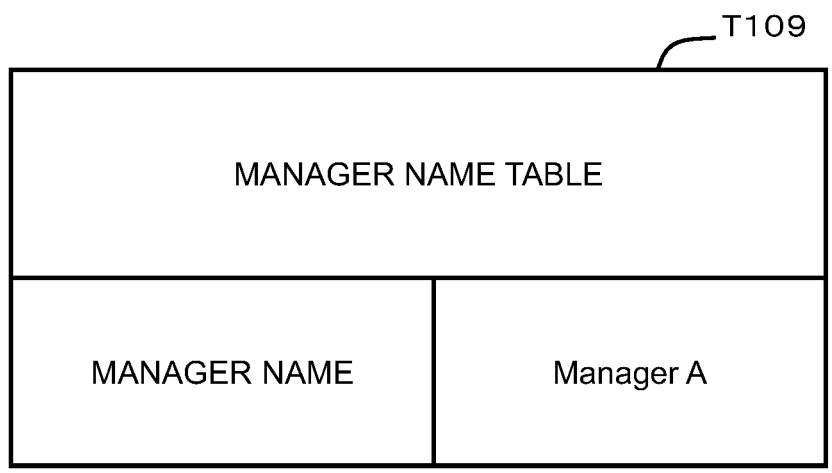
[FIG. 25]

FIG. 25 shows an example of the manager name table T109. The manager name table T109 manages the manager name provided to the relevant device from the SA manager.

Figure 26:
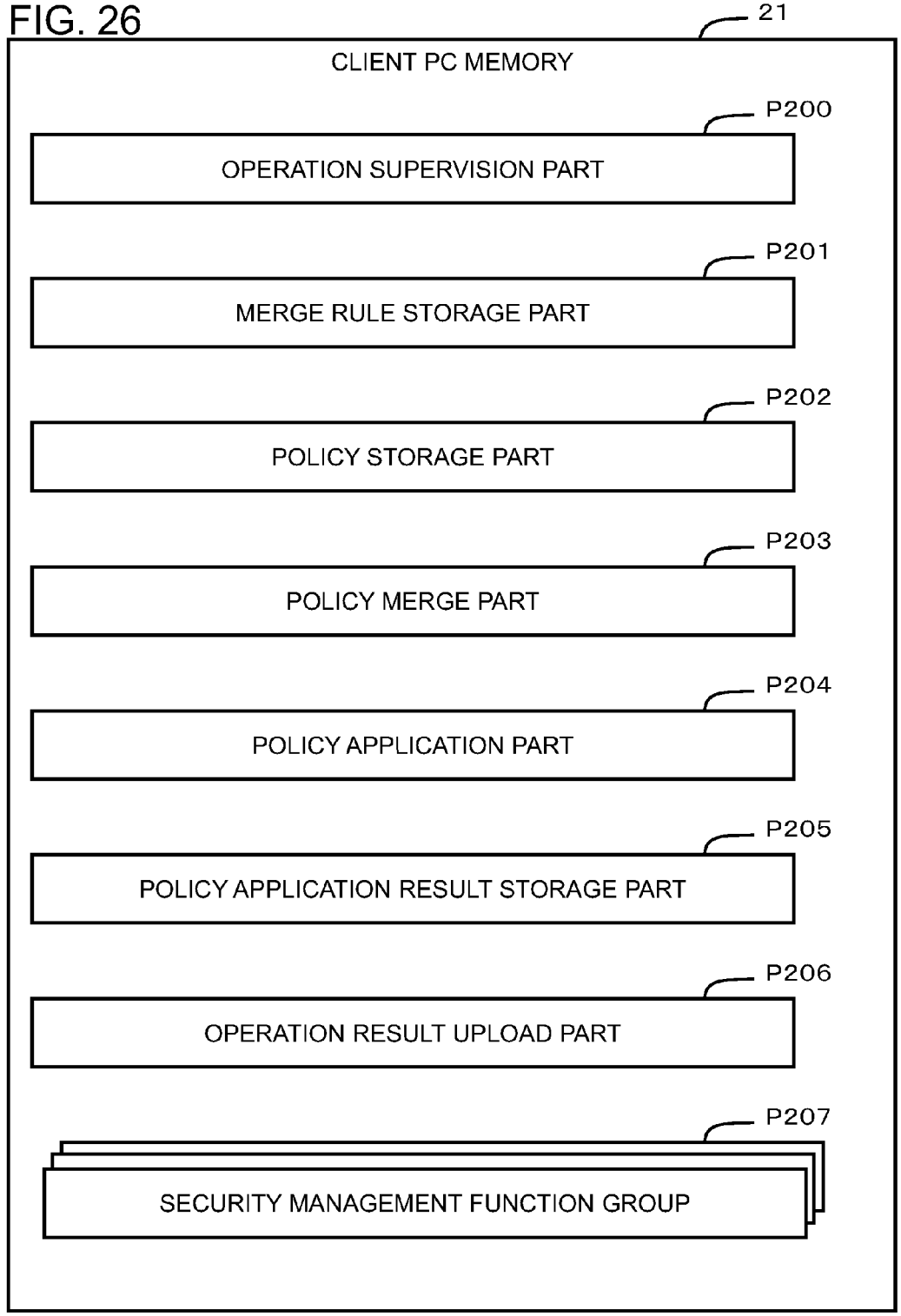
[FIG. 26]

The configuration of the client computer will be explained by referring to FIGS. 26 through 33. FIG. 26 is a diagram showing the configuration of the programs stored in the memory 21 of the client computer 20.

The memory 21 of the client computer 20, for example, stores an operation supervision part P200, a merge rule storage part P201, a policy storage part P202, a policy merge mart P203, a policy application part P204, a policy application result storage part P205, an operation result upload part P206, and a security management function group P207.

The operation supervision part P200 is a program for controlling the operation of the client computer 20. The operation supervision part P200, for example, runs a prescribed process in response to a request from the manager.

The merge rule storage part P201 is a program for storing a merge rule received from the SA manager in the merge rule table T201.

The policy storage part P202 is a program for storing a policy received from the SA manager and a manager is the received policy table T202.

The policy merge part P203 is a program for merging a plurality of received policies based on the merge rule, and storing the merged policy in the merged policy table T203.

The policy application part P204 is a program for applying the merged policy to each security management function group P207.

The policy application result storage part P205 is a program for storing the actual application result of a received policy (the merged policy) in the policy application result table T204.

The operation result upload part P206 is a program for sending the operation result of the security management function group P207 (the operation log) to the next-higher-level manager.

The security management function group P207 is a group of programs for managing each security function. For example, the security management function group P207 corresponds to a program for managing printing, a program for monitoring software operation, and a program for monitoring input/output to/from an external recording medium.

Figure 27:
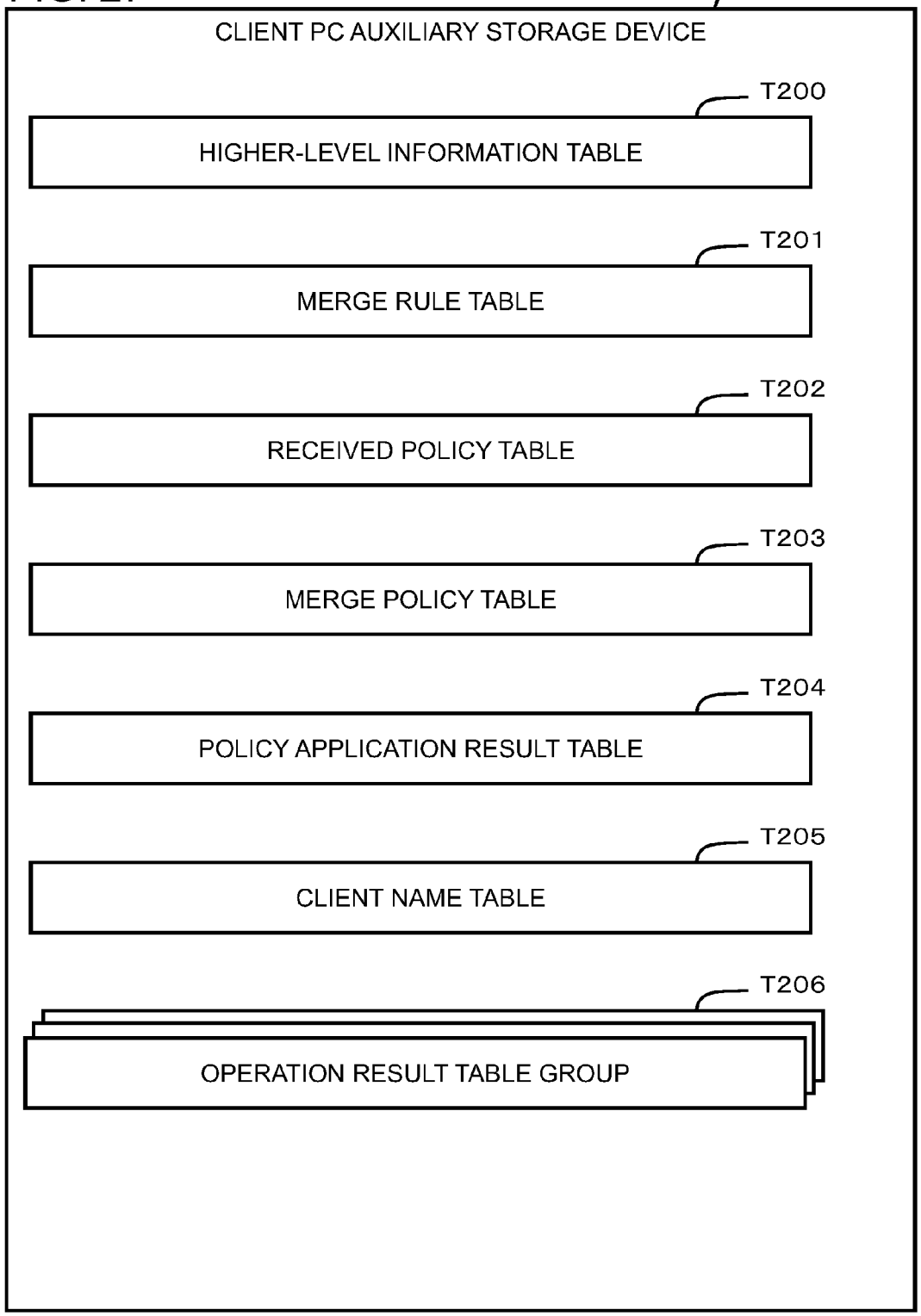
[FIG. 27]

FIG. 27 shows the configuration of tables stored in the auxiliary storage apparatus 23 of the client computer 20. The auxiliary storage apparatus 23, for example, stores a higher-level information table T200, a merge rule table T201, a received policy table T202, a merged policy table T203, a policy application result table T204, a client name table T205, and an operation result table group T206.

The higher-level information table T200 is a table for managing the next-higher-level manager the same as the higher-level information table T108 shown in FIG. 24, and since the configuration is the same as the table of FIG. 24, a drawing will be omitted.

FIG. 28 shows an example of the merge rule table T201. The merge rule table T201 stores the merge rule received from the SA manager. The SA manager is able to create a plurality of merge rules, but only one merge rule is set in each client computer 20.

Therefore, the merge rule table T201 manages only one merge rule. With the exception that the number of merge rules to be managed is limited to one, the configuration of the merge rule table T201 is the same as that of the merge rule table T101 shown in FIG. 9. C2010 through C2017 correspond to C1010 through C1017 of FIG. 9.

FIG. 29 shows an example of a table T202 for managing a received policy. The received policy table T202 manages a policy delivered from each user. In a case where a plurality of policies are delivered from the same user, the new policy is written over the old policy.

The received policy table T202 comprises the same configuration as the policy table T104 shown in FIG. 12. Since C2020 through C2026 (4) correspond to C1040 through C1046 (4) of FIG. 12, an explanation will be omitted.

The merged policy table T203 manages a policy created using a plurality of policies and the merge rule. Only one merged policy table T203 is created in each client computer 20.

The merged policy table T203, for example, comprises setting ID columns C2030 (1) through (4), and setting columns C2031 (1) through (4). FIG. 30 shows four setting items, but this is merely an example, and the present invention is not limited to four setting items. Information for identifying each function (setting item) is set in the setting ID column C2030. Either the presence/absence of an application or an application target for each function is set in the setting column C2031.

Figure 31:
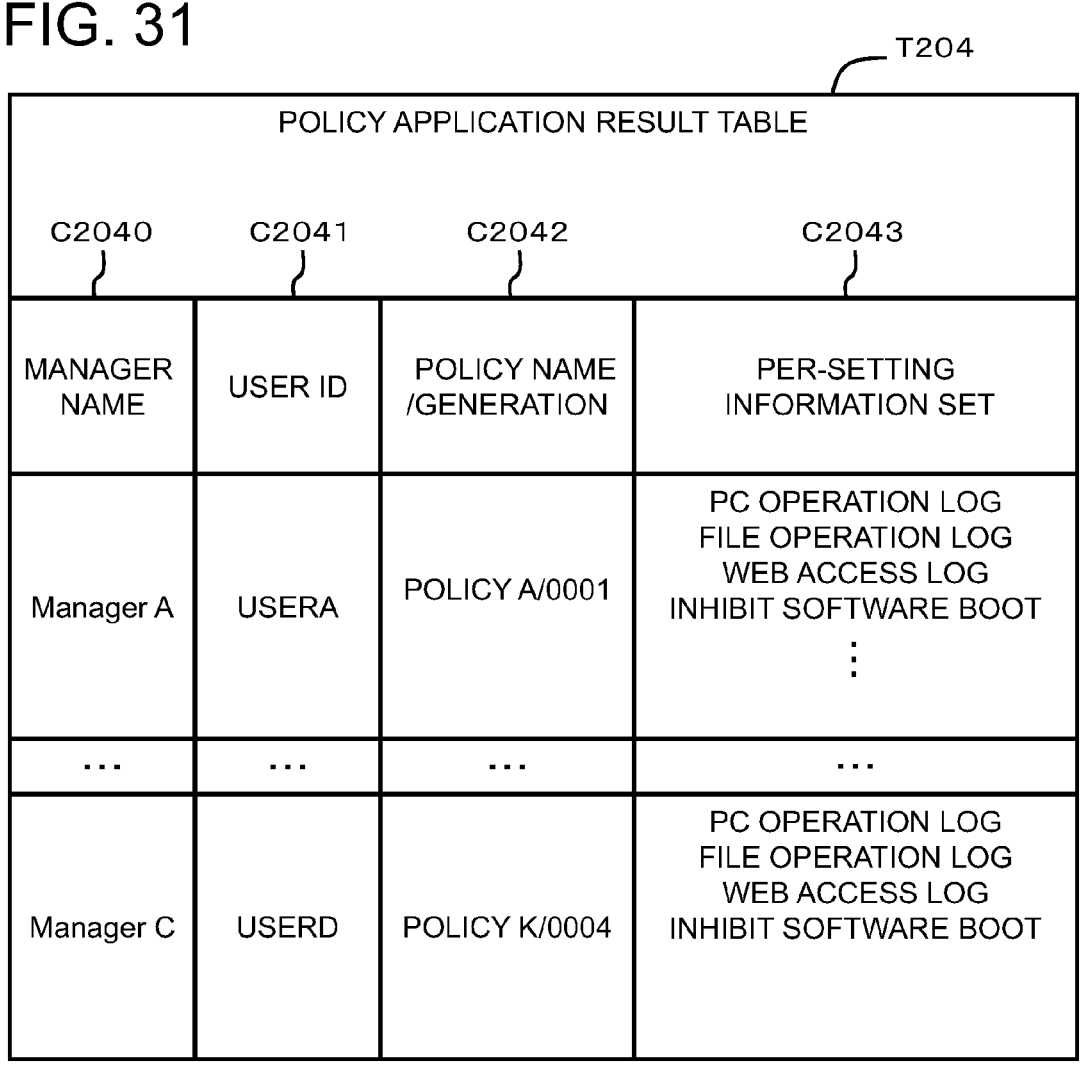
[FIG. 31]

FIG. 31 shows an example of the policy application result table T204. The policy application result table T204, for example, comprises a manager name column C2040, a user ID column C2041, a policy name/generation column C2042, and a per-setting information set column C2043.

Information for specifying the manager by which the policy was created is set in the manager name column C2040. Information for specifying the user that created the policy is set in the user ID column C2041. Name and generation information for specifying the relevant policy are set in the policy name/generation column C2042. The setting contents of each setting item are set in the per-setting information set C2043. The per-setting information set C2043 comprises the same configuration as the configuration shown in FIG. 15.

Figure 32:
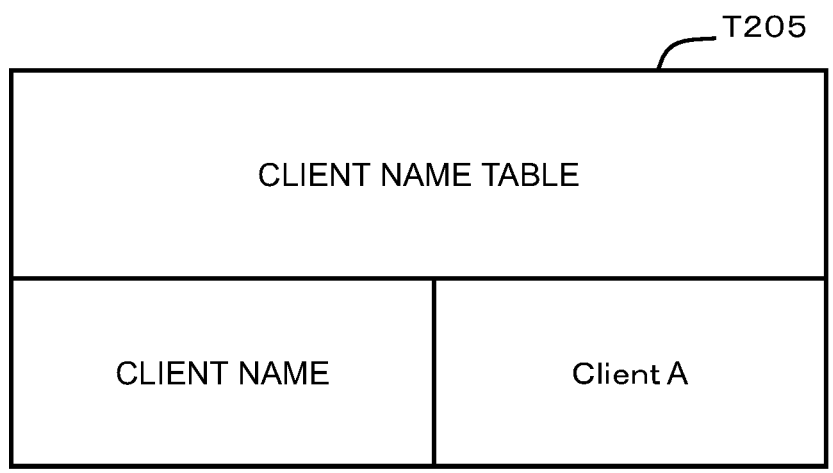
[FIG. 32]

FIG. 32 shows the client name table T205. The client name table T205 manages the client name provided from the SA manager.

FIG. 33 shows an example of the operation result table T206. The operation result table T206 manages the log of security function operations. The operation result table T206 will differ for each monitoring-targeted function. FIG. 33 shows an example of a table related to file operations. The operation result table T206, for example, comprises a date/time column C2060, a type column C2061, an operation-source column C2062, an operation-destination column C2063, a file name column C2064, and a login user name column C2065.

A date and time at which a monitoring-targeted operation was implemented are set in the date/time column C2060. A monitoring-targeted type is set in the type column C2061. The path of an operation source, like either a copy source or a migration source, is set in the operation-source column C2062. The path of an operation destination, like either a copy destination or a migration destination, is set in the operation-destination column C2063. Information that specifies the file being operated on is set in the file name column C2064. Information for specifying the client user that is operating on the file is set in the login user name column C2065.

The operations of this system will be explained by referring to FIGS. 34 through 67. A step will be abbreviated as "S" in the drawings. Further, each flowchart shows an overview of each process within the scope necessary to understand and implement the present invention. A so-called person with ordinary skill in the art should be able to either change or delete a step shown in the drawings, or add a new step.

Figure 55:
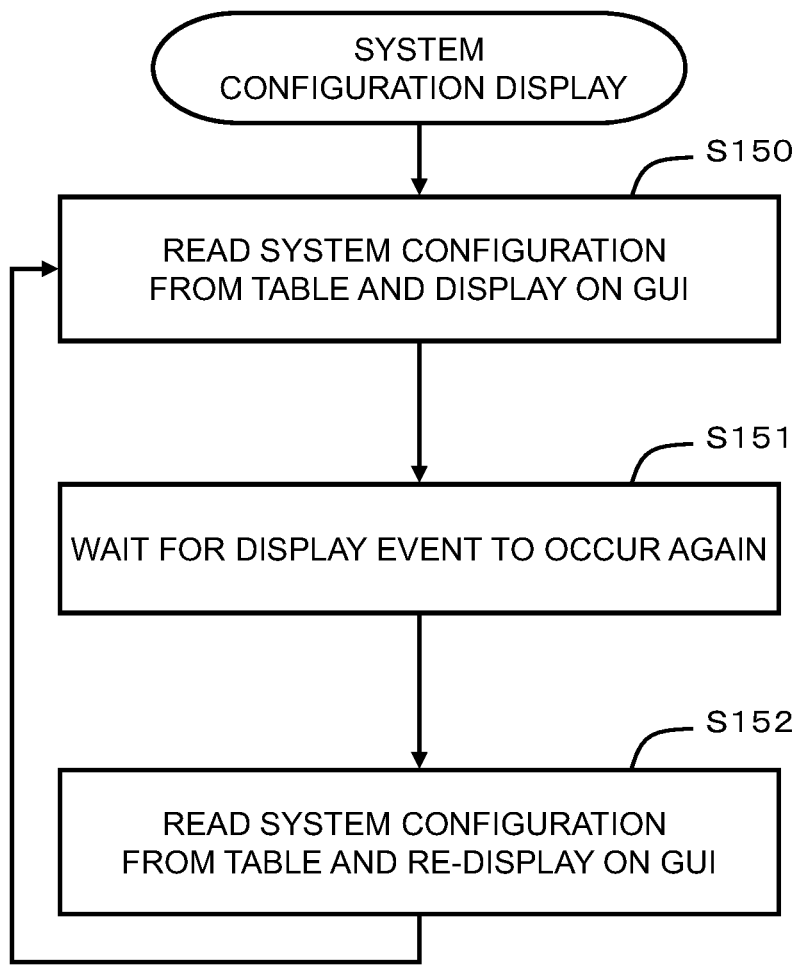
[FIG. 55]
Figure 56:
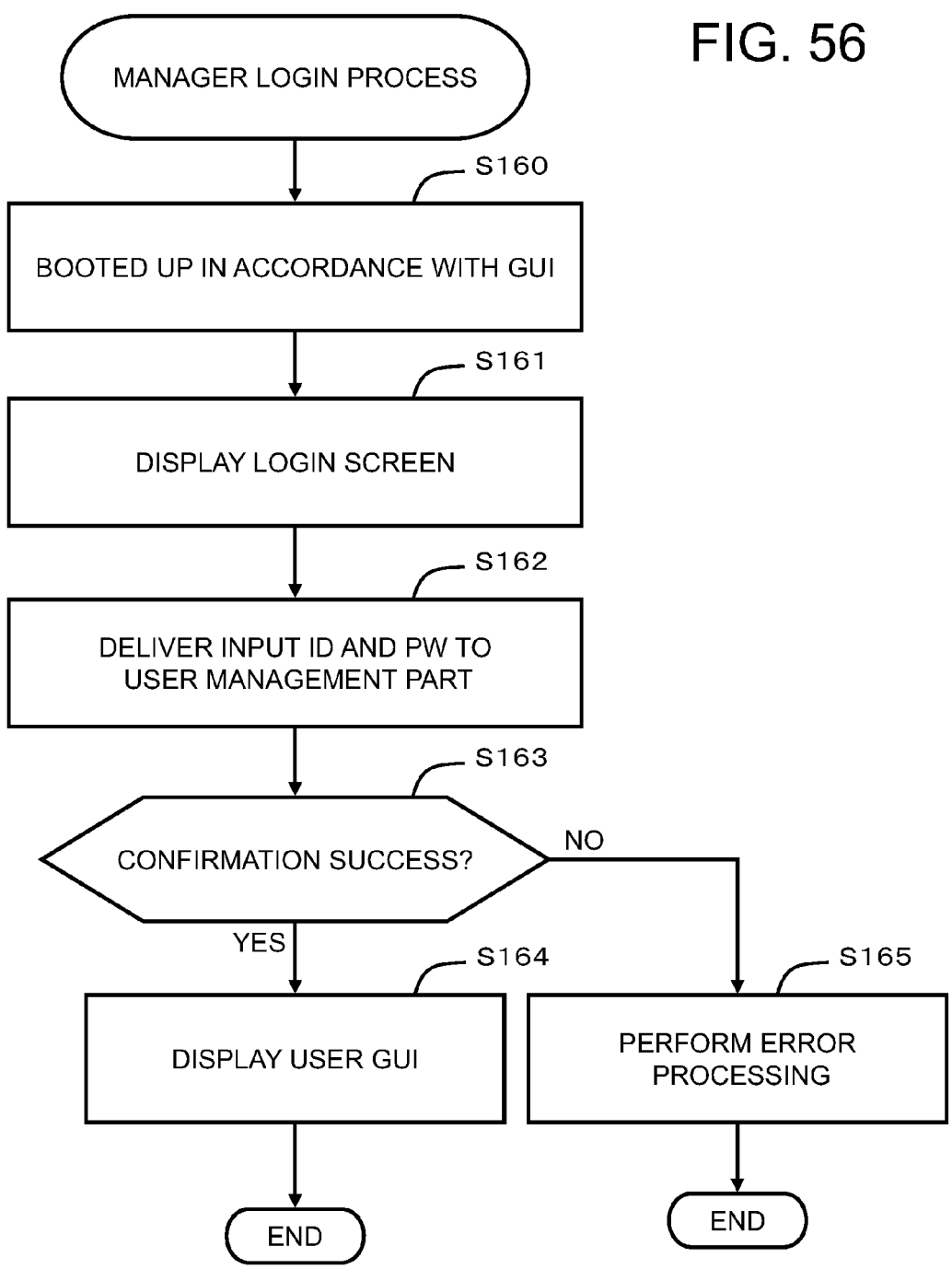
[FIG. 56]

FIGS. 34 through 55 show processing related to the SA manager, FIG. 56 shows processing related to the manager, and FIGS. 57 through 67 show processing related to the client. A number of the processes related to the SA manager are also related to the manager.

Each process is realized in accordance with the microprocessor 12 (22) reading and executing a prescribed program from the memory 11 (21). Hereinbelow, the entity performing the process will be explained as either the management server (or SA server), the manager (or SA manager), the client computer, or the respective programs.

Figure 34:
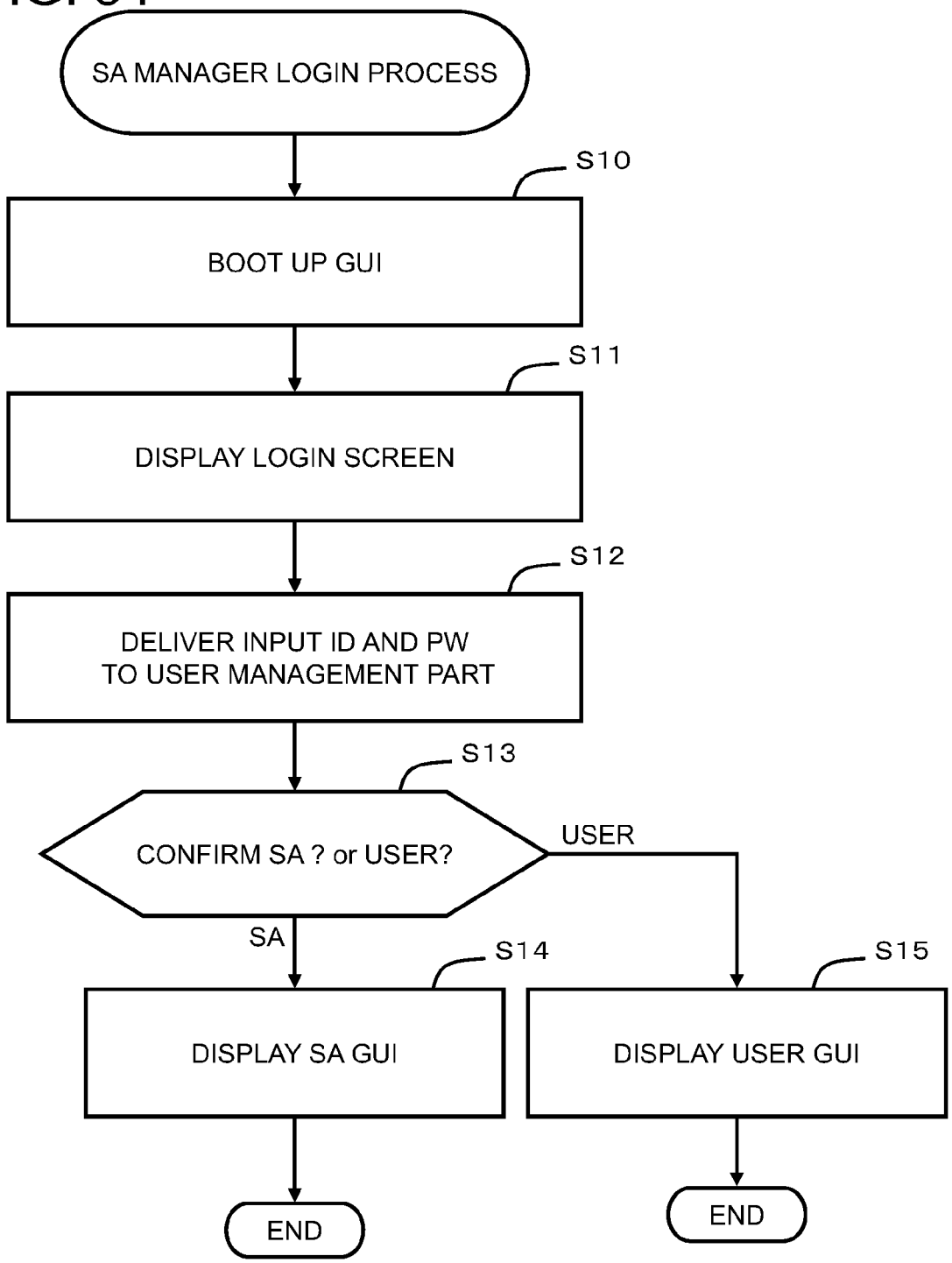
[FIG. 34]

FIG. 34 is a flowchart showing the process for logging in to the SA manager. The SA server (highest-level management server) runs the GUI part P101 in response to an access from outside (S10). The GUI part P101 displays a login screen (S11), and delivers an ID and a password input by the user to the user management part P100 (S12).

User authentication is performed by the user management part P100, and a determination is made as to whether the user is the SA user or an ordinary user (S13). In the case of the SA user, the SA user GUI is displayed (S14). In the case of an ordinary user, the ordinary user GUI is displayed (S15). Although omitted from FIG. 34 for convenience sake, in a case where neither the SA user nor the ordinary user is applicable, error processing is carried out.

Figure 35:
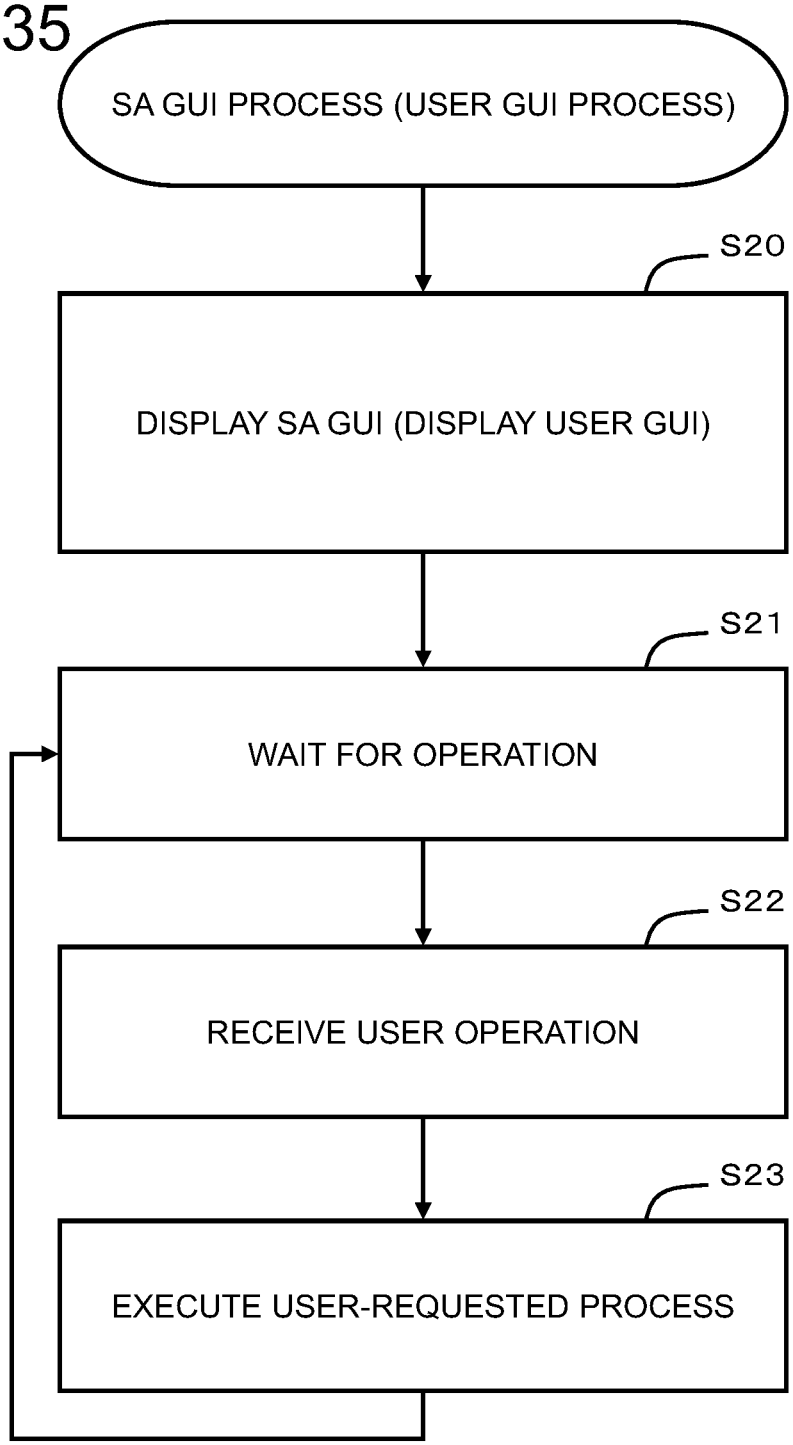
[FIG. 35]

FIG. 35 is a flowchart showing either a SA user GUI process or an ordinary user GUI process. The SA manager (or the manager) displays the SA user GUI (or the ordinary user GUI) (S20), and waits for an operation from either the SA user or the ordinary user (S21).

The SA manager (manager), upon receiving an operation from either the SA user or the ordinary user (S22), runs the requested process (S23).

Figure 36:
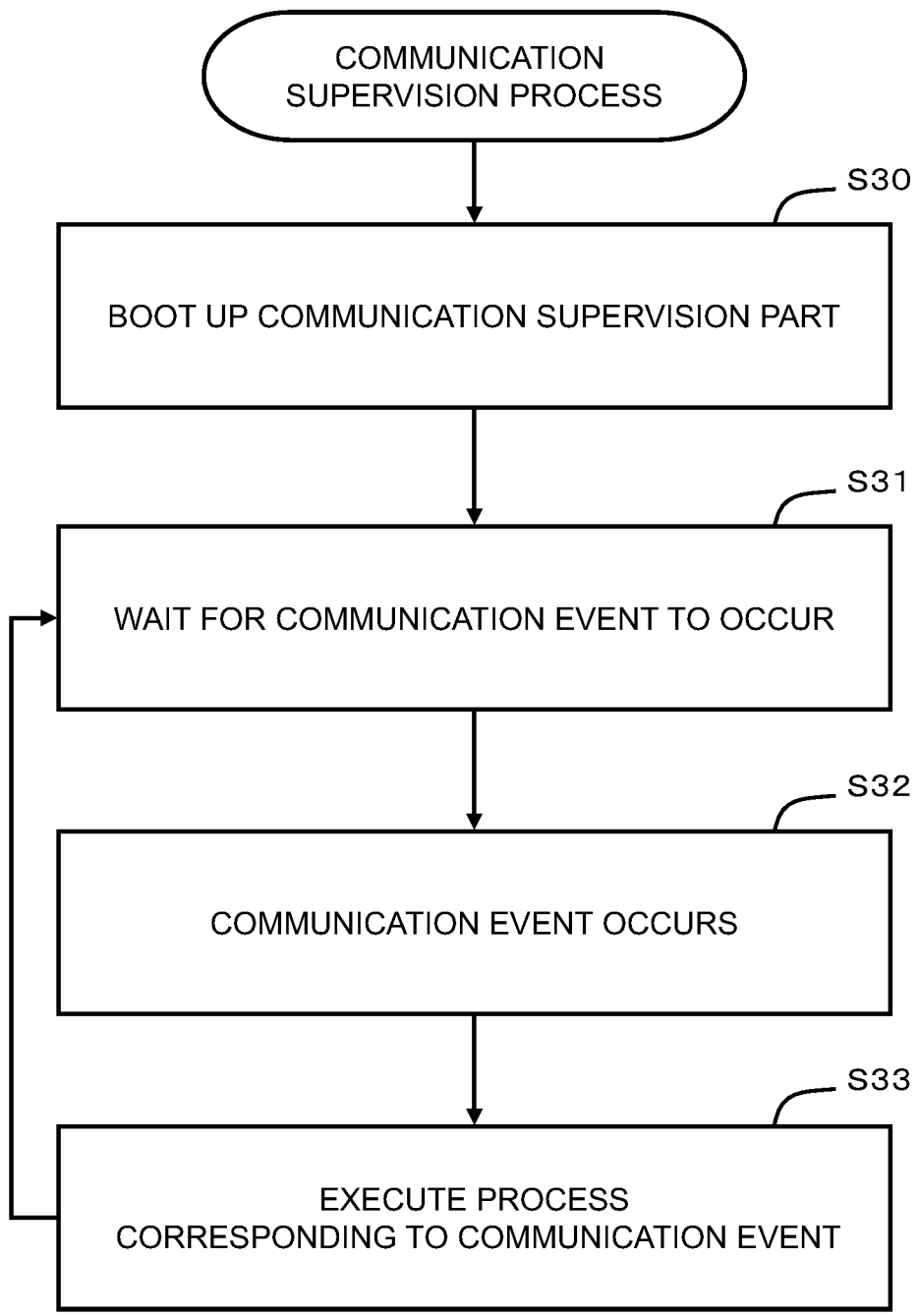
[FIG. 36]

FIG. 36 is a flowchart showing a communication supervision process. The communication supervision part P110 runs when the SA server runs (S30). The communication supervision part P110 waits for a communication event to occur (S31). The communication event is an event which request communications with either the managers or clients subordinate to the SA manager.

When a communication event occurs (S32), the communication supervision part P110 executes processing in accordance with the communication event (S33).

Figure 37:
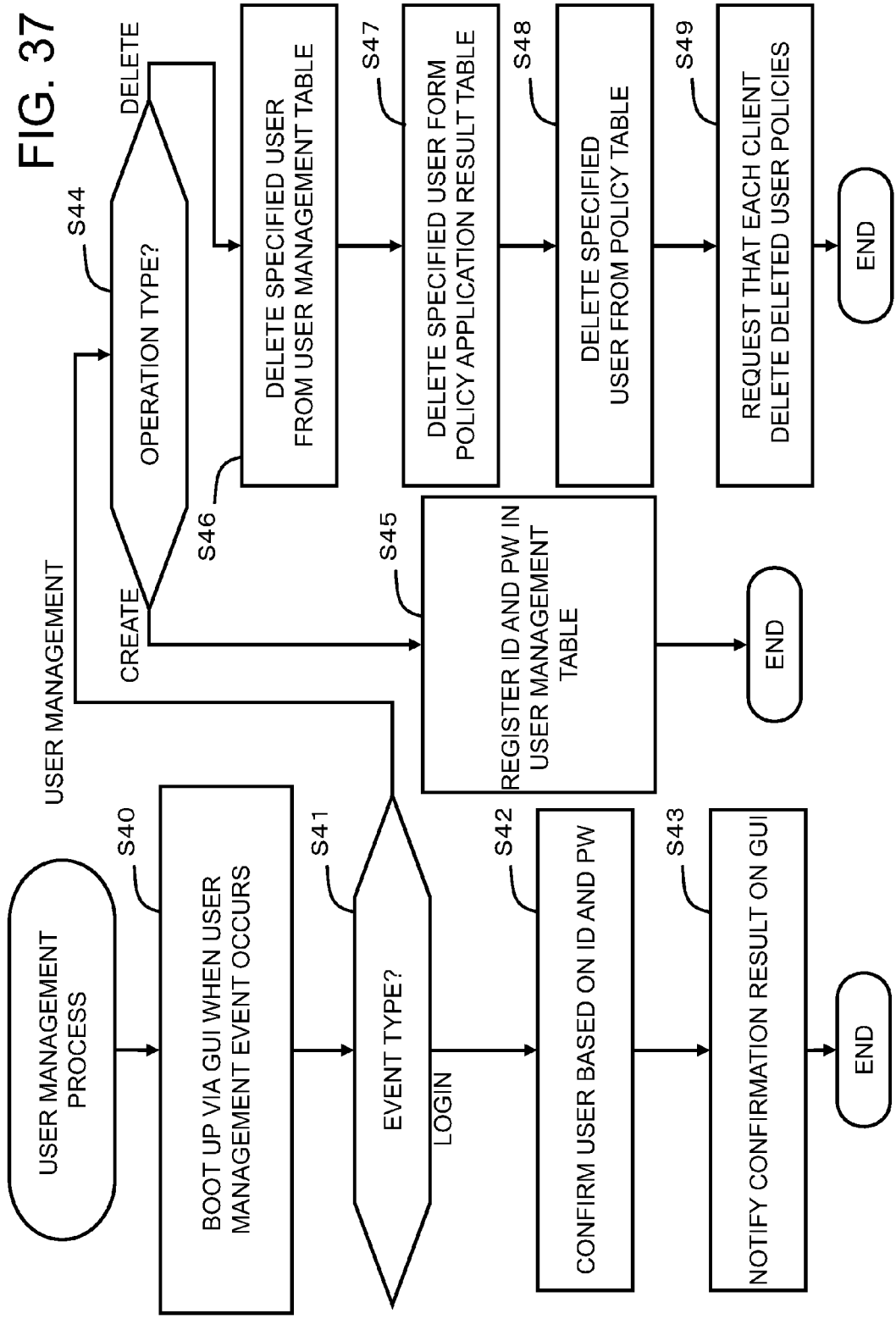
[FIG. 37]

FIG. 37 is a flowchart showing a process for managing a user who uses the SA manager. The user management part P100 runs when a user management event occurs on the GUI (S40). The user management part P100 determines the type of event (S41).

In the case of a login event, the user management part P100 authenticates the user on the basis of an ID and a password (S42), and returns this result to GUI part P101 (S43).

In the case of a user management event, the user management part P100 determines the type of operation (S44). In a case where a new user is to be created, the user management part P100 registers the inputted ID and password in the user management table T100 (S45).

In a case where a registered user is to be deleted, the user management part P100 deletes the user, who has been specified as the deletion target, from the user management table T100 (S46), and deletes the information related to this user from the policy application result table T105 (S47). In addition, the user management part P100 deletes the information related to the user specified as the deletion target from the policy table T104 (S48). The user management part P100 notifies each client computer 20 that received a policy from the delete-targeted user to delete the policy received from the delete-targeted user (S49).

Figure 38:
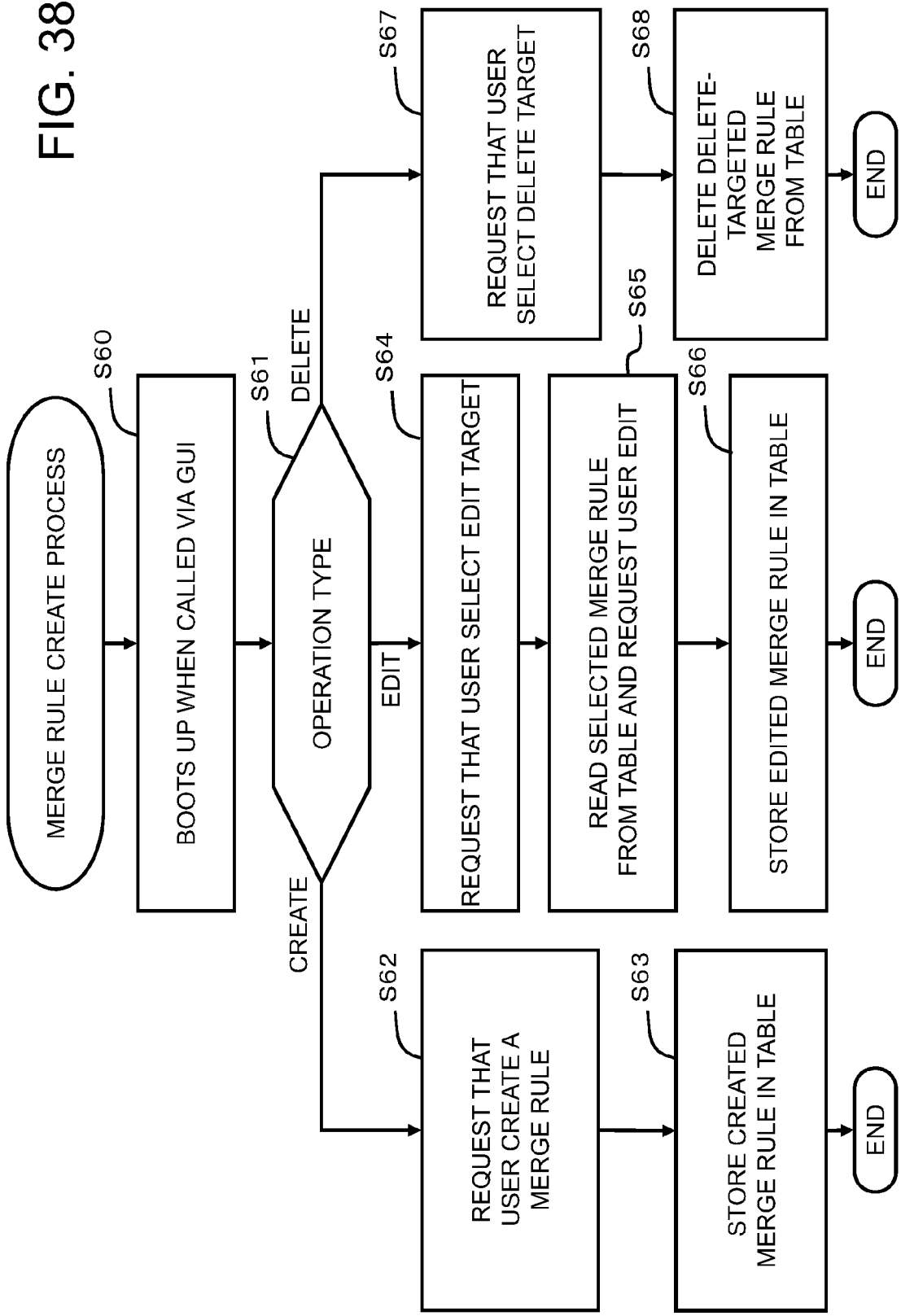
[FIG. 38]

FIG. 38 is a flowchart showing a merge rule create process. As described above, only the SA user is able to create the merge rule. The merge rule edit part P102 runs when called by the GUI (S60). The merge rule edit part P102 determines the type of operation (S61).

In a case where merge rule creation has been requested, the merge rule edit part P102 requests the SA user to create a merge rule (S62). The merge rule edit part P102 registers the new merge rule created by the SA user in the merge rule table T101 (S63).

In a case where the operation type is a merge rule edit, the merge rule edit part P102 requests the SA user to select the edit-targeted merge rule (S64). The merge rule edit part P102 reads the merge rule selected (specified) by the SA user from the merge rule table T101, and requests the SA user to edit this merge rule (S65). The merge rule edit part P102 stores the merge rule edited by the SA user in the merge rule table T101 (S66). Specifically, only the locations that were updated by the SA user are overwritten in the merge rule table T101.

In a case where the operation type is a merge rule delete, the merge rule edit part P102 requests the SA user to select the delete-targeted merge rule (S67), and deletes the merge rule selected by the SA user form the merge rule table T101 (S68).

Figure 39:
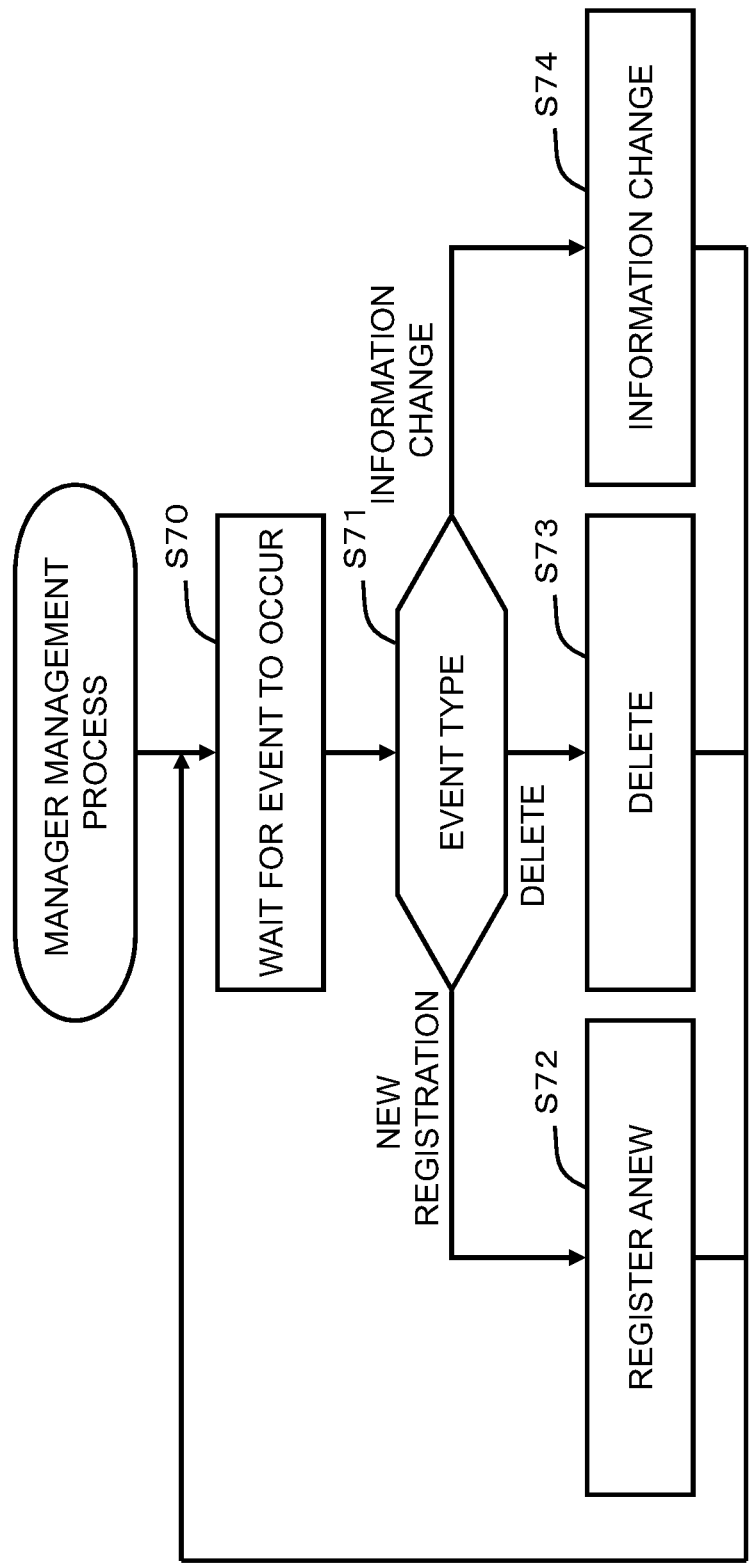
[FIG. 39]

FIG. 39 is a flowchart showing a process for managing a subordinate manager. The manager management part P103 runs at the same time as the SA server, and waits for a manager management event to occur (S70).

The manager management part P103 determines the type of event that occurred (S71), and in the case of a new registration event, carries out a new registration process (S72). The manager management part P103 executes a delete process in a case where a delete event has occurred (S73), and executes an information change event in a case where an information change event has occurred (S74). Next, the respective processes from S72 through S74 will be explained in detail.

Figure 40:
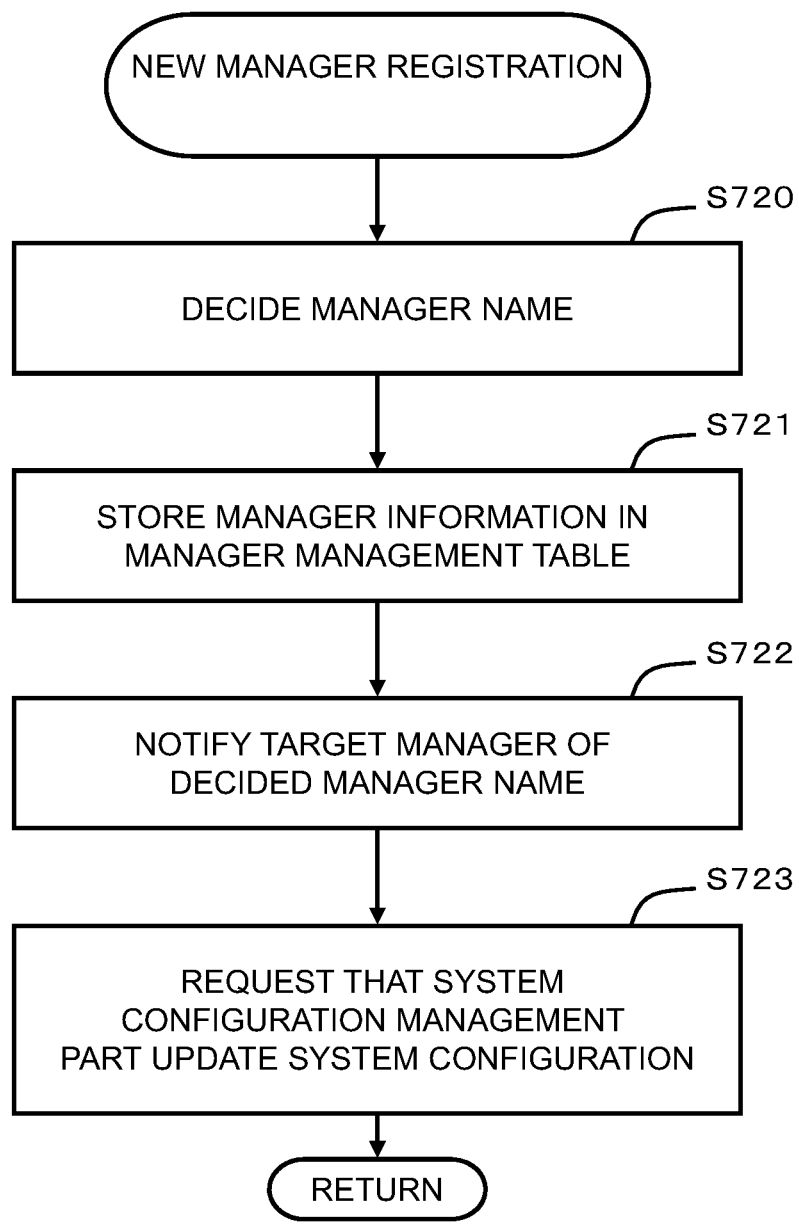
[FIG. 40]

FIG. 40 is a flowchart of the new manager registration process shown in S72 in FIG. 39. The manager management part P103 decides a new manager name (S720), and registers the new manager information in the manager management table T102 (S721).

The manager management part P103 notifies the new registration-targeted manager of the manager name decided in S720 (S722). The manager management part P103 requests the system configuration management and display part (hereinafter, may be abbreviated as system configuration management part) P109 to update the system configuration (S723).

Figure 41:
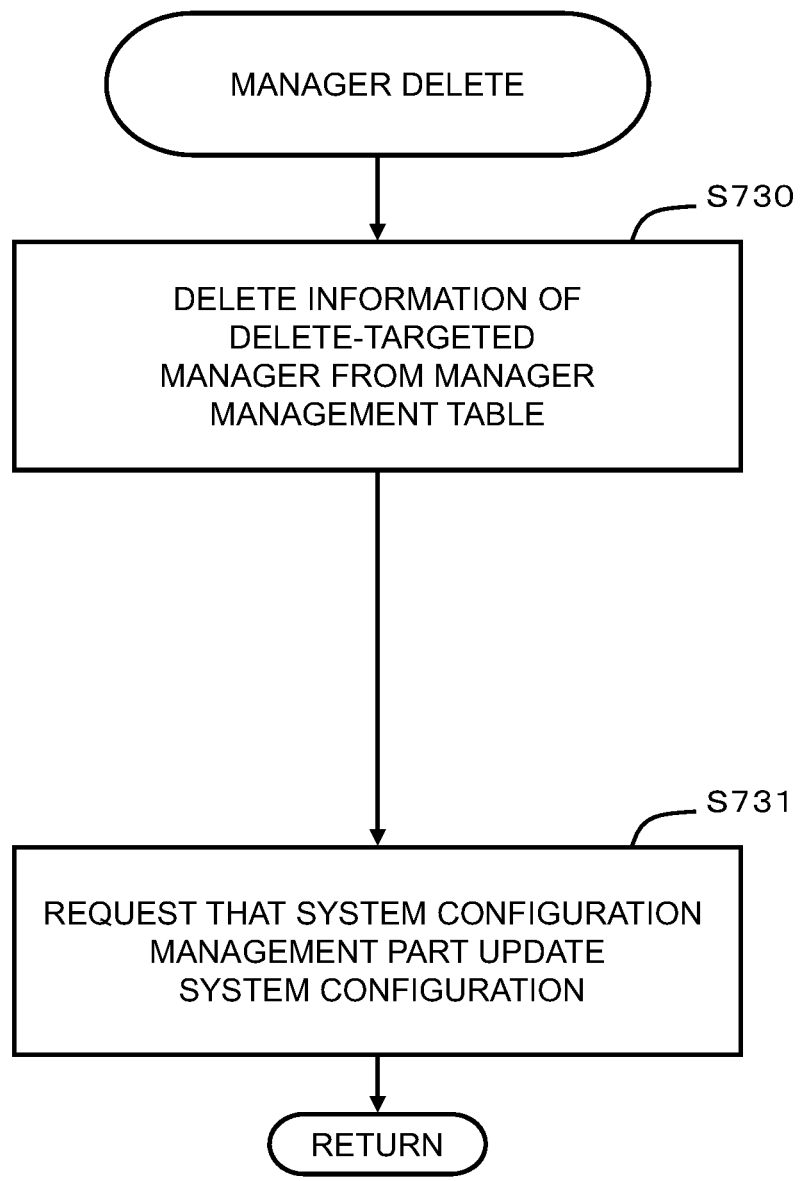
[FIG. 41]

FIG. 41 is a flowchart of the manager delete process shown in S73 of FIG. 39. The manager management part P103 deletes the information of the delete-targeted manager from the manager management table T102 (S730), and requests that the system configuration management part P109 update the system configuration (S731).

Figure 42:
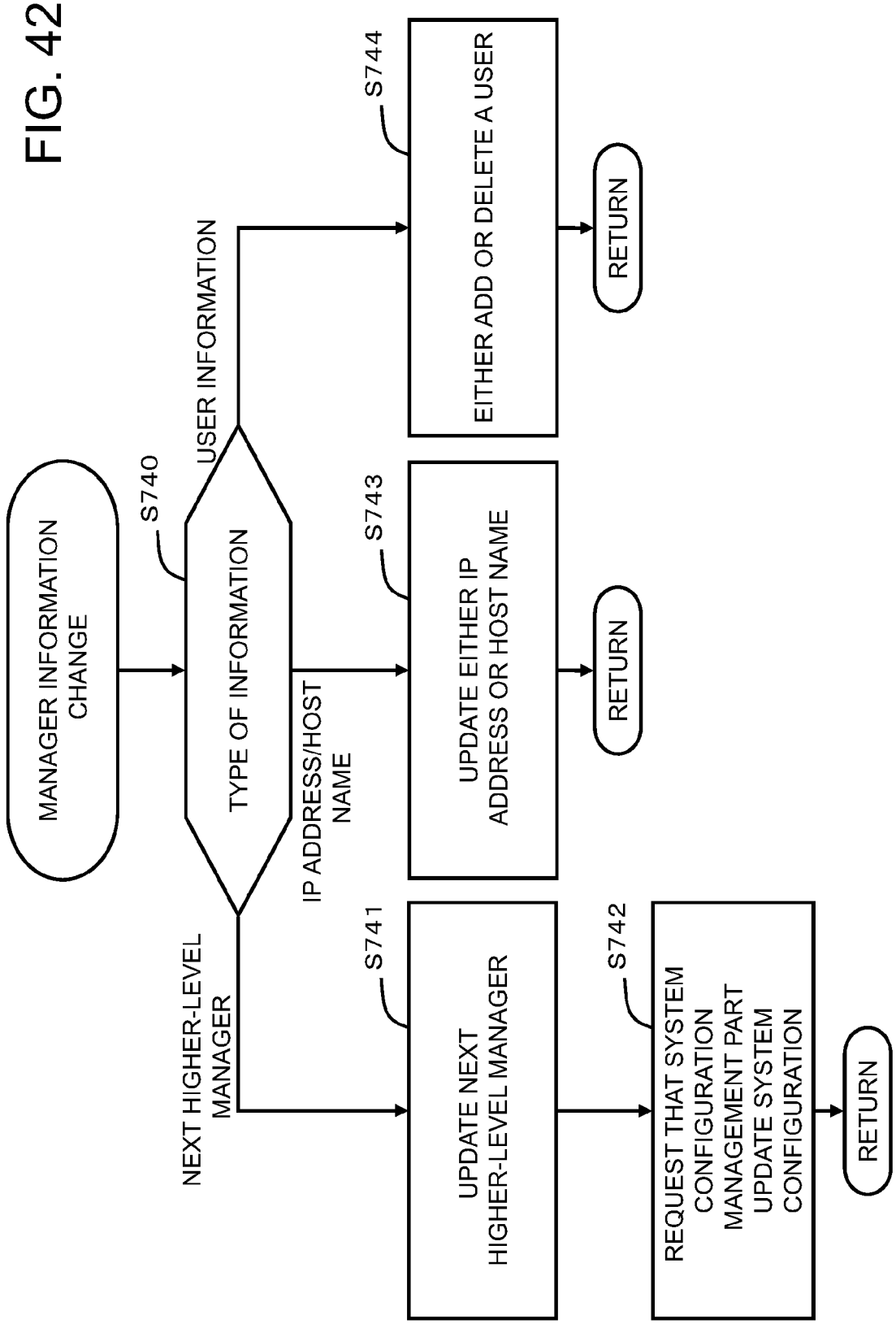
[FIG. 42]

FIG. 42 is a flowchart of the manager information change process shown in S74 of FIG. 39. The manager management part P103 determines the type of information that is targeted for change (S740). The types of change-targeted information are next-higher-level manager information, either IP address or host name, and user information.

In a case where next-higher-level manager information is to be changed, the manager management part P103 updates the next-higher-level manager information in the manager management table T102 (S741), and requests that the system configuration management part P109 update the system configuration (S742).

In a case where the change-targeted information is either the IP address or the host name, the manager management part P103 updates either the IP address or the host name in the manager management table T102 (S743).

In a case where the change-targeted information is user information, the manager management part P103 updates the user information in the manager management table T102 (S744). In accordance with this, the user is either added, changed, or deleted.

Figure 43:
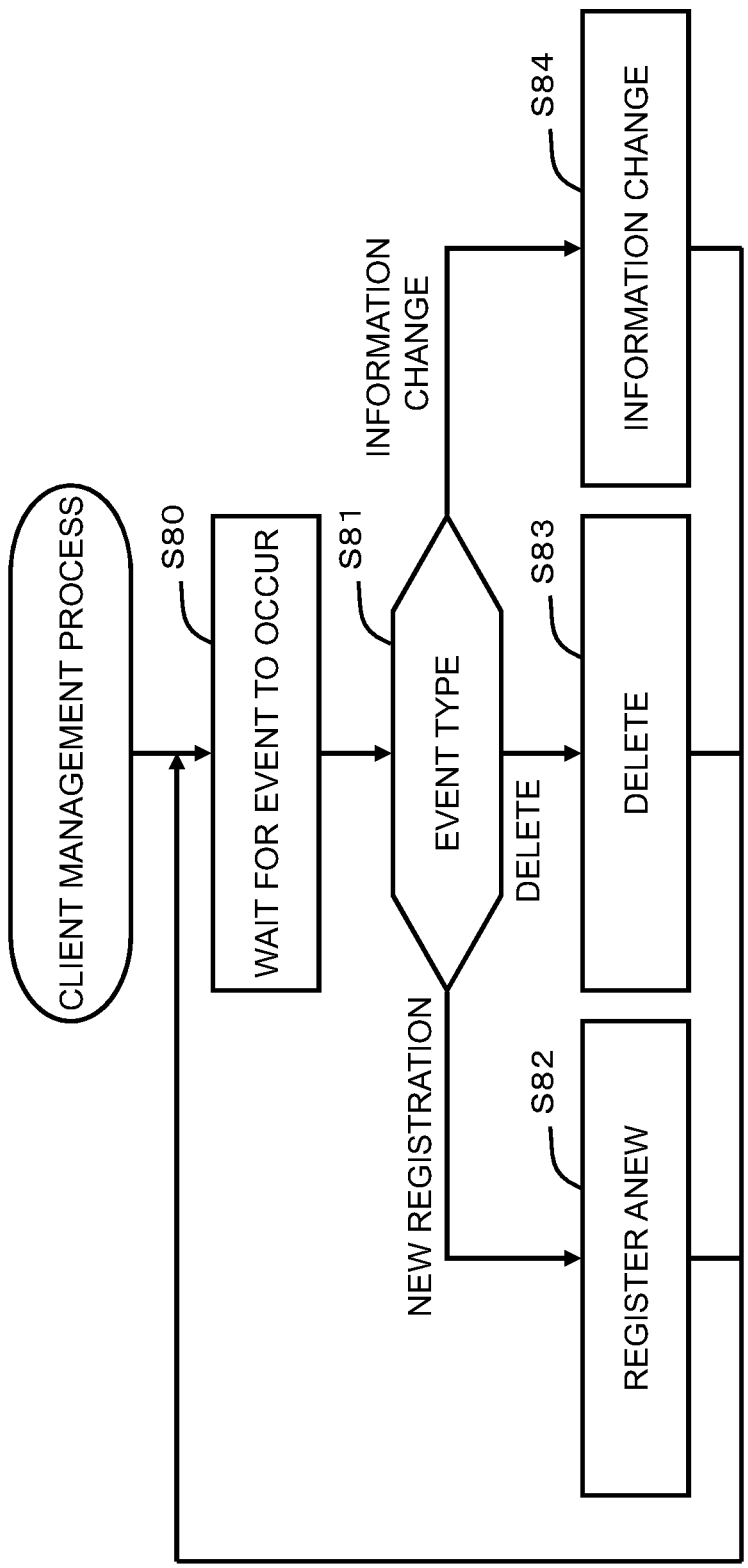
[FIG. 43]

FIG. 43 is a flowchart showing a client management process. The client management part P104 runs together with the SA server, and waits for a client management event to occur (S80).

In a case where a new registration event occurs, the client management part P104 executes a new registration process (S82). In a case where a delete event occurs, the client management part P104 executes a delete process (S83). In a case where an information change event occurs, the client management part P104 executes an information change process (S84).

Figure 44:
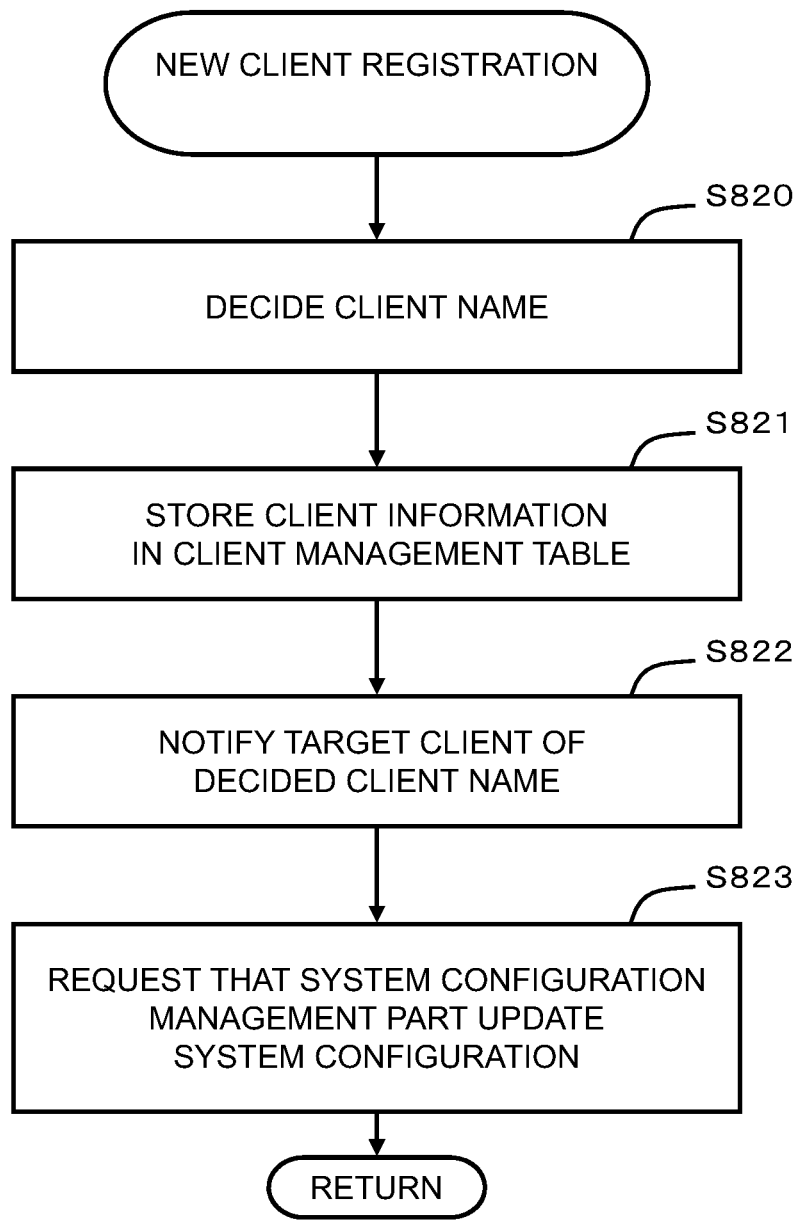
[FIG. 44]

FIG. 44 is a flowchart of the new client registration process shown in S82 of FIG. 43. The client management part P104 decides a new client name (S820), and registers the information of the new client in the client management table T103 (S821). In addition, the client management part P104 notifies the target client computer 20 of the newly decided client name (S822). The client management part P104 requests that the system configuration management part P109 update the system configuration (S823).

Figure 45:
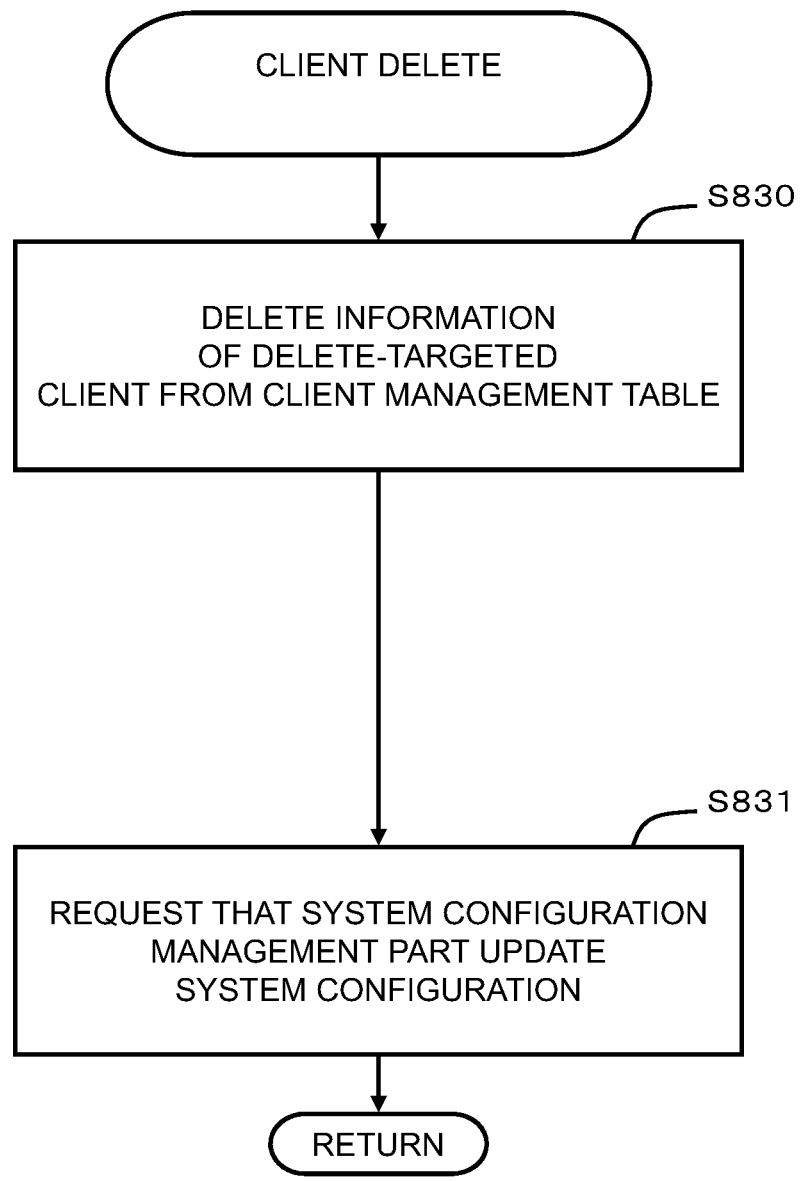
[FIG. 45]

FIG. 45 is a flowchart of the client delete process shown in S83 of FIG. 43. The client management part P104 deletes the information of the delete-targeted client from the client management table T103 (S830), and requests that the system configuration management part P109 update the system configuration (S831).

Figure 46:
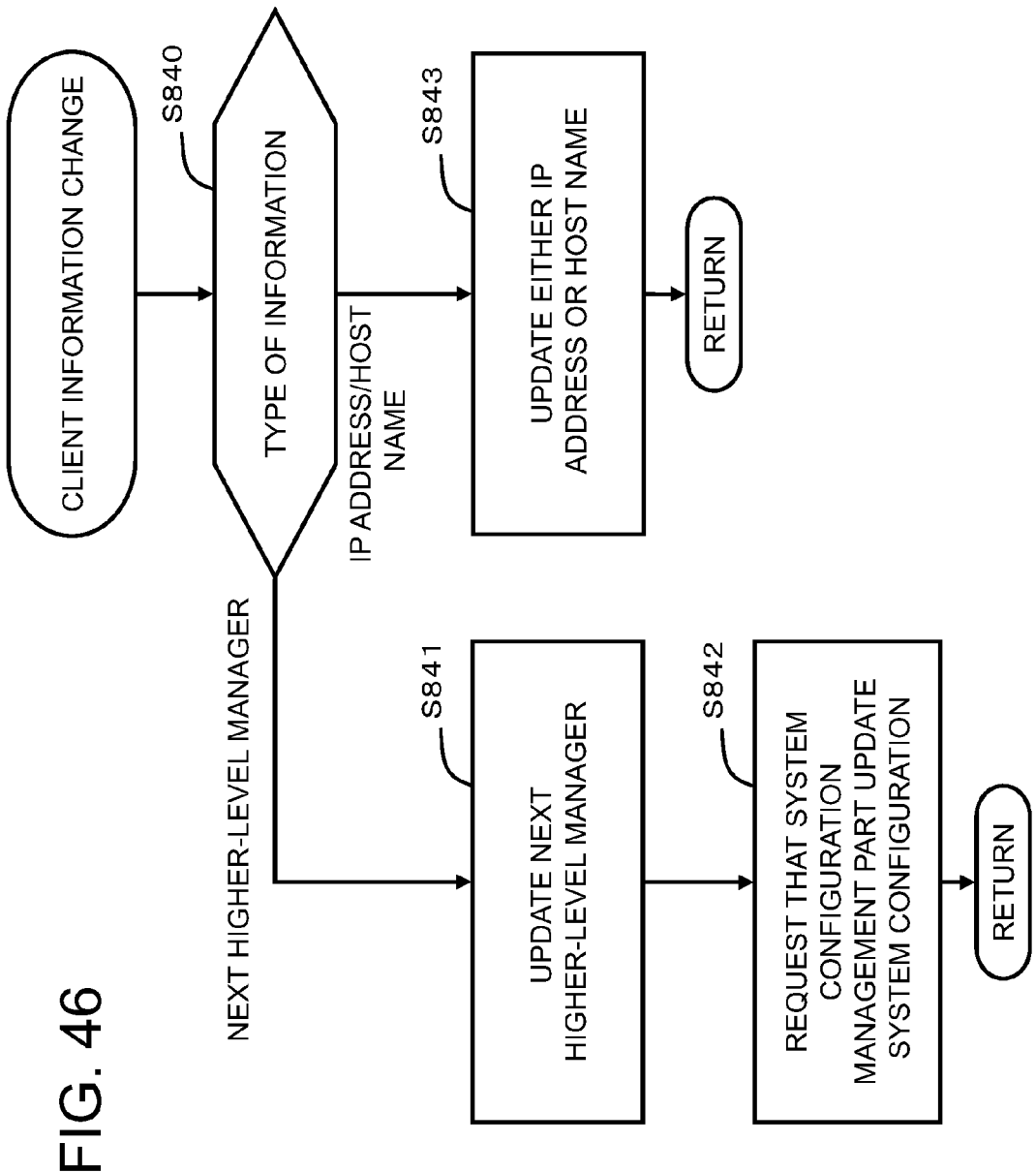
[FIG. 46]

FIG. 46 is a flowchart of the client information change process shown in S84 of FIG. 43. First, the client management part P104 initially determines the type of information that is targeted for change (S840).

In a case where the next-higher-level manager information is to be changed, the client management part P104 updates the information of the next-higher-level manager in the client management table T103 (S841), and requests that the system configuration management part P109 update the system configuration (S842). In the case of an IP address or host name change, the client management part P104 updates either the IP address or the host name in the client management table T103 (S843).

Figure 47:
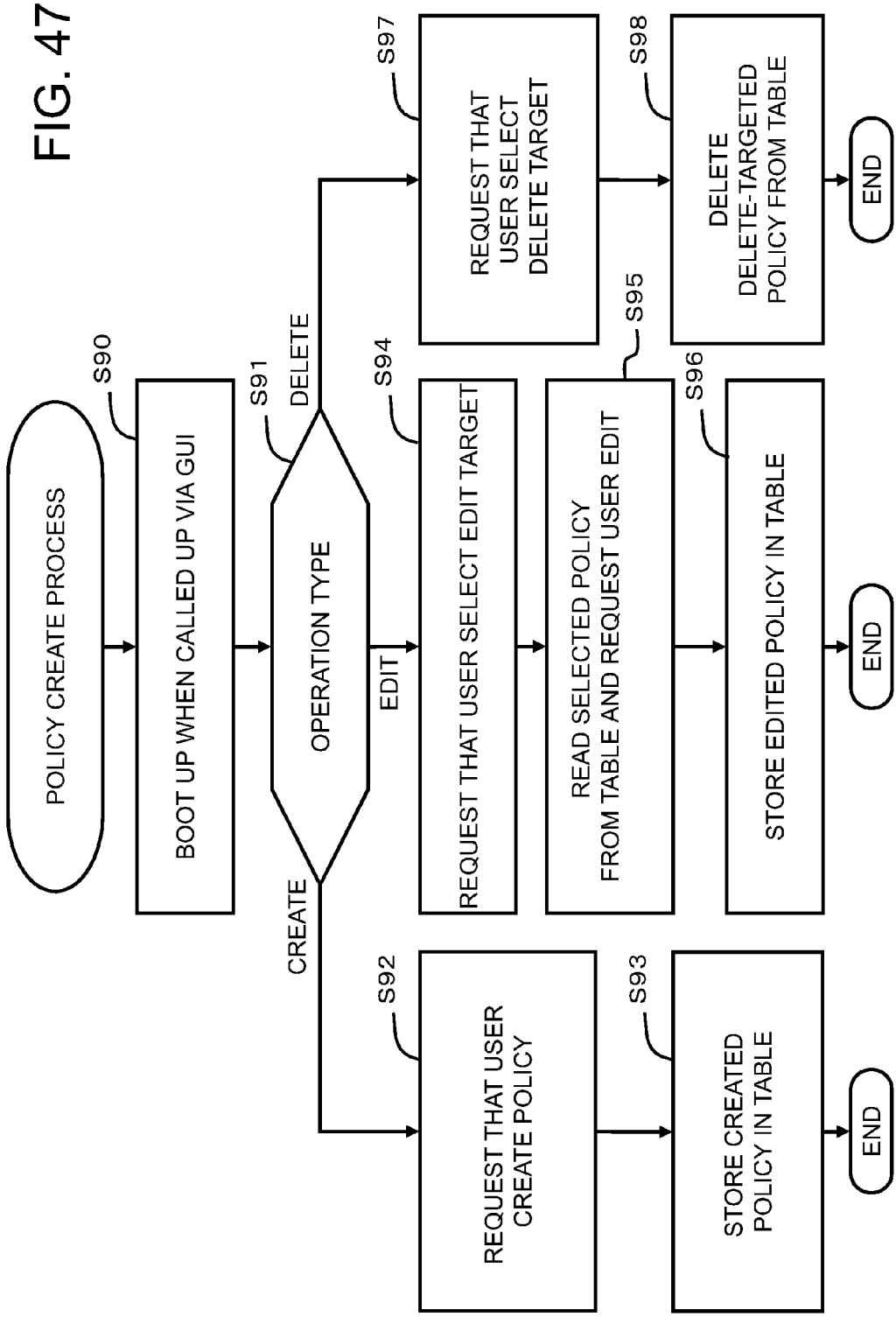
[FIG. 47]

FIG. 47 is a flowchart showing a policy creation process. The policy edit part P105 runs when called by the GUI (S90), and determines the operation type (S91).

In a case where a new policy is to be created, the policy edit part P105 requests that the user create a policy (S92) and stores the created policy in the policy table T104 (S93).

In a case where a registered policy is to be edited, the policy edit part P105 requests that the user select a policy to be targeted for editing (S94), and reads the selected policy from the policy table T104 and requests that the user edit this policy (S95). The policy edit part P105 stores the edited policy in the policy table T104 (S96).

In a case where a registered policy is to be deleted, the policy edit part P105 requests that the user select a policy to be targeted for deletion (S97), and deletes the user-selected policy from the policy table T104 (S98).

Figure 48:
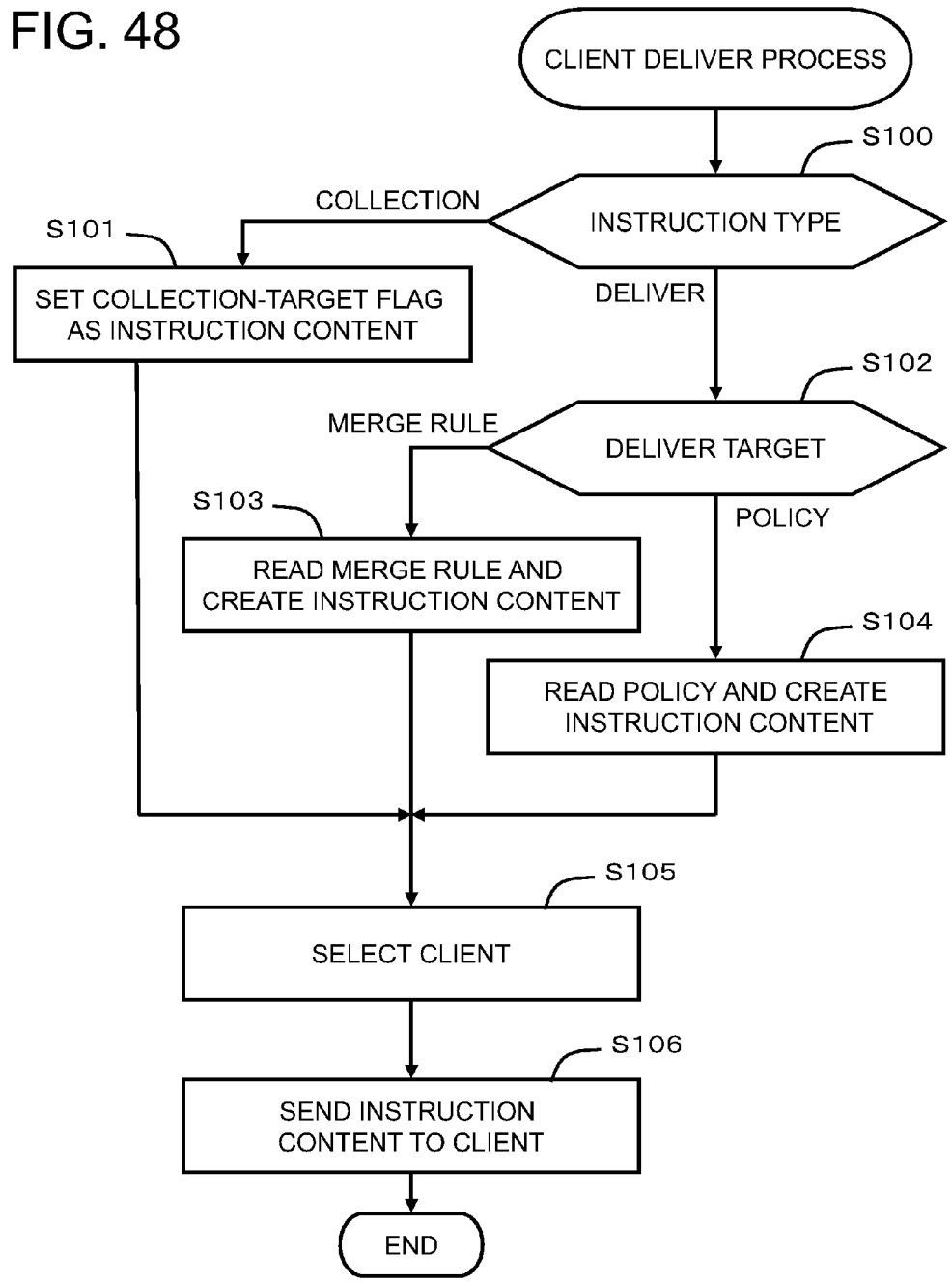
[FIG. 48]

FIG. 48 is a flowchart of a process for delivering either a merge rule or a policy to the client computer 20. The delivery part P106 runs upon being called by the GUI, and determines the type of instruction (S100).

In a case where the collection of information from the client is instructed, the delivery part P106 sets a flag specifying the collection-target information as the instruction content (S101). The delivery part P106 selects the information collection-target client (S105), and sends the instruction content to the client (S106). In accordance with this, the client computer 20 sends the specified information to the SA manager, which is the instruction source.

In a case where the delivery of information to the client is instructed, the delivery part P106 determines the delivery-target information (S102). In a case where a merge rule is to be delivered, the delivery part P106 reads the merge rule from the merge rule table T101, and creates the instruction content (S103). The delivery part P106 selects the delivery-target client and sends the merge rule to the client (S105, S106).

In a case where a policy is to be delivered to the client, the delivery part P106 reads the policy from the policy table T104 and creates the instruction content (S104). The delivery part P106 selects the delivery-target client and sends the policy to the client (S105, S106).

Figure 49:
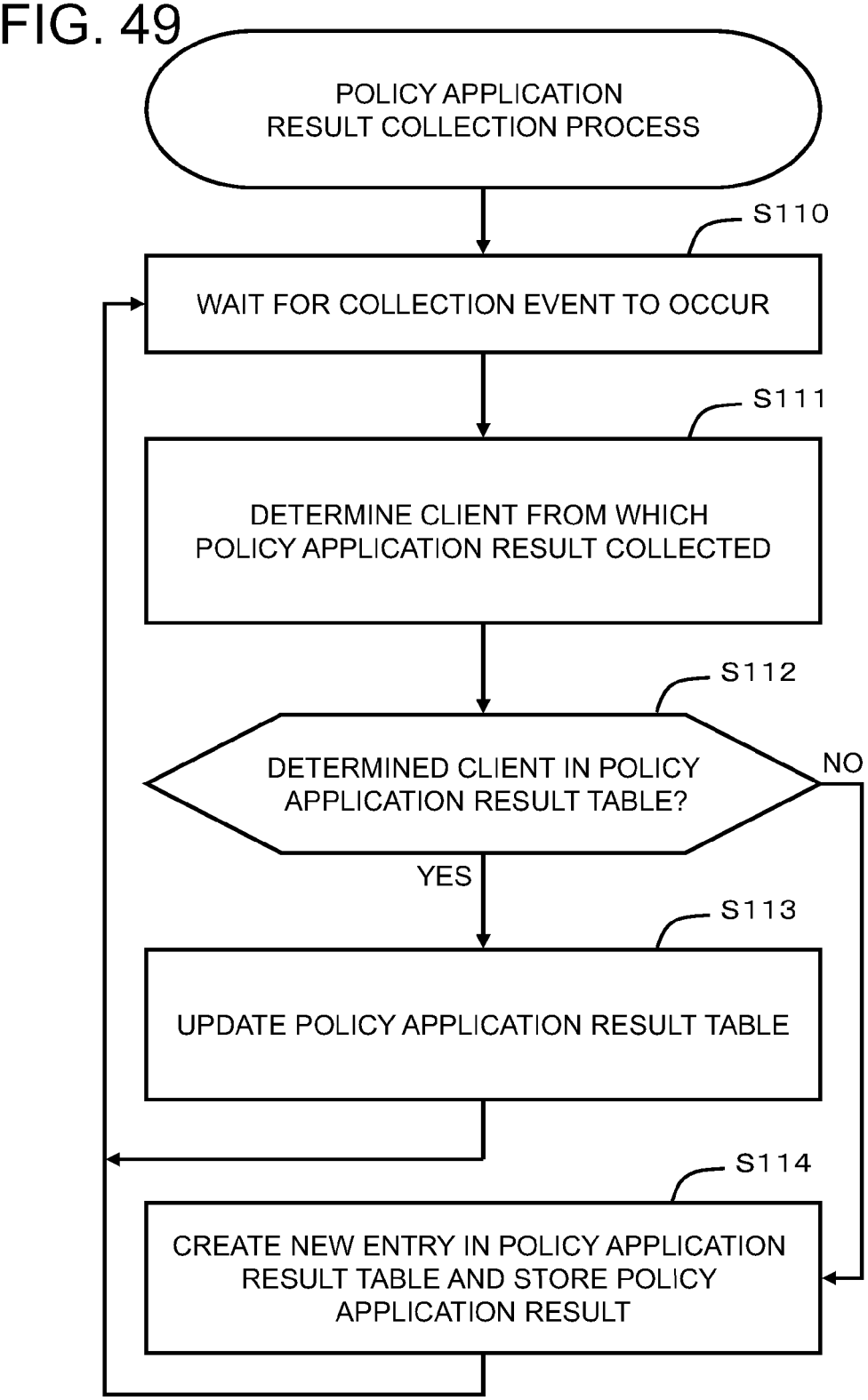
[FIG. 49]

FIG. 49 is a flowchart of a policy application result collection process. The policy application result collection part P107 runs together with the SA server, and waits for an event to occur (S110). The event is the receiving of a policy application result sent from the client computer.

When the event occurs, the policy application result collection part P107 determines the client from which the policy application result has been sent (S111), and determines whether or not this client exists in the policy application result table T105 (S112).

In a case where the client, which is the source of the policy application result, is registered in the policy application result table T105 (S112: YES), the policy application result collection part P107 updates the information in the table T105 (S113).

In a case where the source client is not registered in the policy application result table T105 (S112: NO), the policy application result collection part P107 creates a new entry in the table T105, and stores the policy application result received from the source in this entry (S114).

Figure 50:
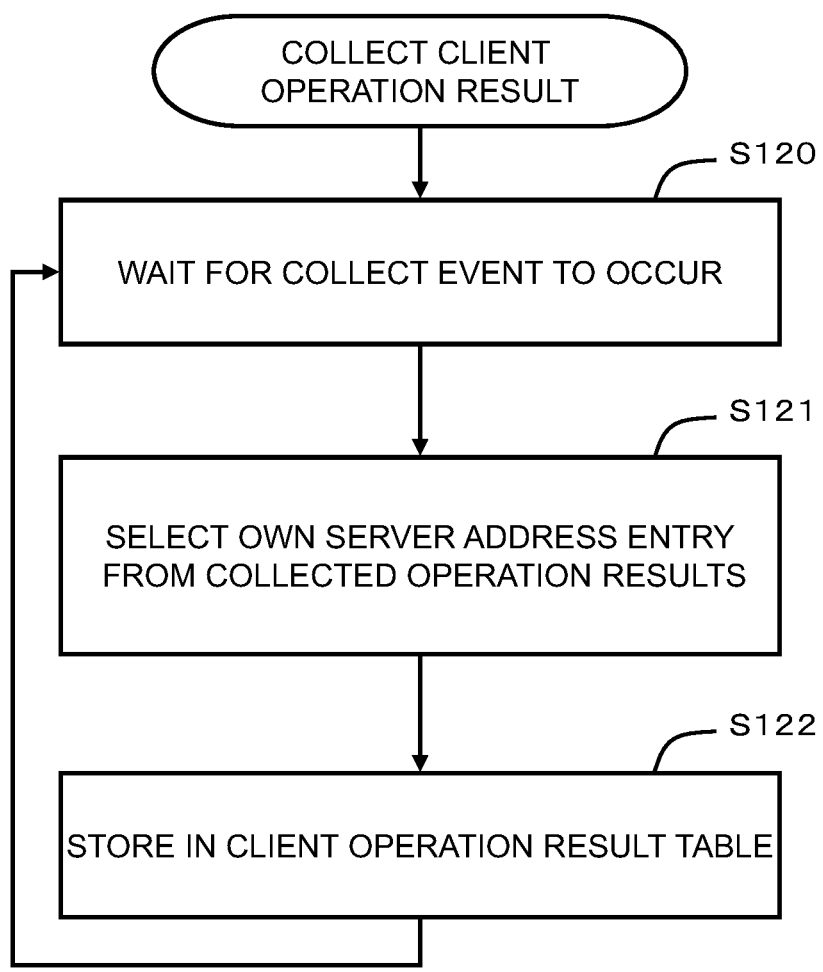
[FIG. 50]

FIG. 50 is a flowchart showing a process for collecting a client operation result from the client computer 20. The client operation result collection and display part (hereinafter, may be abbreviated as the client operation result collection part) P108 runs together with the SA server and waits for a collection event to occur (S120).

When the collection event occurs, the client operation result collection part P108 extracts an entry for its own server from among the received client operation results (S121). The client operation result collection part P108 stores the extracted entry information in the client operation result table T106 (S122).

Figure 51:
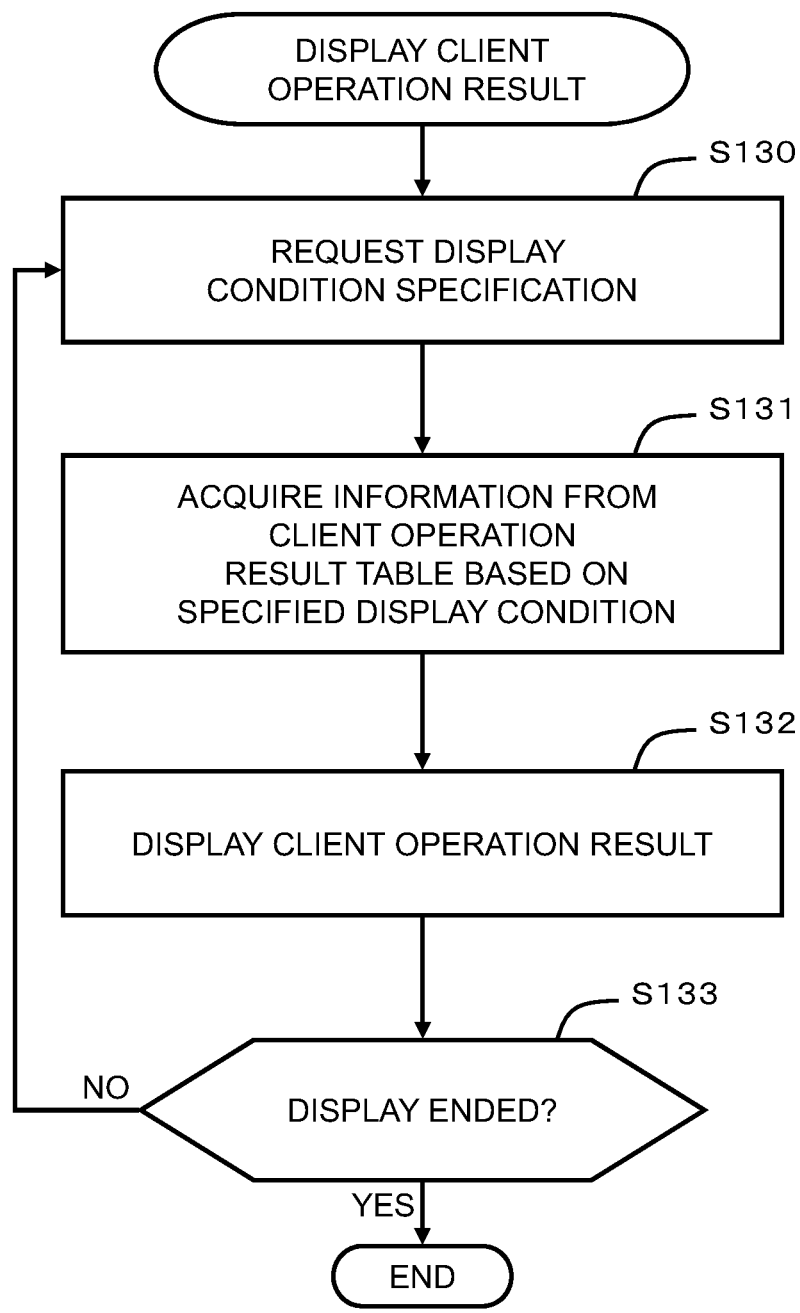
[FIG. 51]

FIG. 51 is a flowchart showing a process for displaying the collected client operation result. The client operation collection and display part P108 will be explained as the client operation result display part here.

The client operation result display part runs in accordance with being called by the GUI, and requests the specification of a display condition (S130). The client operation result display part acquires the information from the client operation result table T106 based on the specified display condition (S131), and displays the client operation result (S132).

In a case where end-of-display is instructed (S133: YES), this process ends. In a case where end-of-display is not instructed (S133: NO), processing returns to S130.

Figure 52:
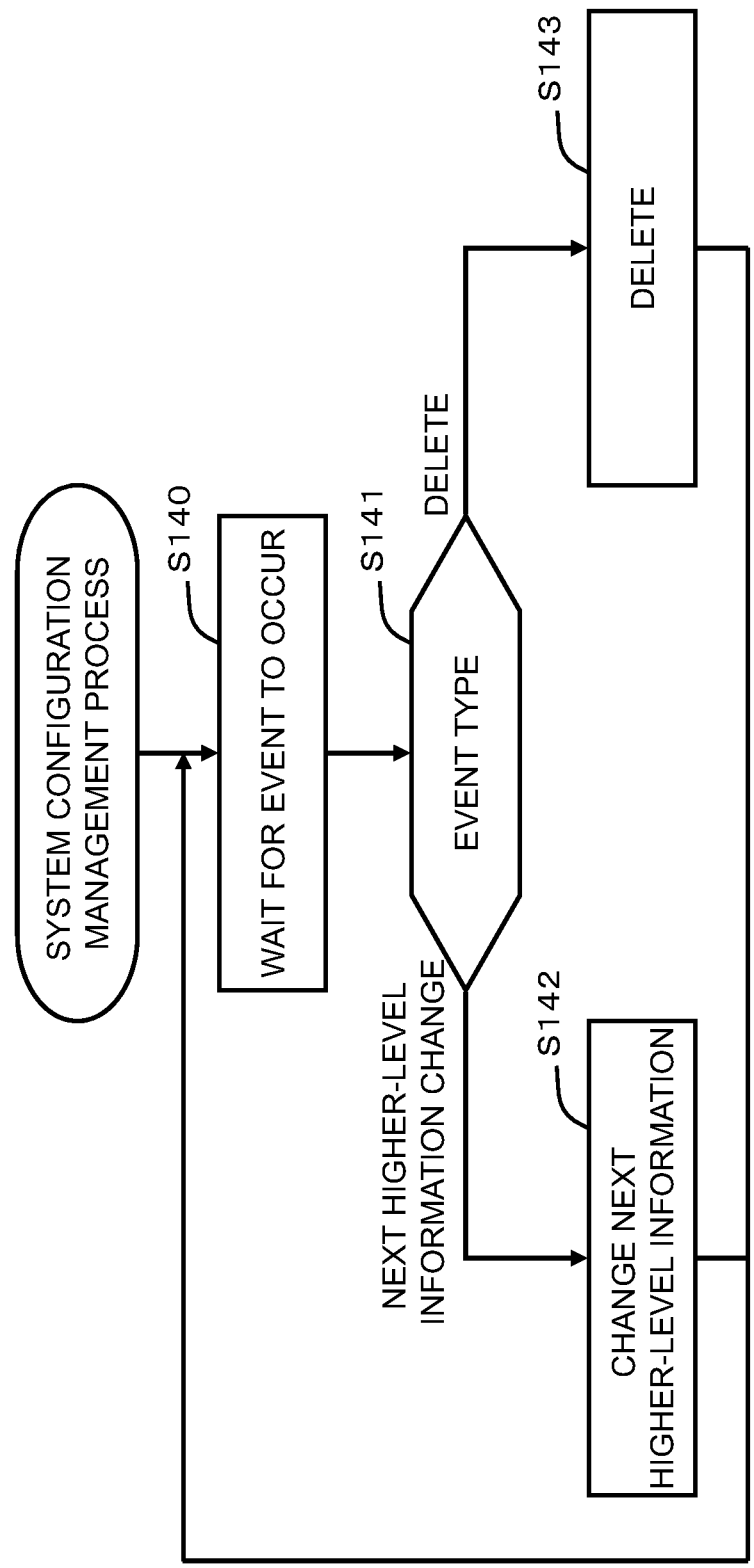
[FIG. 52]

FIG. 52 is a flowchart showing a system configuration management process. The system configuration management part P109 runs together with the SA server, and waits for a system configuration change event to occur (S140).

In a case where next-higher-level information is to be changed, the system configuration management part P109 changes the next-higher-level information of the system configuration management table T107 (S142). In a case where either the manager or the client is to be deleted, the system configuration management part P109 deletes the delete-target information from the system configuration management table T107 (S143).

Figure 53:
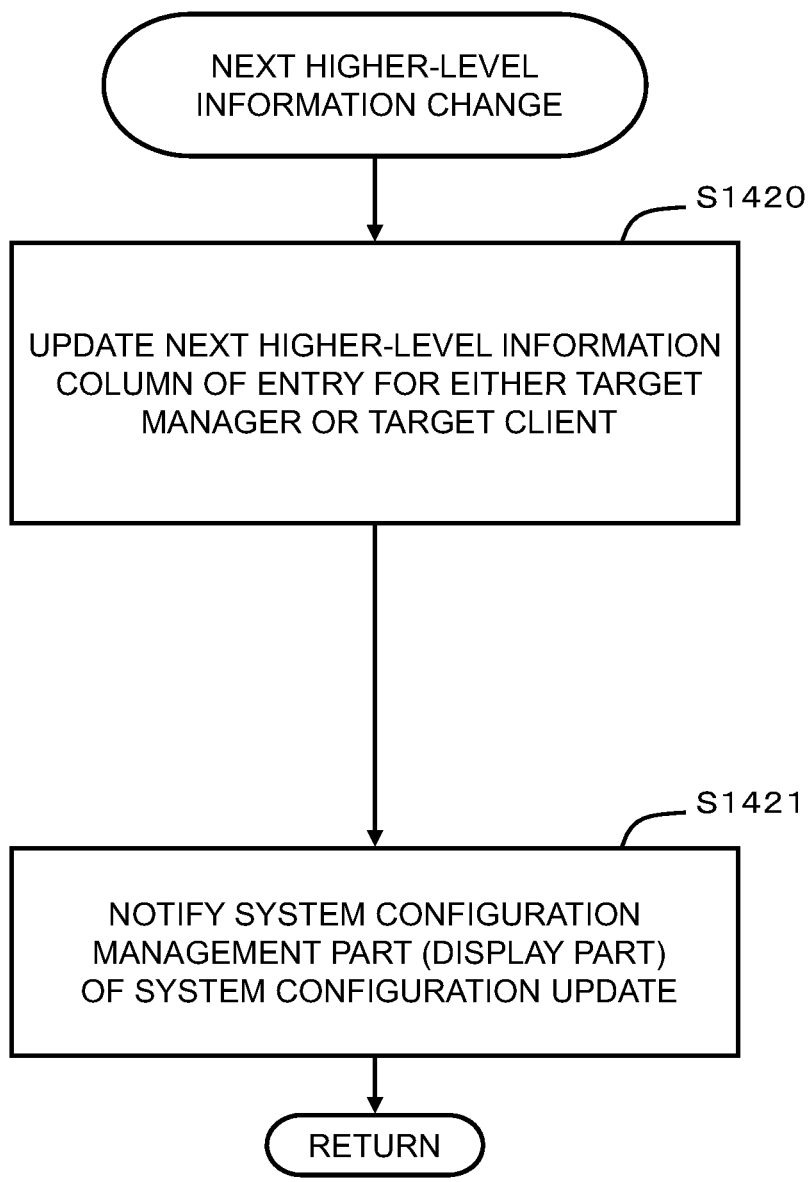
[FIG. 53]

FIG. 53 is a flowchart of the next-higher-level information change process shown in S142 of FIG. 52. The system configuration management part P109 changes the next-higher-level information of the target manager entry or the target client entry in the system configuration management table T107 (S1420), and notifies the system configuration management part (specifically, the program in charge of displaying the system configuration) of the system configuration change (S1421).

Figure 54:
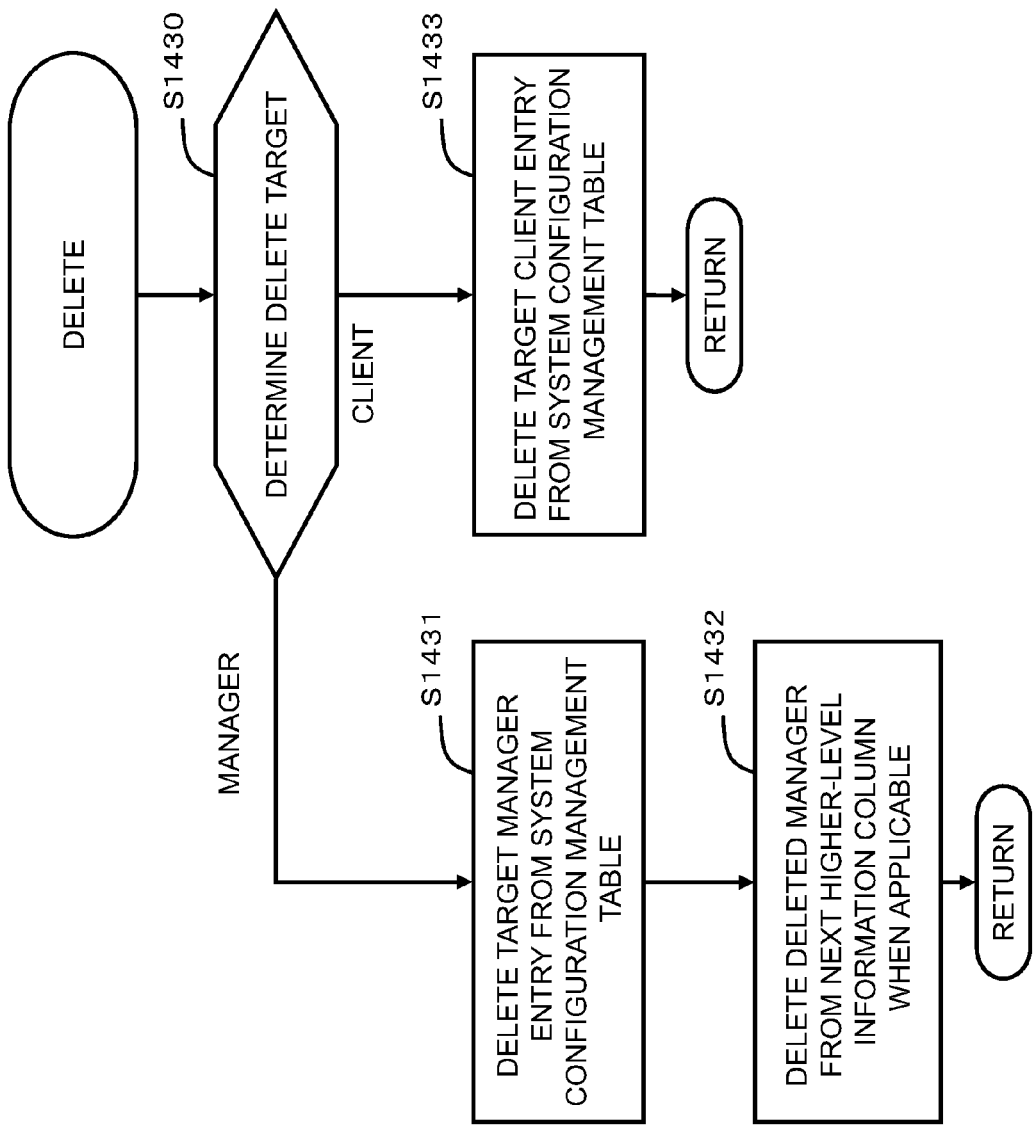
[FIG. 54]

FIG. 54 is a flowchart of the delete process shown in S143 of FIG. 52. The system configuration management part P109 determines the delete target (S1430). In a case where the manager is to be deleted, the system configuration management part P109 deletes the target manager entry from the system configuration management table T107 (S1431). In addition, in a case where the deleted manager is also registered in the next-higher-level information column of the system configuration management table T107, the system configuration management part P109 deletes the target manager from the column of the next-higher-level information (S1432).

In a case where the client is to be deleted, the system configuration management part P109 deletes the target client entry from the system configuration management table T107 (S1433).

FIG. 55 is a flowchart of a process for displaying the system configuration. The explanation will use a system configuration display part, which is part of the system configuration management and display part P109, as the subject. The system configuration display part runs when called by the GUI, and reads and displays the system configuration from the system configuration management table T107 (S150).

The system configuration display waits for a re-display event to occur (S151), and when the re-display event occurs, reads the system configuration from the system configuration management table T107 once again and displays this configuration (S152).

The process for logging in to an ordinary manager will be explained by referring to FIG. 56. The manager management part P103 of the ordinary management server runs when called by the GUI (S160), and displays a login screen (S161).

The manager management part P103 delivers an ID and password inputted by the user to the user management part P100 of the management server, and has user authentication performed (S162). When user authentication is successful (S163: YES), the manager management part P103 displays the ordinary user GUI (S164). When user authentication fails (S163: NO), the manager management part P103 executes error processing (S165).

With the exception of not being able to create a merge rule, the other processes executed by the ordinary manager are the same as those described for the SA manager for the most part, and as such, explanations thereof will be omitted.

Figure 57:
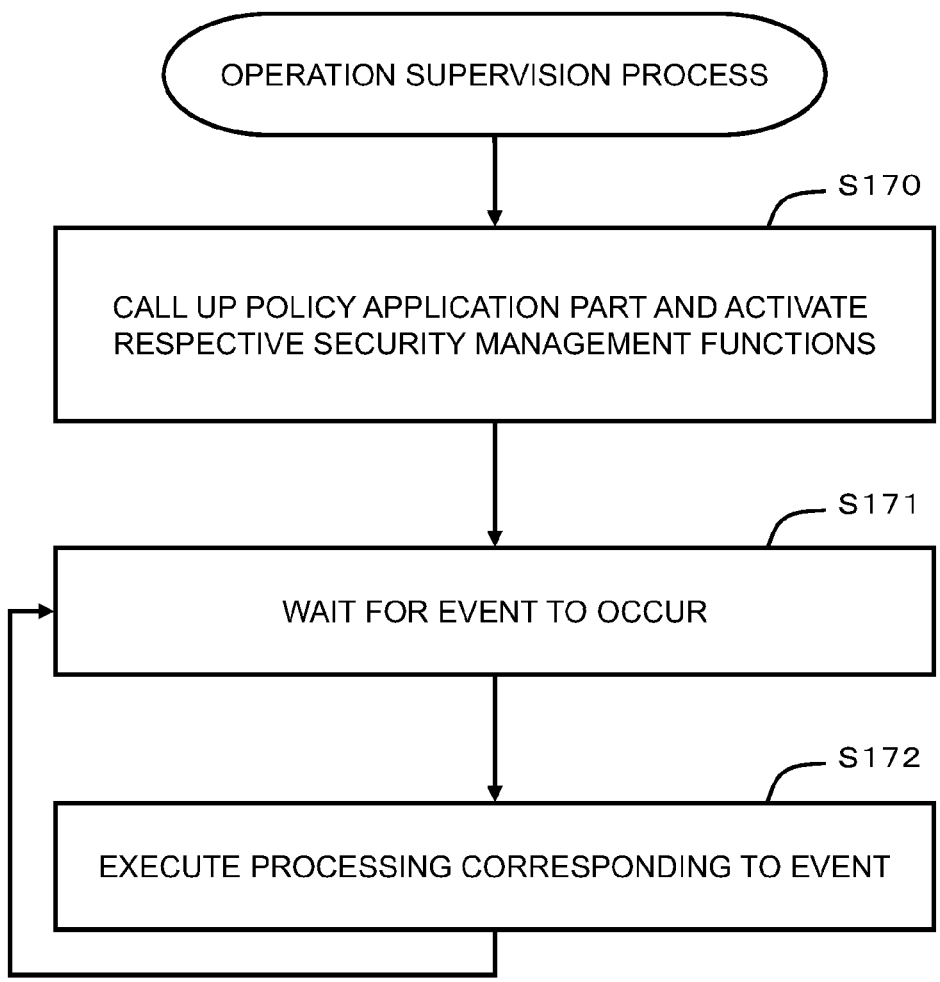
[FIG. 57]

The operation of the client computer 20 will be explained. FIG. 57 is a flowchart of an operation supervision process. The operation supervision part P200 runs when the client computer 20 boots up.

The operation supervision part P200 calls the policy application part P204, and runs the respective security management function groups P207 (S170). Each security management function group P207 operates here based on the merged policy. The operation supervision part P200 waits for an operation supervision event to occur (S171), and when an operation supervision event occurs, executes the process corresponding to the content of this event (S172).

Figure 58:
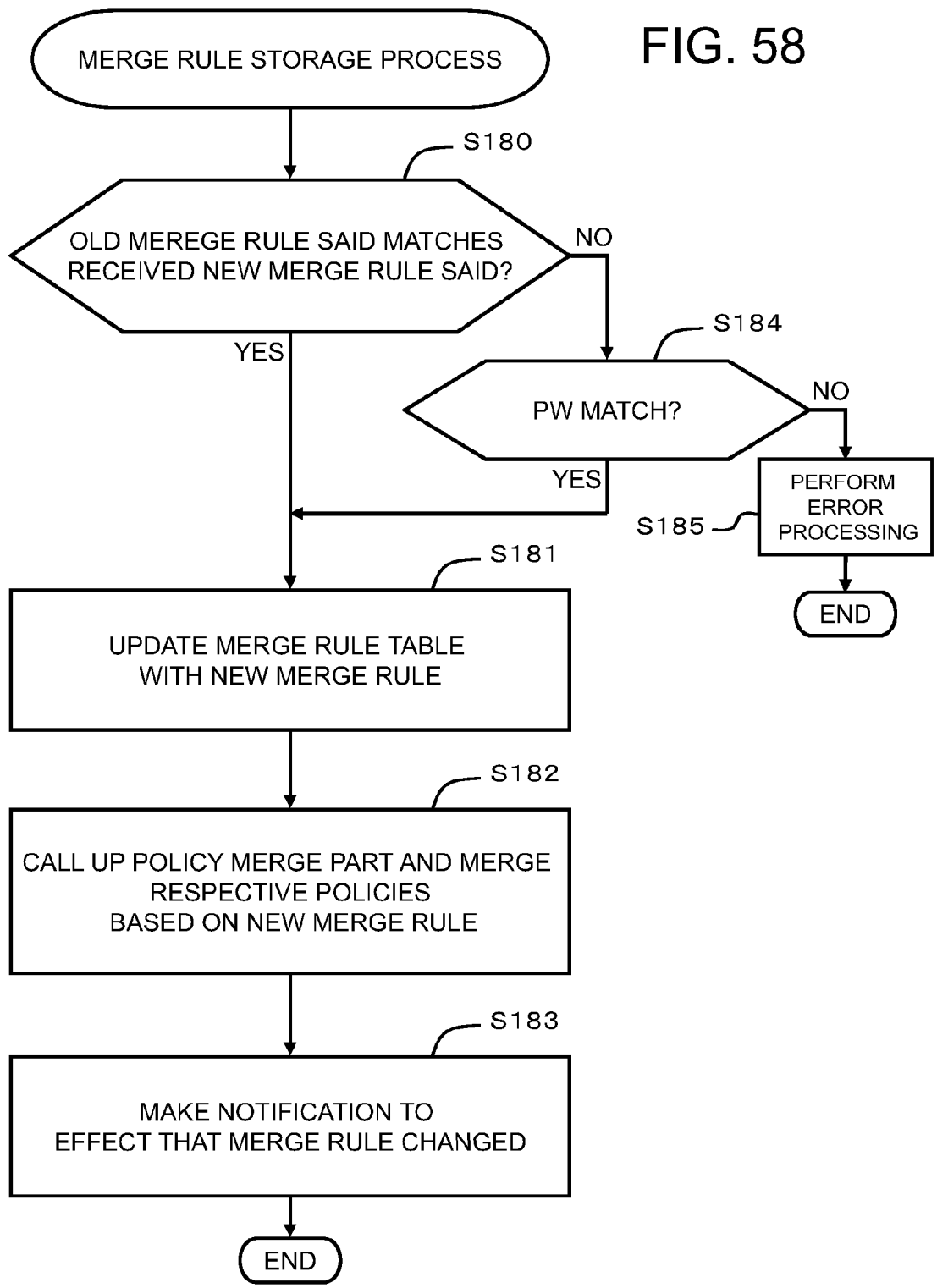
[FIG. 58]

FIG. 58 is a flowchart showing a merge rule storage process. The merge rule storage part P201 is run by the operation supervision part P200.

The merge rule storage part P201 determines whether or not the SAID of the merge rule, which has already been received (may also be called the old merge rule), matches the SAID of a newly received merge rule (may also be called the new merge rule) (S180).

In a case where the old merge rule SAID and the new merge rule SAID match (S180: YES), the merge rule storage part P201 uses the new merge rule to upgrade the old merge rule that is stored in the merge rule table T201 (S181).

The merge rule storage part P201 calls the policy merge part P203 and has the respective policies merged based on the new merge rule (S182). The merge rule storage part P201 notifies the SA manager to the effect that the merge rule has changed (S183).

In a case where the old merge rule SAID and the new merge rule SAID do not match (S180: NO), the merge rule storage part P201 determines whether or not the password of the old merge rule and the password of the new merge rule are a match (S184). When the respective passwords match (S184: YES), the processing moves to S181, the new merge rule is stored in the merge rule table T201 (S181), and the respective policies are merged anew (S182).

In a case where the respective passwords do not match (S184: NO), the merge rule storage part P201 performs error processing (S185).

Figure 59:
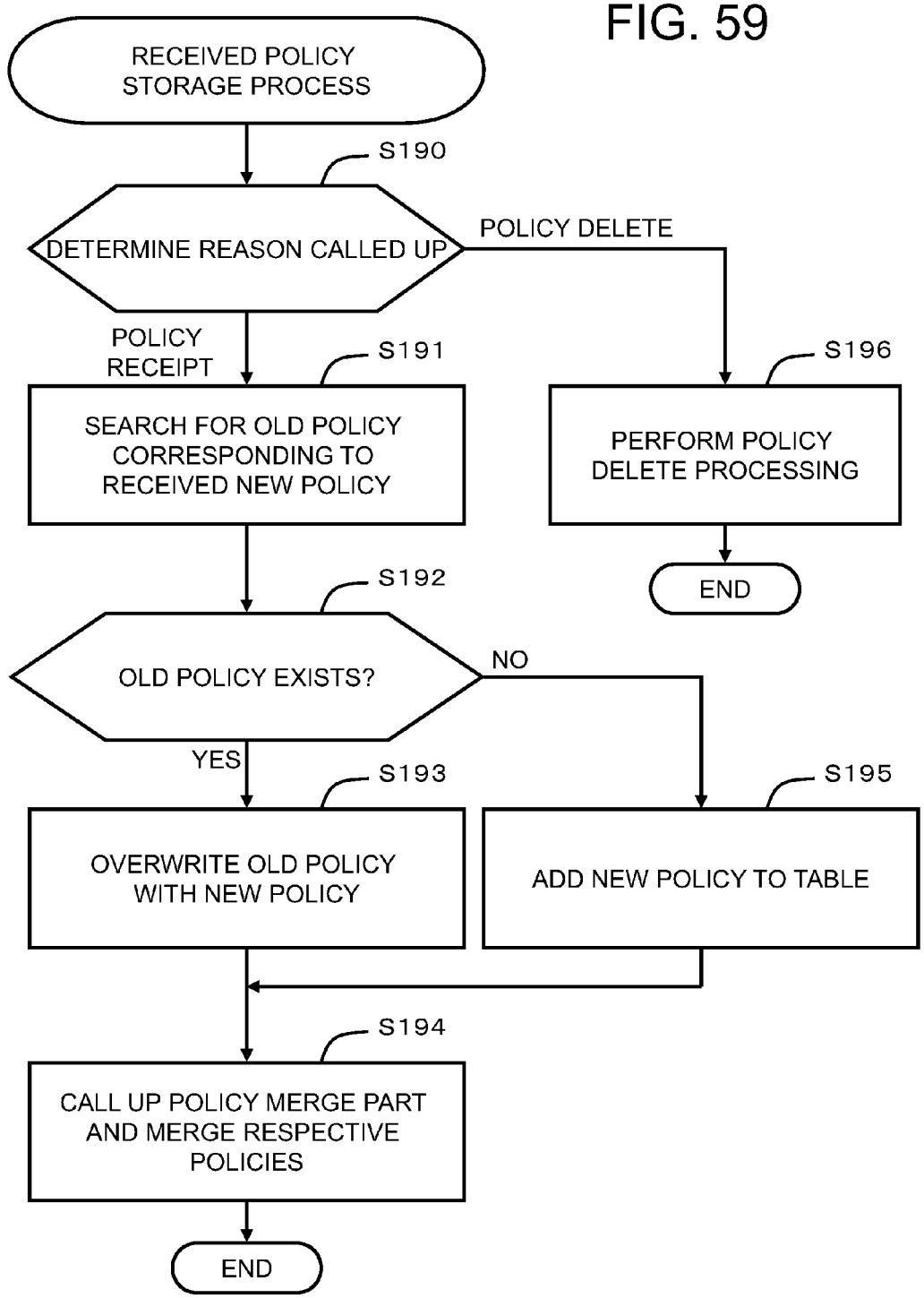
[FIG. 59]

FIG. 59 is a flowchart showing a received policy storage process. The policy storage part P202 runs upon being called by the operation supervision part P200, and determines the reason for its being called (S190).

In a case where a policy has been received, the policy storage part P202 retrieves the old policy corresponding to the received new policy from the received policy table T202 (S191). In a case where an old policy corresponding to the received new policy exists (S192: YES), the policy storage part P202 overwrites the old policy with the new policy (S193). In a case where an old policy corresponding to the received new policy does not exist (S192: NO), the policy storage part P202 adds the new policy to the received policy table T202 (S195).

The policy storage part P202 calls the policy merge part P203, and has it merge a plurality of policies including the new policy (S194).

In this embodiment, in a case where either a merge rule or a policy is changed like this, the merging of a plurality of policies is performed once again, and an individual policy is created in each client computer.

In a case where the reason for the policy storage part P202 being called is to delete the received policy, a policy deletion process is performed (S196).

Figure 60:
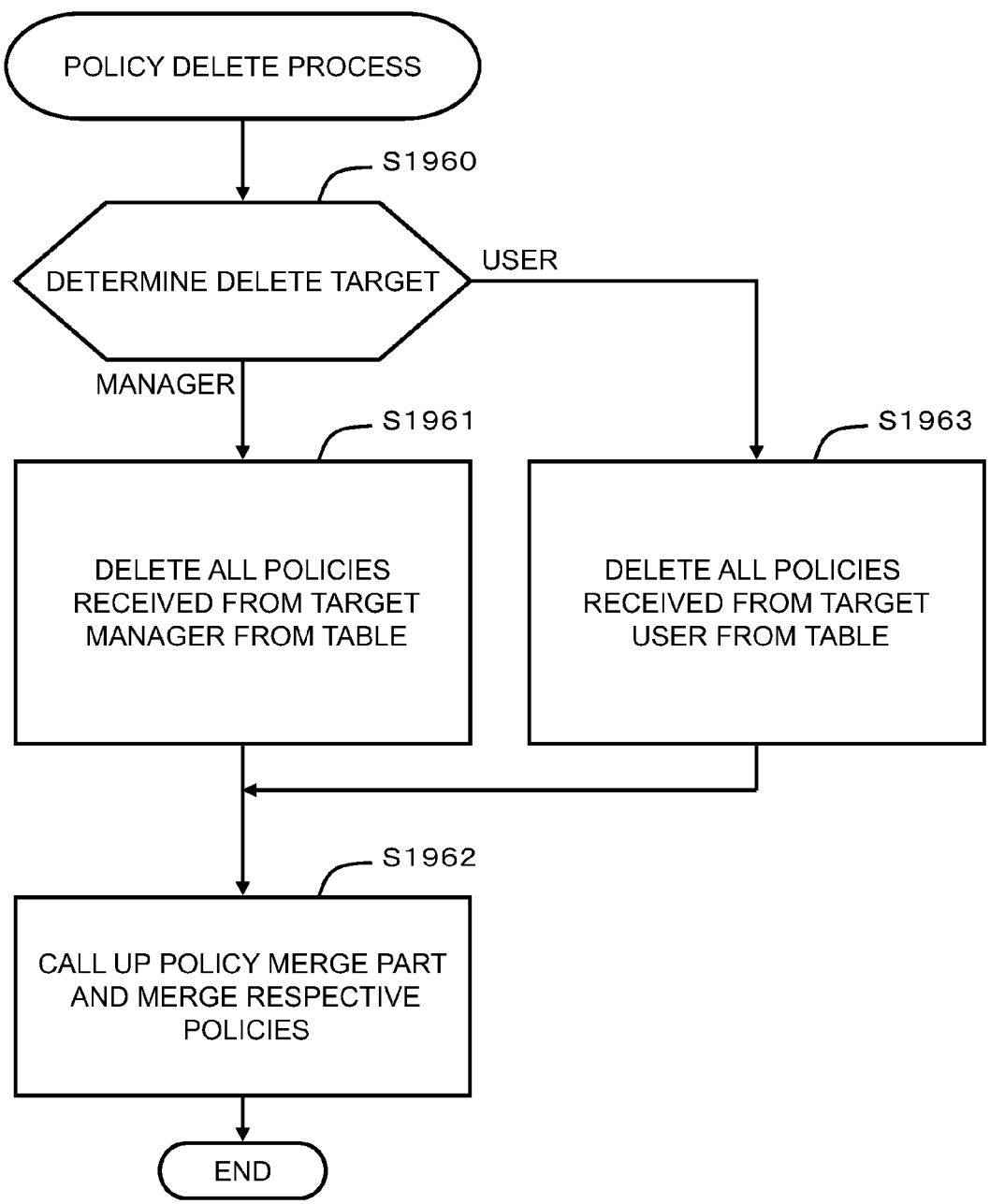
[FIG. 60]

FIG. 60 is a flowchart of the policy deletion process shown in S196 of FIG. 59. The policy storage part P202 determines whether the delete target is a manager or a user (S1960).

When the delete target is a manager, the policy storage part P202 deletes all the policies that have been received from the targeted manager from the received policy table T202 (S1961). Then, the policy storage part P202 calls the policy merge part P203, and has it merge the remaining policies (S1962). In a case where there is only one policy registered in the client computer 20, this one policy is used as-is.

When the delete target is a user, the policy storage part P202 deletes all the policies that have been received from the targeted user from the received policy table T202 (S1963), calls the policy merge part P203, and has it merge the remaining policies (S1962).

Figure 61:
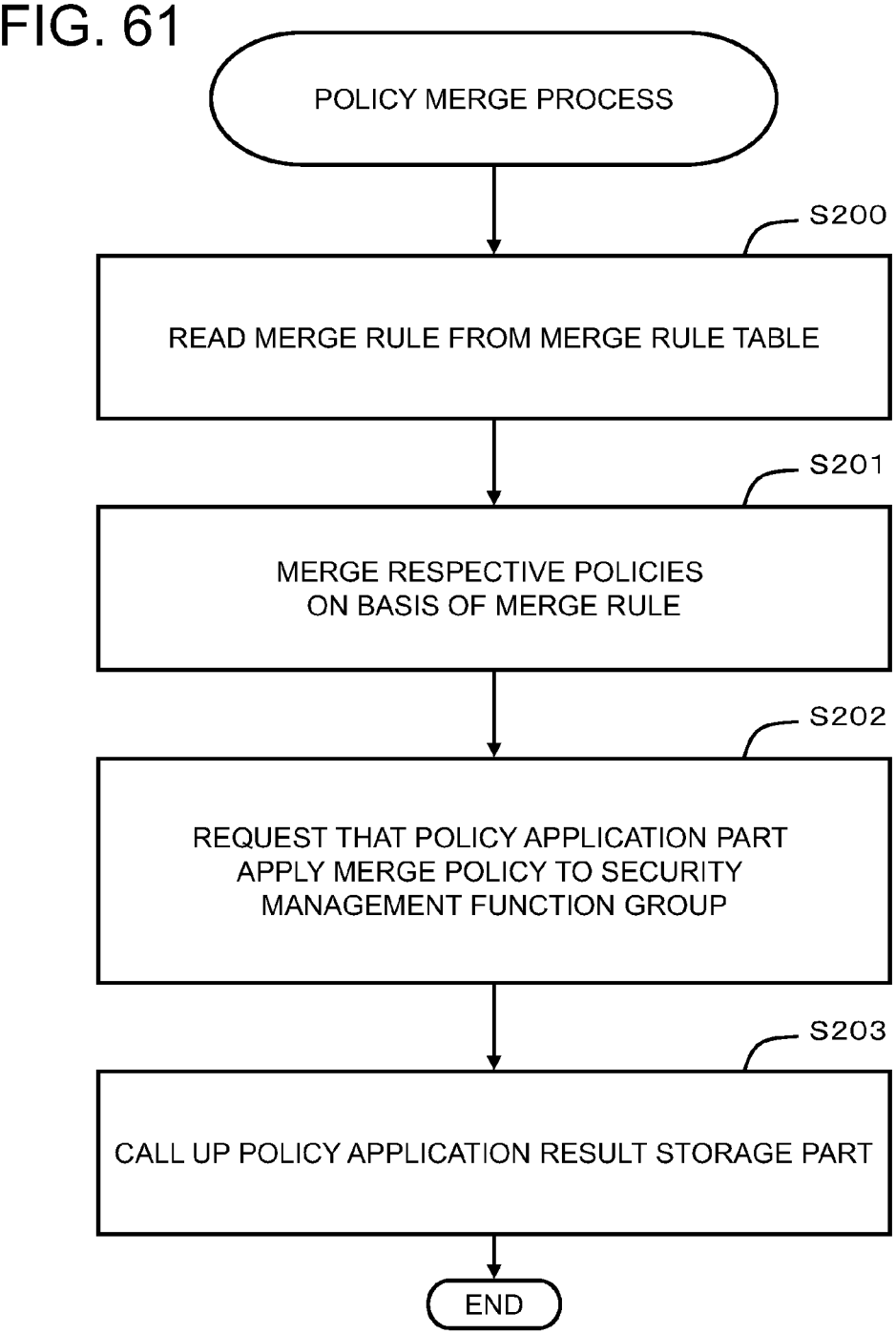
[FIG. 61]

FIG. 61 is a flowchart showing a policy merge process. The policy merge part P203 runs upon being called by either the merge rule storage part P201 or the policy storage part P202.

The policy merge part P203 reads the merge rule from the merge rule table T201 (S200), and merges the respective policies based on the merge rule (S201). In accordance with this, an individual policy is created for each client. There may be cases in which merged policy is used to mean policies that have been merged.

The policy merge part P203 requests that the policy application part P204 apply the merge policy (the policy created in each client) to the security management function group P207 (S202). The policy merge part P203 calls the policy application result storage part P205 and ends the processing (S203).

Figure 62:
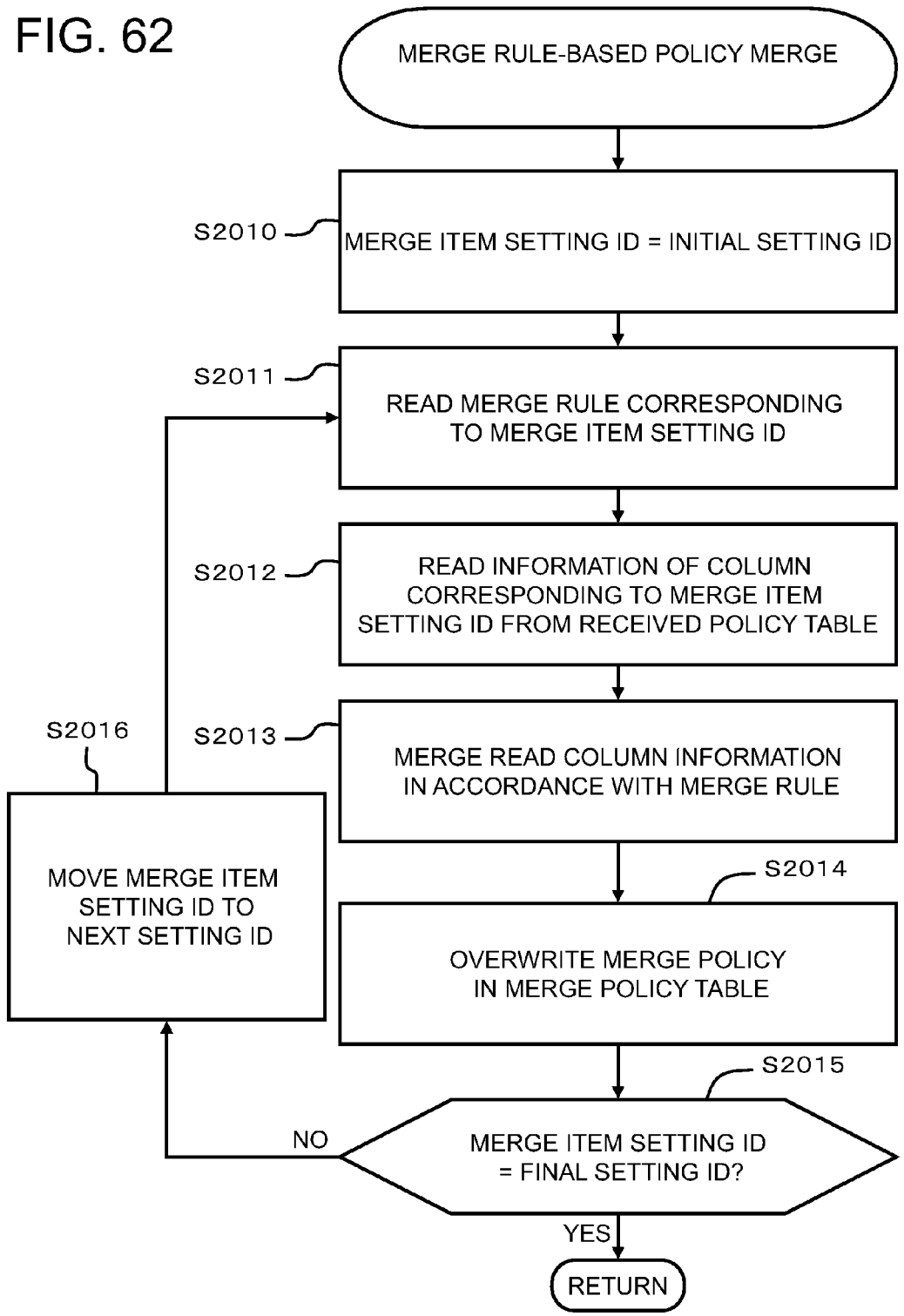
[FIG. 62]

FIG. 62 is a flowchart of the process for merging the respective policies based on the merge rule shown in S201 of FIG. 61. The policy merge part P203 sets an initial ID in the variable (the merge item setting ID) showing the setting ID of the items to be merged (S2010).

The policy merge part P203 reads the merge rule corresponding to the merge item setting ID from the merge rule table T201 (S2011), reads the information of the column corresponding to the merge item setting ID from the received policy table P202 (S2012), and merges the read-in column information in accordance with the merge rule (S2013).

The policy merge part P203 saves the merged policy via a overwrite to the merge policy table T203 (S2014). The policy merge part P203 determines whether or not the merge item setting ID constitutes the last setting ID (S2015). In a case where the merge item setting ID has not reached the last setting ID (S2015: NO), the policy merge part P203 moves the merge item setting ID to the next setting ID (S2016) and returns to S2011.

Figure 63:
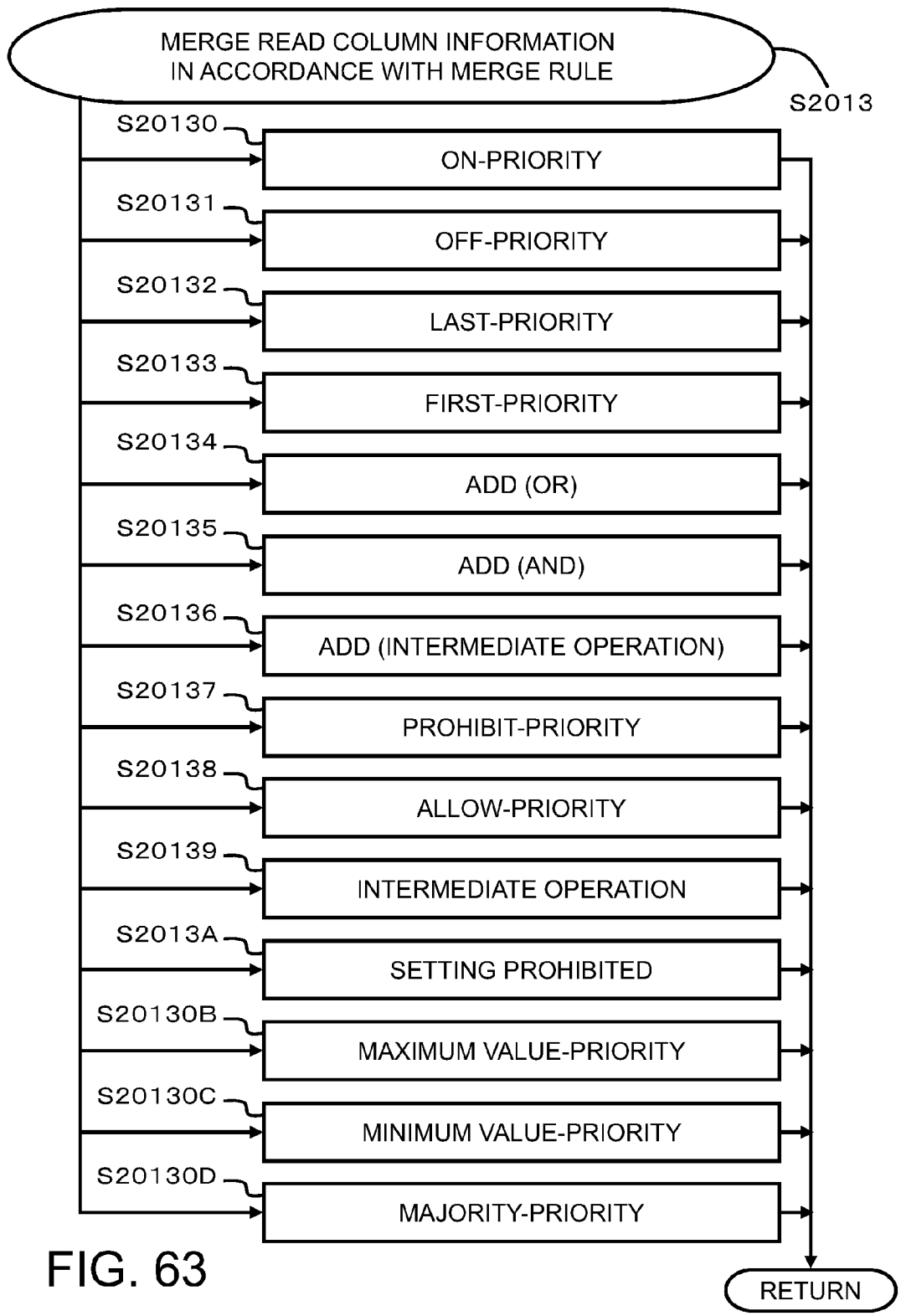
[FIG. 63]

FIG. 63 is a flowchart of the process for merging the read-in column information in accordance with the merge rule shown in S2013 of FIG. 62. In this process, a merge is carried out by branching to any of the individual merge processes of S20130 through S2013D in accordance with the type of merge rule applied to the items to be merged.

As described hereinabove, for example, the individual merge processes may include the ON-priority (S20130), the OFF-priority (S20131), the last-priority (S20132), the first-priority (S20133), the add (OR) (S20134), the add (AND) (S20135), the add (intermediate operation) (S20136), the prohibit-priority (S20137), the allow-priority (S20138), the intermediate operation (S20139), the setting prohibited (S2013A), the maximum value-priority (S2013B), the minimum value-priority (S2013C), and the majority-priority (S2013D).

Figure 64:
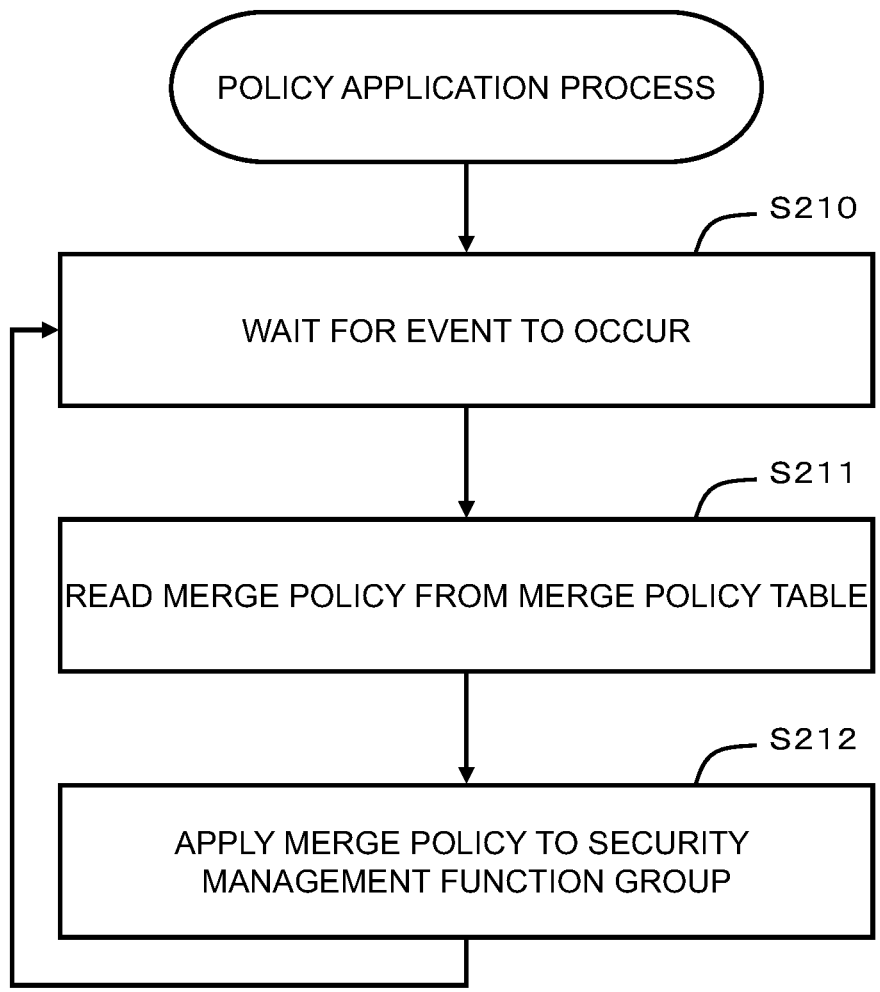
[FIG. 64]

FIG. 64 is a flowchart showing a policy application process. The policy application part P204 runs when the client computer 20 boots up, and waits for a policy application event to occur (S210).

When an event occurs, the policy application part P204 reads the merge rule from the merge rule table T201 (S211), and applies the read-in merge rule to the security management function group P207 (S212).

Figure 65:
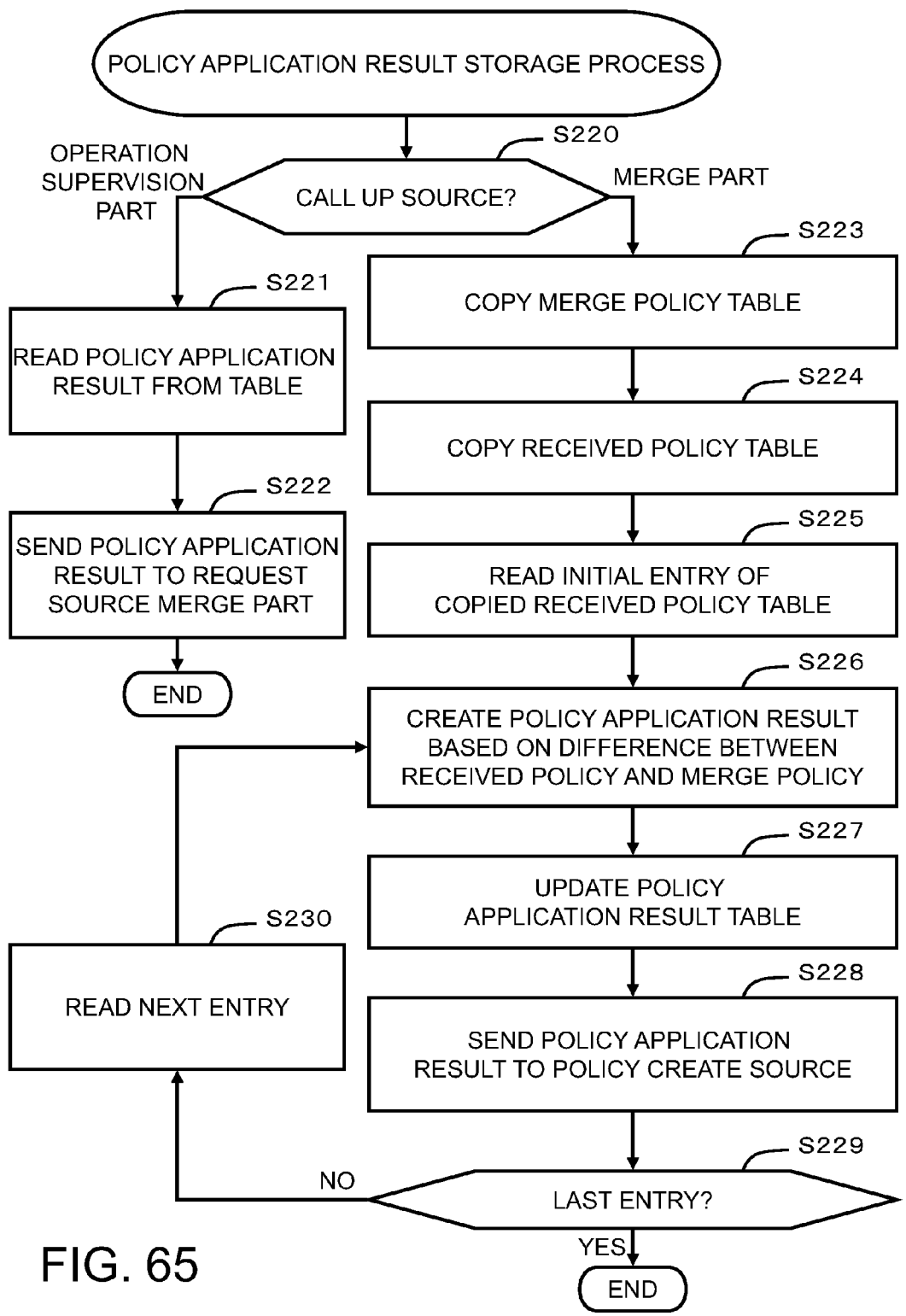
[FIG. 65]
Figure 66:
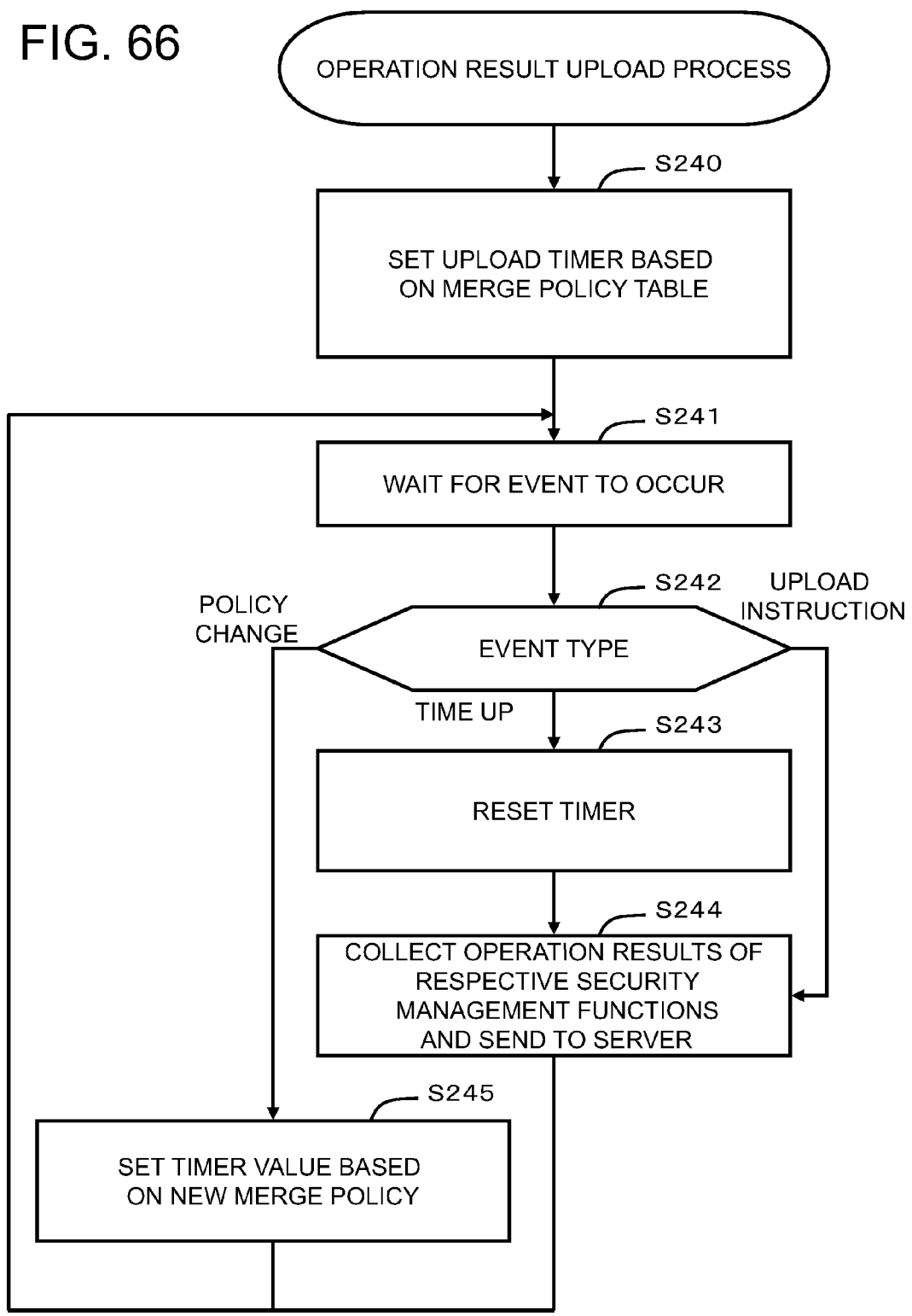
[FIG. 66]

FIG. 65 is a flowchart showing a policy application result storage process. The policy application result storage part P205 runs when called by either the operation supervision part P200 or the policy merge part P203.

The policy application result storage part P205 determines the call source (S220). When called by the operation supervision part P200, the policy application result storage part P205 reads the information from the policy application result table T204 (S221) and sends this information to the request source (S222).

In a case where the call source is the policy merge part P203, the policy application result storage part P205 copies the merged policy table T203 (S223), and also copies the received policy table T202 (S224). Since these tables T202 and T203 are important, they are copied and utilized.

The policy application result storage part P205 reads the first entry from the received policy table T202 that was copied (S225), creates a policy application result based on the difference between the received policy and the merged policy (S226), and updates the policy application result table T204 (S227).

The policy application result storage part P205 sends the policy application result to the policy creation source (S228). The policy application result storage part P205 creates policy application results while moving from one entry to the next (S229: NO) until the last entry is processed (S230).

FIG. 65 is a flowchart of an operation result upload process. The operation result upload part P206 (hereinafter, the upload part P206) runs when the client computer 20 boots up.

The upload part P206 reads the log upload setting of the merge policy, sets an upload timer (S240), and waits for an upload event to occur (S241). Time-up, policy change, and upload instruction reception are prepared as events. When an event occurs, the upload part P206 determines the type of event (S242).

In a case where the upload timer has reached a prescribed time and time is up, the upload part P206 resets the timer (S243), collects the operation result of the security management function group P207, and sends this result to the higher-level manager (S244).

In a case where the type of event is a policy change, the upload part P206 sets the value of the upload timer based on the new merge policy (S245) and returns to S241.

In a case where the type of event is the reception of an upload instruction, the upload part P206 moves to S244.

Figure 67:
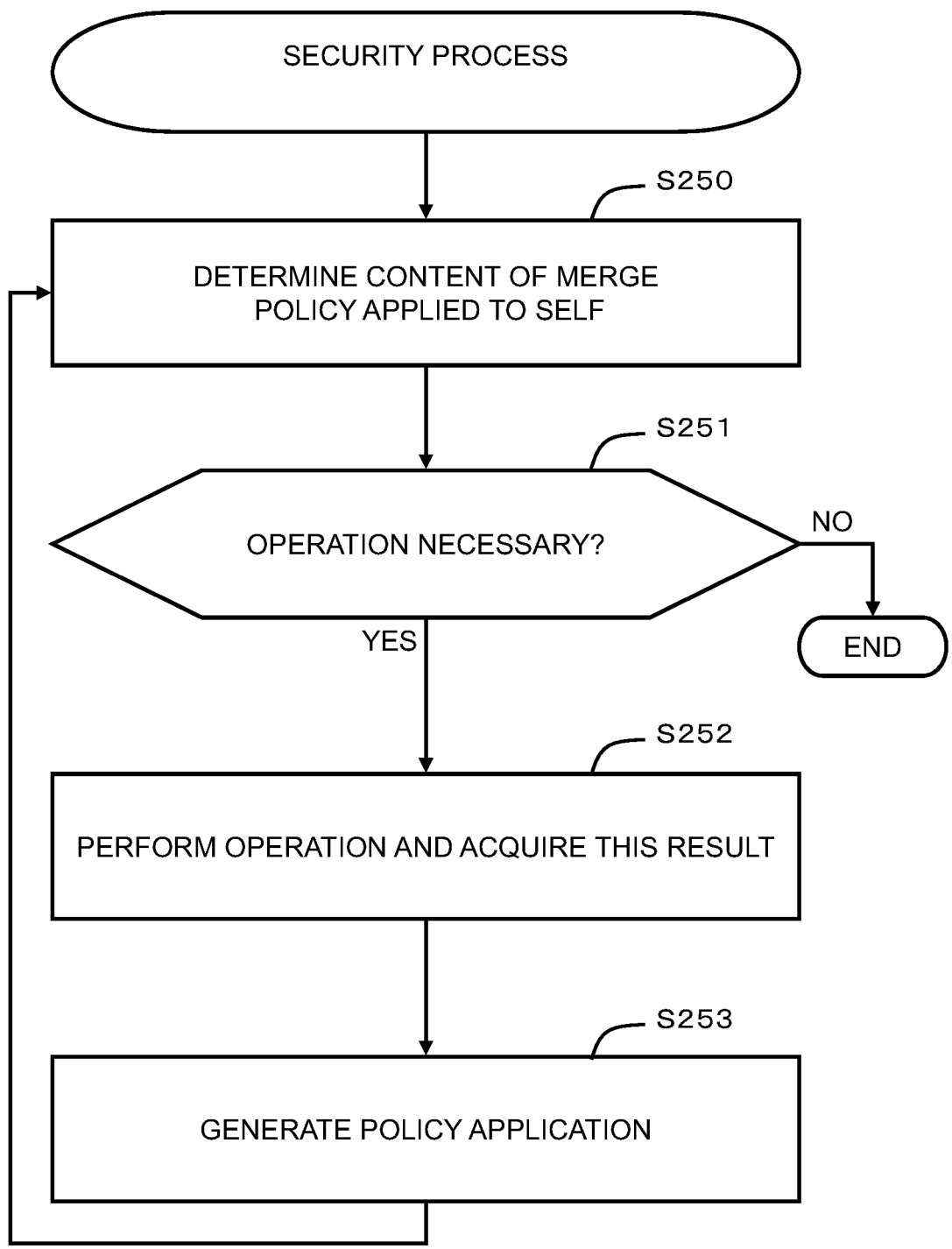
[FIG. 67]

FIG. 67 is a flowchart of a security management process. The security management function (group) P207 runs when the merge policy is applied from the policy application part P204. As described above, since the policy application part P204 runs when the client computer 20 boots up, the security management function (group) P207 also runs when the client computer 20 boots up.

The security management function (group) P207 determines the content of the merge policy applied to itself (S250), and determines whether or not there is need for an operation (S251). In a case where an operation is not necessary (S251: NO), processing ends.

In a case where the determination is that an operation is necessary (S251: YES), the security management function (group) P207 runs, and acquires this result (S252). A new merge policy is applied when either the merge rule changes or the received policy changes (S253). The security management function (group) P207 executes the security management levied on itself in accordance with the new merge rule (S250 through S252).

In accordance with configuring this embodiment like this, it is possible to use a plurality of managers to manage the security of the client computer 20, and, in addition, it is also possible for the highest-level SA manager to apply uniform rules to all client computers 20. Therefore, it is possible to manage the security of the system as a whole using uniform criteria while allowing the security management of each of the respective managers, making it possible to simultaneously achieve both usability and reliability.

For example, it is possible to apply an engineering-dedicated policy and a policy shared in common companywide to each client computer 20 in the engineering department, to apply an account-dedicated policy and a policy shared in common companywide to each client computer 20 in the accounting department, and to merge the respective policies inside the client computers in accordance with a merge rule shared in common companywide.

Even in a case where a policy that is shared in common companywide is not used, for example, it is possible to merge a policy used in a department with a policy used in a section inside the client computers in accordance with a merge rule that is shared in common companywide.

Or, in a case where a project manager issues a merge rule, and each company taking part in the project uses its own policy, it is possible to uniformly carry out the secrecy management of the entire project while maintaining usability for each company.

In addition, this embodiment does not simply merge a plurality of policies, but rather performs a merge in accordance with a merge rule that can only be set by a specified SA user. In accordance with this, it is possible to prevent security holes inside the computer system before they occur, and to enhance the security of the system as a whole.

In addition, in this embodiment, it is possible to detect the difference between a policy that had been issued by a manager and a merge policy that is actually being used in the client computer. Therefore, the user that creates each policy is able to readily confirm an actual application result, and to put this result to good use when creating a new policy.

In addition, in this embodiment, the configuration is such that, when there is an item regarding which a plurality of policies are in conflict, an intermediate setting content (intermediate operation) is used. For example, in a case where the one policy requires prohibit and the other policy requires allow for the same item, it is possible to set an intermediate operation, such as a conditional allow or a conditional prohibit. This makes it possible to maintain security while enhancing usability. Furthermore, in a case where a plurality of incompatible policies are merged, it is not always necessary to set an intermediate operation. It is also possible to apply the setting content of any one policy. Furthermore, an exception setting for setting an exception may be set as needed rather than having to be set at all times.

In addition, in this embodiment, it is possible to create the merge rule using a screen like that shown in FIG. 18. Therefore, the SA user is able to create a merge rule relatively easily and to cope quickly with changing circumstances.

The present invention is not limited to the above-described embodiment. A person with ordinary skill in the art will be able to make a variety of additions and changes without departing from the scope of the present invention. For example, the present invention is also applicable in a case where only a single manager exists inside a system, and this manager is able to set a plurality of different policies in the client.

REFERENCE SIGNS LIST

10 Management server
10 (Msa) Highest-level management server
20 Client computer
Pa, Pb, Pc, Pd, Ps Policy

The invention claimed is:

1. A computer system comprising:
   client computers, each of which is configured to execute a security management program using a merged security policy information;
   a plurality of management computers, each of which is configured to send a security policy information to respective at least one of the client computers controlled by each of the management computers defined by an administrator of the respective management computer; and
   a highest-level management computer configured to send highest-level security policy information to all of the client computers, and configured to send, to each of the client computers, merge rule information which makes it possible to ensure the minimum security unless defined by the security policy information by the administrator of the respective management computer,
   wherein each of the client computers is configured to create said merged security policy information, on the basis of the merge rule information, the security policy information and the highest-level security policy information,
   wherein only the highest-level management computer is configured to receive input from a highest-level administrator to create the highest-level security policy information and the merge rule information,
   wherein the highest-level management computer comprises a merge rule registration display comprising at least one of: a log file size option, a monitor process boot time option and an inhibit print release password option.

2. A computer system according to claim 1,
   wherein each the client computers respectively is configured to detect a difference between the merged security policy information and the security policy information and configured to send the difference to the respective management computer controlling the each of the client computers by sending the respective security policy information, and
   wherein the respective management computer receiving the difference is configured to output the difference.

3. A computer system according to claim 1,
   wherein the merge rule information enables the respective client computer to create the merged security policy information which is intermediate between the security policy information and the highest-level security policy information, in case where, the security policy information and the highest-level security policy information conflict.

4. A computer system according to claim 1,
   wherein one of the security policy information and highest-level security policy information permits a certain operation, and another one of the the security policy information and highest-level security policy information prohibits the certain operation, and
   wherein the merged rule information enables the respective client computer to permit the certain operation with a prescribed condition denoted in the merged rule information.

5. A management system for managing client computers, comprising:
   a plurality of management computers, each of which is configured to send a security policy information to respective at least one of the client computers controlled by each of the management computers defined by an administrator of the respective management computer, each of client computers being configured to execute a security management program using a merged security policy information; and
   a highest-level management computer configured to send highest-level security policy information to all of the client computers, and configured to send, to each of the client computers, merge rule information which makes it possible to ensure the minimum security unless defined by the security policy information by the administrator of the respective management computer,
   wherein each of the client computers is configured to create said merged security policy information, on the basis of the merge rule information, the security policy information and the highest-level security policy information,
   wherein only the highest-level management computer is configured to receive input from a highest-level administrator to create the highest-level security policy information and the merge rule information,
   wherein the highest-level management computer comprises a merge rule registration display comprising at least one of: a log file size option, a monitor process boot time option and an inhibit print release password option.

6. A management system according to claim 5,
   wherein each the client computers respectively is configured to detect a difference between the merged security policy information and the security policy information and configured to send the difference to the respective management computer controlling the each of the client computers by sending the respective security policy information, and
   wherein the respective management computer receiving the difference is configured to output the difference.

7. A management system according to claim 5,
   wherein the merge rule information enables the respective client computer to create the merged security policy information which is intermediate between the security policy information and the highest-level security policy information, in case where, the security policy information and the highest-level security policy information conflict.

8. A management system according to claim 5,
   wherein one of the security policy information and highest-level security policy information permits a certain operation, and another one of the the security policy information and highest-level security policy information prohibits the certain operation, and
   wherein the merged rule information enables the respective client computer to permit the certain operation with a prescribed condition denoted in the merged rule information.

9. A non-transistory computer-readable recording medium according to claim 5,
   wherein one of the security policy information and highest-level security policy information permits a certain operation, and another one of the the security policy information and highest-level security policy information prohibits the certain operation, and
   wherein the merged rule information enables the respective client computer to permit the certain operation with a prescribed condition denoted in the merged rule information.

10. A non-transistory computer-readable recording medium, which stores a computer program for causing a highest-level management computer of a plurality of management computers of a computer system to perform steps, the computer system comprising the highest-level management computer coupled to client computers, each of which is configured to execute a security management program using a merged security policy information, where each of the plurality of management computers is configured to send a security policy information to respective at least one of the client computers controlled by each of the management computers defined by an administrator of the respective management computer, the steps comprising:

sending highest-level security policy information to all of the client computers, and sending, to each of the client computers, merge rule information which makes it possible to ensure the minimum security unless defined by the security policy information by the administrator of the respective management computer, wherein each of the client computers is configured to create said merged security policy information, on the basis of the merge rule information, the security policy information and the highest-level security policy information;

receiving input from a highest-level administrator to create the highest-level security policy information and the merge rule information, wherein only the highest-level management computer is configured to receive input from a highest-level administrator to create the highest-level security policy information and the merge rule information; and displaying, via a merge rule registration display of the highest-level management computer, at least one of: a log file size option, a monitor process boot time option and an inhibit print release password option.

11. A non-transistory computer-readable recording medium according to claim 10, wherein each the client computers respectively is configured to detect a difference between the merged security policy information and the security policy information and configured to send the difference to the respective management computer controlling the each of the client computers by sending the respective security policy information, and wherein the respective management computer receiving the difference is configured to output the difference.

12. A non-transistory computer-readable recording medium according to claim 10, wherein the merge rule information enables the respective client computer to create the merged security policy information which is intermediate between the security policy information and the highest-level security policy information, in case where, the security policy information and the highest-level security policy information conflict.

* * * * *